US011716760B2

(12) United States Patent
Xin et al.

(10) Patent No.: US 11,716,760 B2
(45) Date of Patent: Aug. 1, 2023

(54) CHANNEL ACCESS OF A SIMULTANEOUS-TRANSMIT-RECEIVE (STR) MULTI-LINK-DEVICE (MLD) WITH A NON-STR MLD

(71) Applicants: SONY GROUP CORPORATION, Tokyo (JP); SONY CORPORATION OF AMERICA, New York, NY (US)

(72) Inventors: Liangxiao Xin, San Jose, CA (US); Mohamed Abouelseoud, Burlingame, CA (US)

(73) Assignees: SONY GROUP CORPORATION, Tokyo (JP); SONY CORPORATION OF AMERICA, New York, NY (US)

( * ) Notice: Subject to any disclaimer, the term of this patent is extended or adjusted under 35 U.S.C. 154(b) by 115 days.

(21) Appl. No.: 17/204,366

(22) Filed: Mar. 17, 2021

(65) Prior Publication Data

US 2022/0007417 A1     Jan. 6, 2022

Related U.S. Application Data

(60) Provisional application No. 63/047,212, filed on Jul. 1, 2020.

(51) Int. Cl.
*H04W 74/08*    (2009.01)
*H04W 76/14*    (2018.01)

(52) U.S. Cl.
CPC ..... *H04W 74/0816* (2013.01); *H04W 74/085* (2013.01); *H04W 76/14* (2018.02)

(58) Field of Classification Search
CPC .......... H04W 74/0816; H04W 74/085; H04W 76/14; H04W 56/001; H04W 72/1205; H04W 74/04; H04W 74/0808; H04W 74/0891; H04W 76/15; H04W 80/02; H04W 84/12; H04L 1/0008
See application file for complete search history.

(56) References Cited

U.S. PATENT DOCUMENTS

| | | | | |
|---|---|---|---|---|
| 2018/0103390 A1* | 4/2018 | Zhou | ............... | H04W 28/0252 |
| 2020/0146060 A1* | 5/2020 | Jung | ..................... | H04W 4/40 |
| 2021/0315025 A1* | 10/2021 | Seok | ................... | H04L 1/0008 |
| 2021/0329698 A1* | 10/2021 | Jang | ..................... | H04W 80/02 |
| 2022/0132562 A1* | 4/2022 | Yang | ................... | H04W 74/04 |

* cited by examiner

*Primary Examiner* — Awet Haile
(74) *Attorney, Agent, or Firm* — O'Banion & Ritchey LLP; John P. O'Banion

(57) ABSTRACT

A wireless communication protocol for an access point (AP) multi-link device (MLD) using carrier-sense multiple-access collision avoidance (CSMA/CA) with multi-link operations. Transmit opportunities (TXOPs) are obtained by setting a random number of backoff slots, as a random backoff, for channel contention on each link, and counting down the random backoff on each link independently. When the backoff for the link reaches zero, channel access is obtained and a TXOP duration of reserved on a link whose end time cannot occur later than the latest existing TXOPs of the AP MLD. Numerous variations are described for setting the random number of backoff slots and for reserving the TXOP duration on a link.

15 Claims, 31 Drawing Sheets

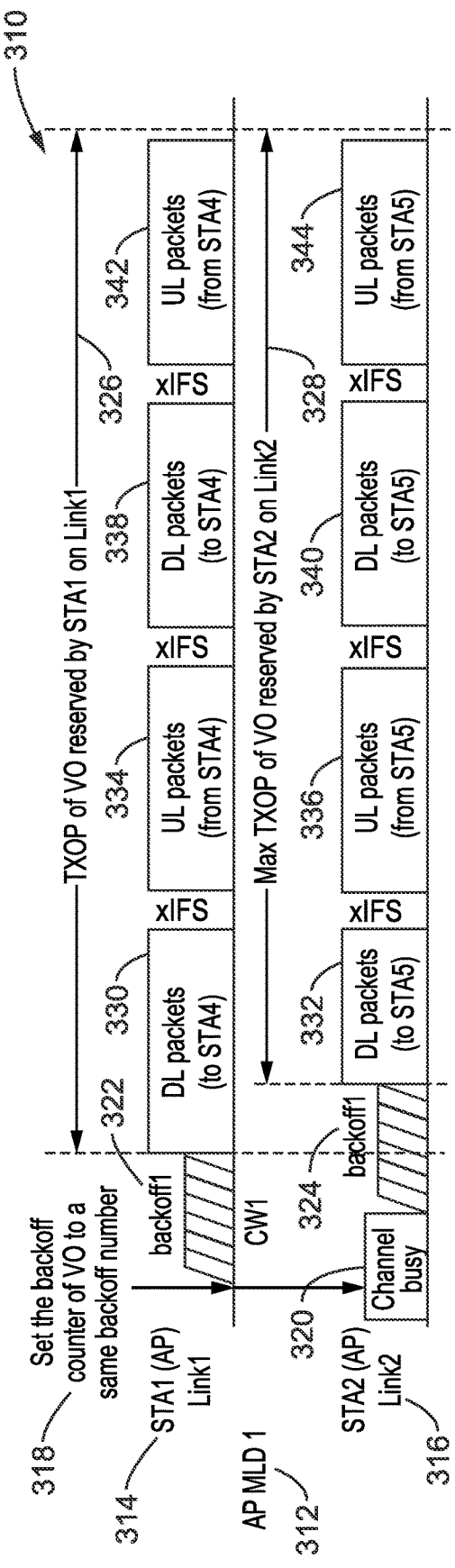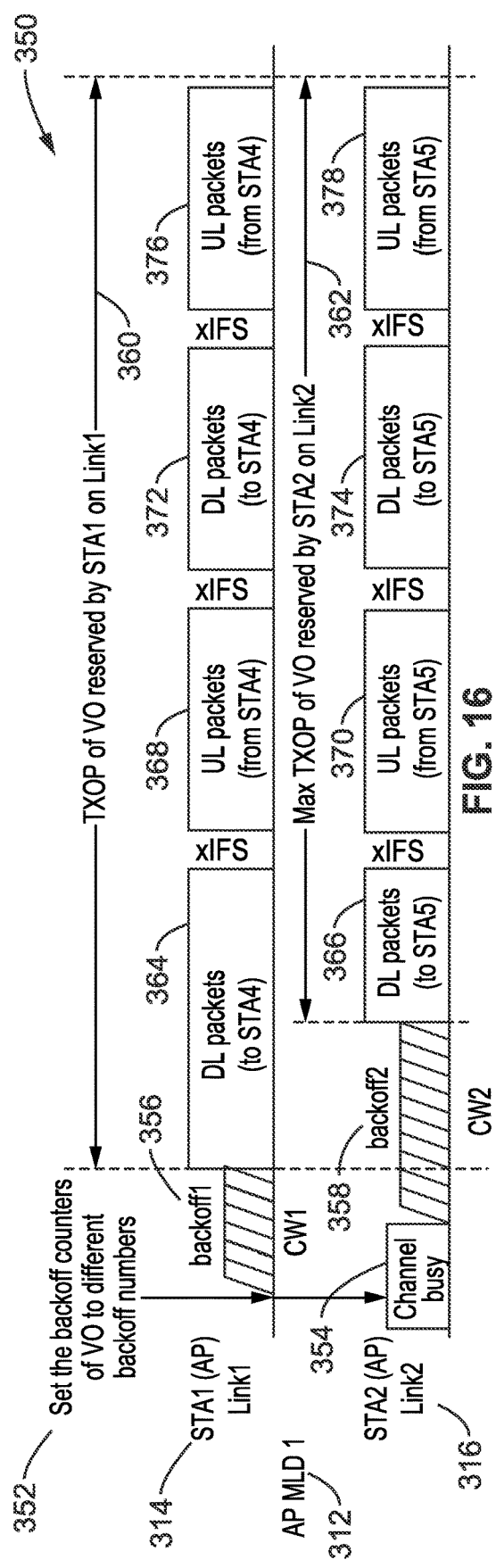

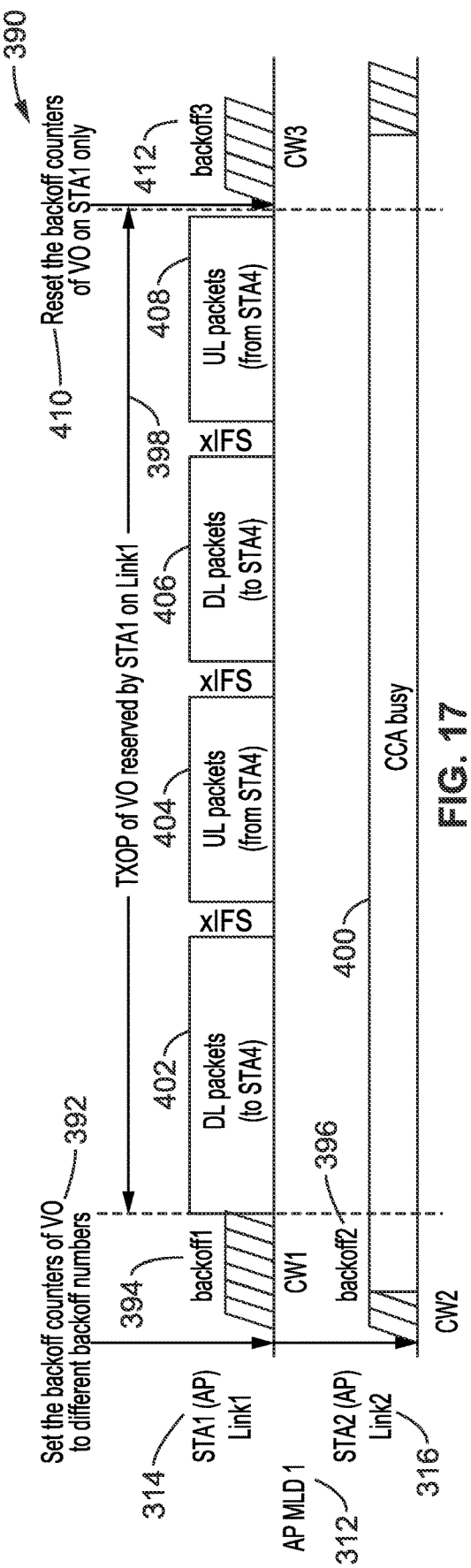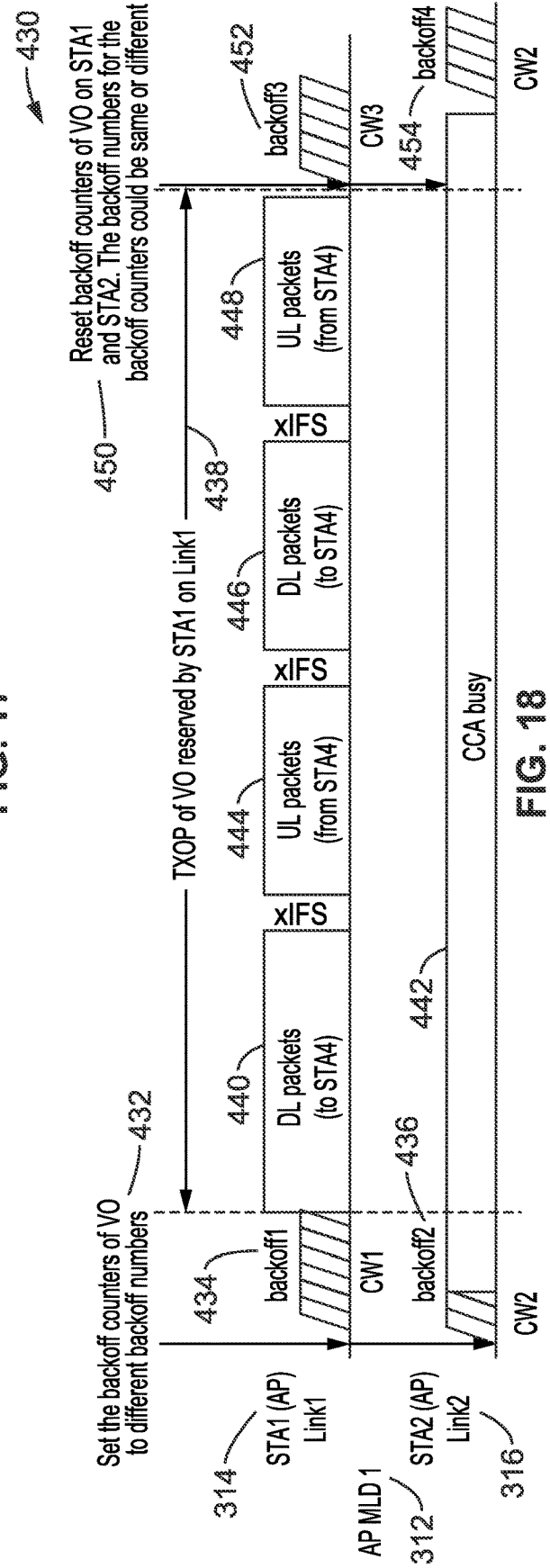

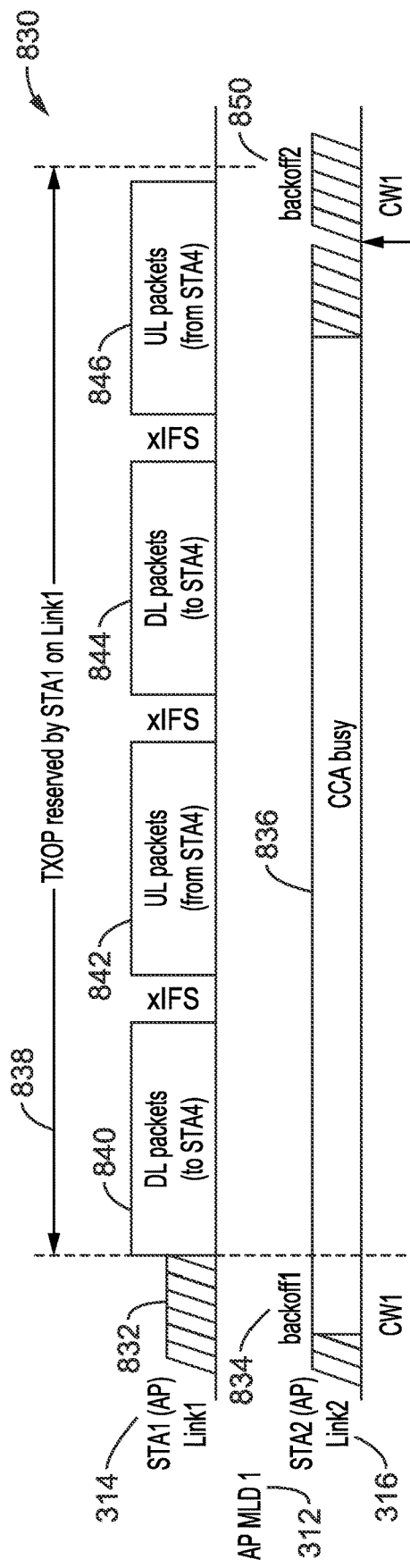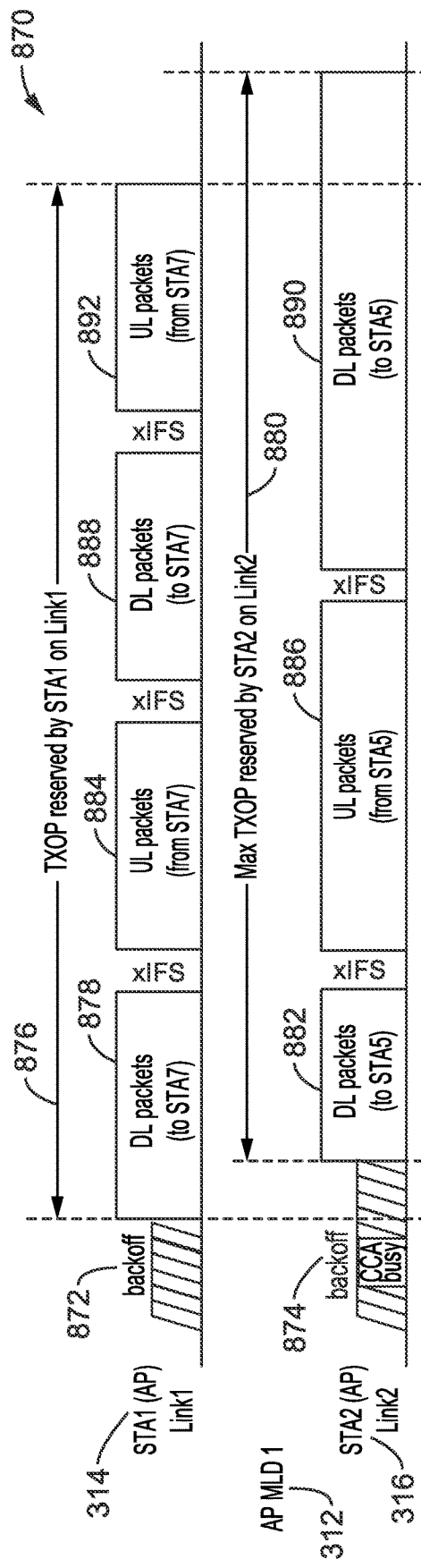
FIG. 28
FIG. 29

CHANNEL ACCESS OF A SIMULTANEOUS-TRANSMIT-RECEIVE (STR) MULTI-LINK-DEVICE (MLD) WITH A NON-STR MLD

CROSS-REFERENCE TO RELATED APPLICATIONS

This application claims priority to, and the benefit of, U.S. provisional patent application Ser. No. 63/047,212 filed on Jul. 1, 2020, incorporated herein by reference in its entirety.

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless communication network stations and protocols, and more particularly to obtaining transmit opportunities (TXOPs) in a wireless communications network protocol which allows for controlling multi-link device (MLDs), which may be capable of simultaneous transmit and receive (STR) or non-STR service, using carrier-sense multiple-access collision avoidance (CSMA/CA) over multi-link operations with another MLD.

2. Background Discussion

The current wireless communication systems using Carrier-Sense Multiple-Access Collision Avoidance (CSMA/CA) contend for and obtain a Transmission Opportunity (TXOP) on a single link. It will be noted that a TXOP is a contention free period so that a station (STA) can transmit multiple packets without re-contending for the channel between packets.

Current wireless communication systems allow more than one STA to be affiliated with a device. Such device is called a multi-link device (MLD). If all the affiliated STAs of a MLD are APs, then this MLD is called AP MLD. If all the affiliated STAs of a MLD are non-APs, then this MLD is called non-AP MLD.

When a STA of a non-AP MLD sets up communications with a STA of an AP MLD over a channel/band (denoted by link), they can exchange packets over that link. Every STA affiliated with the same MLD uses a link of different frequency band.

A multiple-link device (MLD) is said to be of a Simultaneous Transmit and Receive (STR) type when it is able to transmit on one link while simultaneously receiving on another link. A MLD is non-STR when it is not able to transmit on one link while simultaneously receiving on another link. This constraint of non-STR MLDs is caused by the in-device coexistence interference between the STAs affiliated with the MLD. Considering the case where the AP MLD is STR and the non-AP MLD is non-STR; then due to the constraints imposed by the non-STR non-AP MLD, there are challenges for operating the STR AP MLD when contending for channel access on multiple links and reserving TXOPs with non-STR non-AP MLD.

Accordingly, a need exists for a protocol which can properly address the issues between an AP MLD which is STR and a non-AP MLD which is non-STR. The present disclosure fulfills that need and provides additional benefits over previous technologies.

BRIEF SUMMARY

The present disclosure resolves a fairness issue between a STR AP MLD and non-STR non-AP MLDs. If the STR AP MLD occupies one link for the transmissions with non-STR non-AP MLD, the non-STR non-AP MLD is not able to gain channel access on all the links.

In solving this issue the present disclosure details how the STR AP MLD ends its channel occupancy on all the links, and specifically by ending its occupancy on all the links at the same point in time so that the non-STR non-AP MLD has a chance to contend and gain channel access.

The present disclosure solves the channel access issue of STR AP MLD when it gains channel access on one link at the time it is receiving a packet from a non-STR non-AP MLD on another link. The communication is difficult to establish on the new link since the non-STR MLD is not able to receive any signaling from STR MLD at that time. In the present disclosure the non-STR MLD send a CTS-to-Self frame to broadcast so that the other STAs on that link set the NAV and stop contending for channel access on that link until the NAV ends.

The present disclosure solves the collision issue to avoid the non-STR MLD transmitting solicited packets on one link and receiving packets on another link simultaneously. The solution is to align the start time or the end time of DL/UL (downlink/uplink) packets on multiple links. That is to say that during the same period of time, there are only DL or UL packets passed over the multiple links between STR MLD and non-STR MLD. The challenge is that the start time of DL/UL packets on different links could be different. The present disclosure describes setting the same backoff number on multiple links so that there is a chance that multiple links gain channel access at the same time, which simplifies aligning the start time and/or end times of DL/UL packets on those links. In addition, padding may be optionally added after the CTS-to-Self frame to help align the end time of DL/UL packets on multiple links, especially when the MLD cannot gain channel access on multiple links simultaneously.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 15 is a communication sequence diagram of Example 4 for a STR AP MLD setting the same backoff number for the backoff counter of an AC on the affiliated STAs according to at least one embodiment of the present disclosure.

FIG. 16 is a communication sequence diagram of Example 5 for a STR AP MLD setting different backoff numbers for the backoff counters of an AC on the affiliated STAs according to at least one embodiment of the present disclosure.

FIG. 17 is a communication sequence diagram of Example 6 for a STR AP MLD setting the backoff counter on one affiliated STA according to at least one embodiment of the present disclosure.

FIG. 18 is a communication sequence diagram of Example 7 for a STR AP MLD setting the backoff counters of an AC on multiple affiliated STAs according to at least one embodiment of the present disclosure.

FIG. 28 is a communication sequence diagram of Example 17 for a STR AP MLD accessing Link1 and Link2 when STA2 gains the channel access on Link2; however, it cannot reserve enough TXOP duration for its transmission on Link2 according to at least one embodiment of the present disclosure.

FIG. 29 is a communication sequence diagram of Example 18 for a transmission scheme using a third MLD as shown in FIG. 30 according to at least one embodiment of the present disclosure.

DETAILED DESCRIPTION

1. Introduction to CSMA/CA

Figure 1:
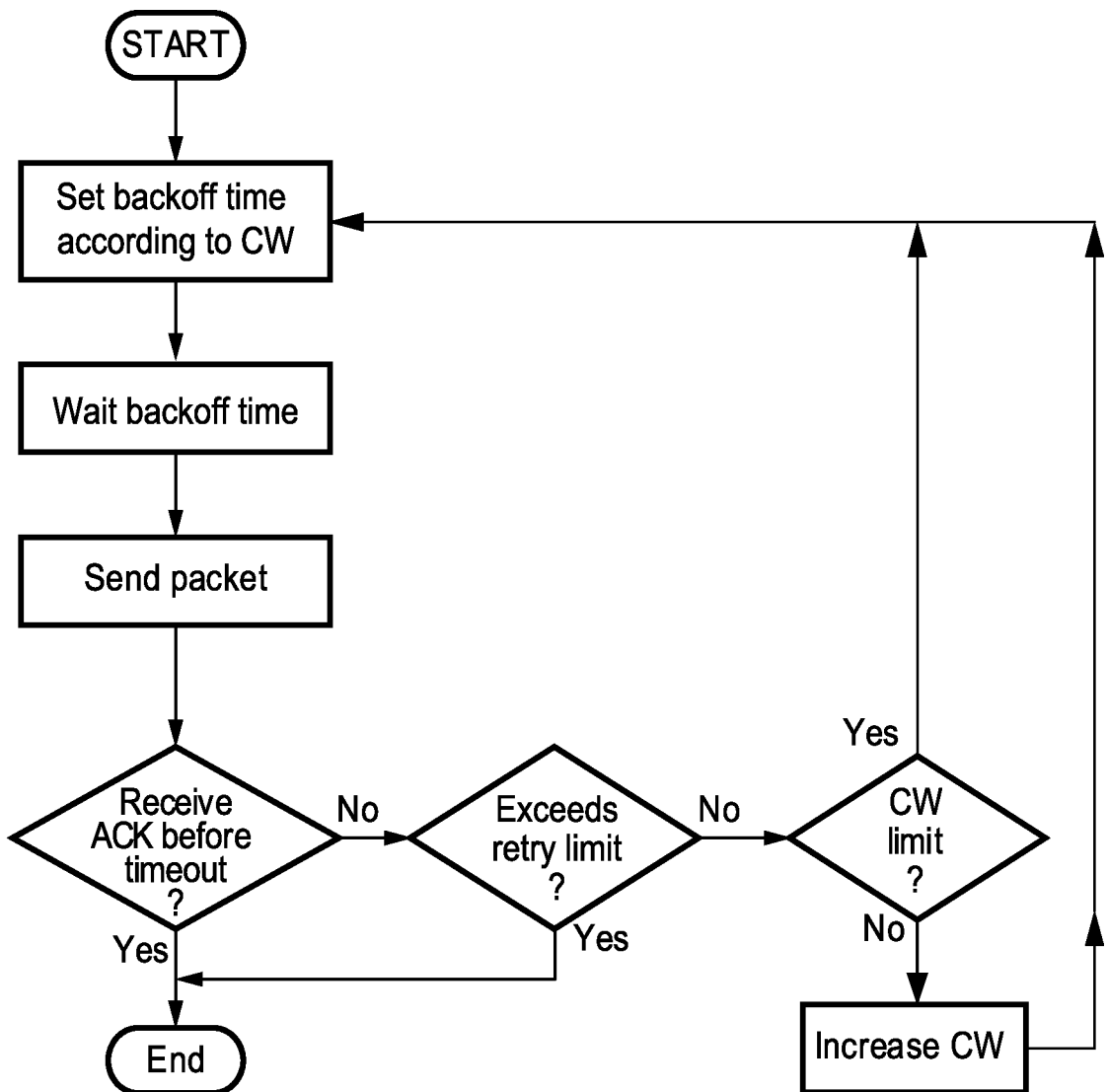
FIG. 1 is a flow diagram of an IEEE 802.11 WLAN system using Carrier Sense Multiple Access/Collision Avoidance (CSMA/CA) for obtaining channel access.

FIG. 1 depicts a flow diagram showing a WLAN system under IEEE 802.11 using Carrier Sense Multiple Access/Collision Avoidance (CSMA/CA) to allow stations (STAs) to have channel access for packet transmissions and retransmissions. In a CSMA/CA system, before each transmission and retransmission, the STA has to set a backoff time for contending to gain access to an available channel. The backoff time is decided by a uniform random variable between zero and the size of contention window, which is used for counting down a backoff time interval.

After the STA waits for the backoff time and senses that the channel is idle, the STA sends a packet. A retransmission is required if the STA does not receive an ACK before timeout. Otherwise, the transmission succeeds.

When a retransmission is required, the STA checks the number of retransmissions of the packet. If the number of retransmissions exceeds the retry limit, then the packet is dropped and no retransmission is scheduled. Otherwise, the retransmission is scheduled.

If the retransmission is scheduled, then another backoff time is required to contend for channel access for the purpose of retransmission. If the size of the contention window does not reach the upper limit, the STA increases it. The STA sets another backoff time depending on the new size of the contention window. The STA waits the backoff time for retransmission and process may continue.

Figure 2:
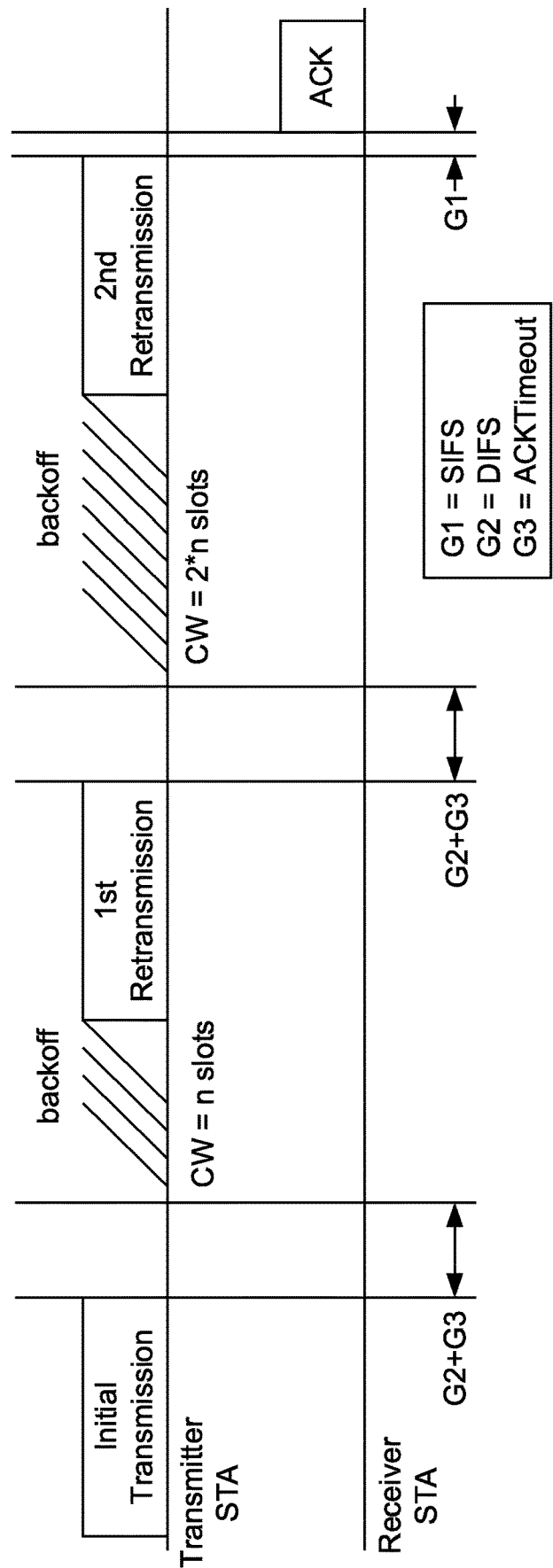
FIG. 2 is a communication sequence diagram of conventional retransmission in CSMA/CA where the backoff time is increased due to retransmission.

FIG. 2 depicts one example of retransmissions under CSMA/CA in which the backoff time is increased due to retransmission. After the transmitter transmits the initial transmission of a packet, it does not receive the ACK before timeout. Then, it sets another backoff time, whereby the size of the contention window is n slots. After waiting the backoff time, the transmitter STA retransmits the packet for the first time. However, the retransmission also fails. The transmitter STA needs to retransmit the packet and again sets a backoff time to contend the channel access. This time, the size of the contention window is doubled, which is 2*n slots, due to the retransmission. The expected backoff time is also doubled by the contention window size. This second retransmission succeeds since it receives an ACK before timeout.

Figure 3:
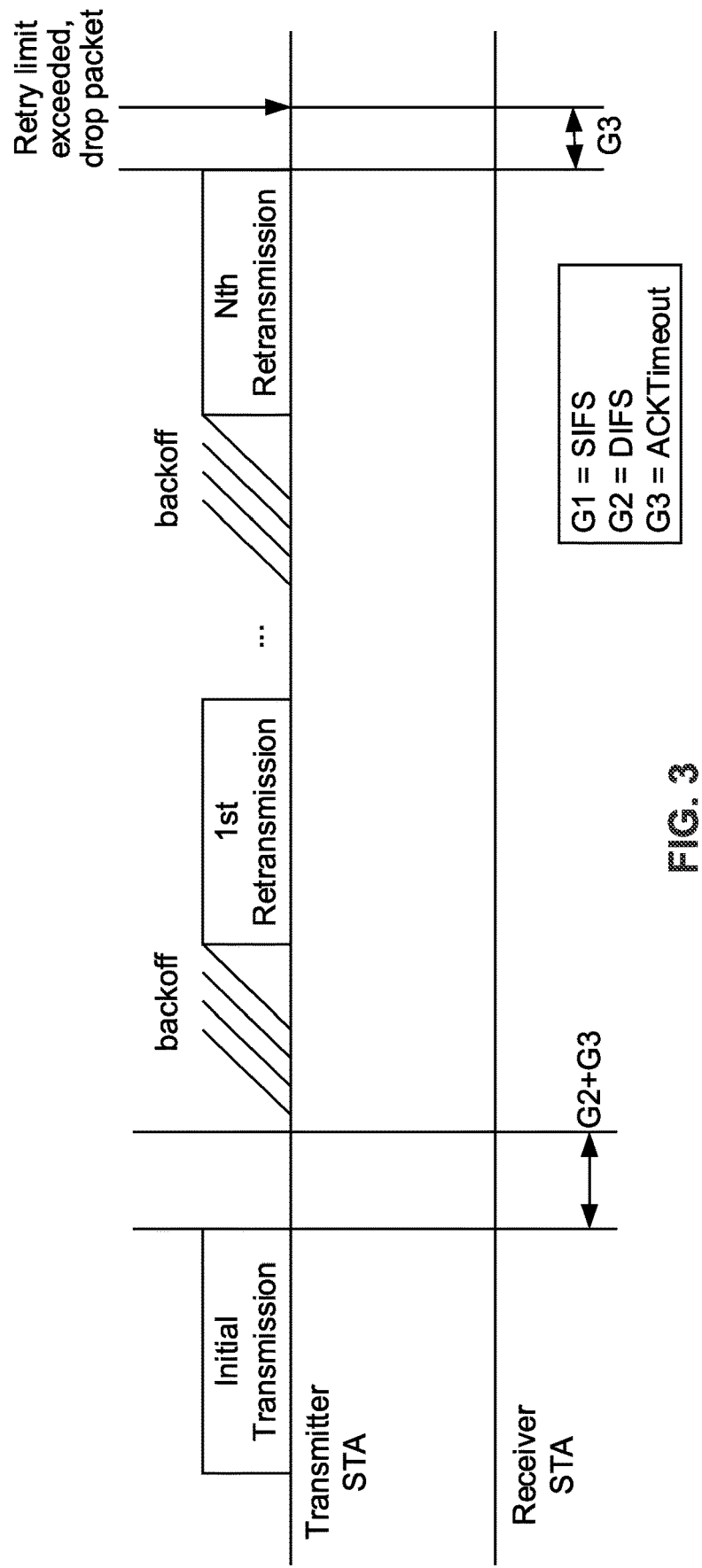
FIG. 3 is a communication sequence diagram of dropping a packet after the number of retransmissions exceeds the retry limit.

FIG. 3 depicts an example of a packet that is dropped after the number of retransmission attempts exceeds the retry limit. By way of example we are denoting the retry limit by "R". After the initial transmission of a packet fails, the transmitter STA retransmits that packet multiple times. However, none of the retransmissions succeed. After retransmitting R times, the number of retransmissions exceeds the retry limit. The transmitter STA stops retransmitting that packet and that packet is dropped.

1.1. EDCA

Figure 4:
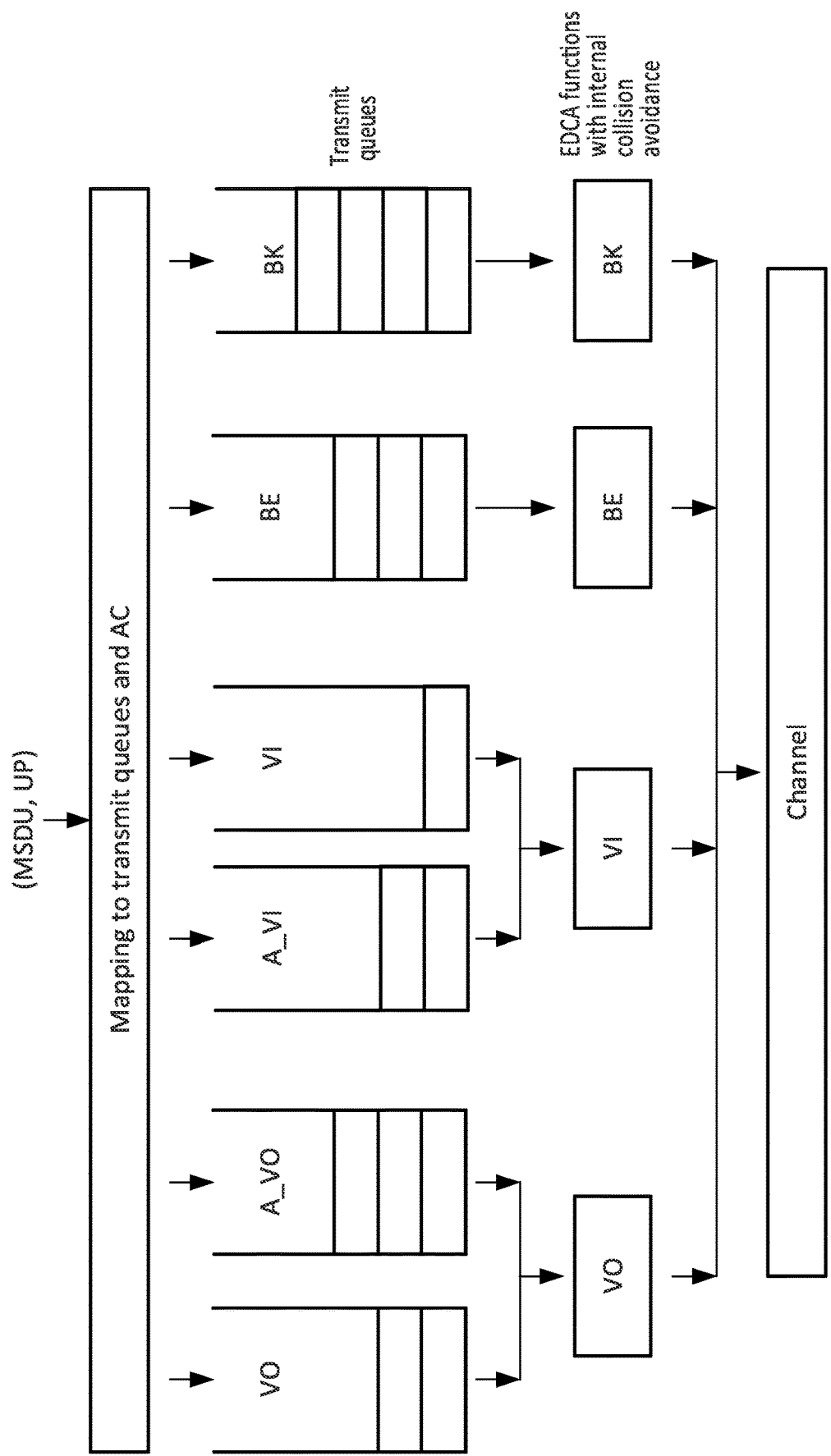
FIG. 4 is a block diagram of a reference model of a conventional Enhanced Distributed Channel Access (EDCA) queue system in IEEE 802.11.

FIG. 4 depicts a reference model of an Enhanced Distributed Channel Access (EDCA) queue system in IEEE 802.11. The system contains six transmit queues and four access categories (ACs). Each AC uses an EDCA functions (EDCAFs) to contend for channel access for the purpose of transmitting packets in its corresponding transmit queues.

The six transmit queues are voice (VO), alternate voice (A_VO), alternate video (A_VI), video (VI), best effort (BE), and background (BK). Each transmit queue decides the transmission order of the packets in the queue.

The four ACs are voice (VO), video (VI), best effort (BE), and background (BK). Each ACs has an EDCA function (EDCAF) to provide the function of channel contention. An internal collision avoidance mechanism is used when multiple EDCAFs try to access the channel at the same time. When the internal collision occurs, the EDCAF with higher priority gain the channel access.

Table 1 lists the UP-to-AC mapping used in the EDCA queue of IEEE 802.11. The second and third columns represent the user priorities of the traffic and their corresponding designations in IEEE 802.1D. In each row, according to the user priority, the traffic will be enqueued in the corresponding transmit queue and access category. The priority increases from the top row to the bottom row. The traffic with higher priority has higher probability to be transmitted earlier.

Figure 5:
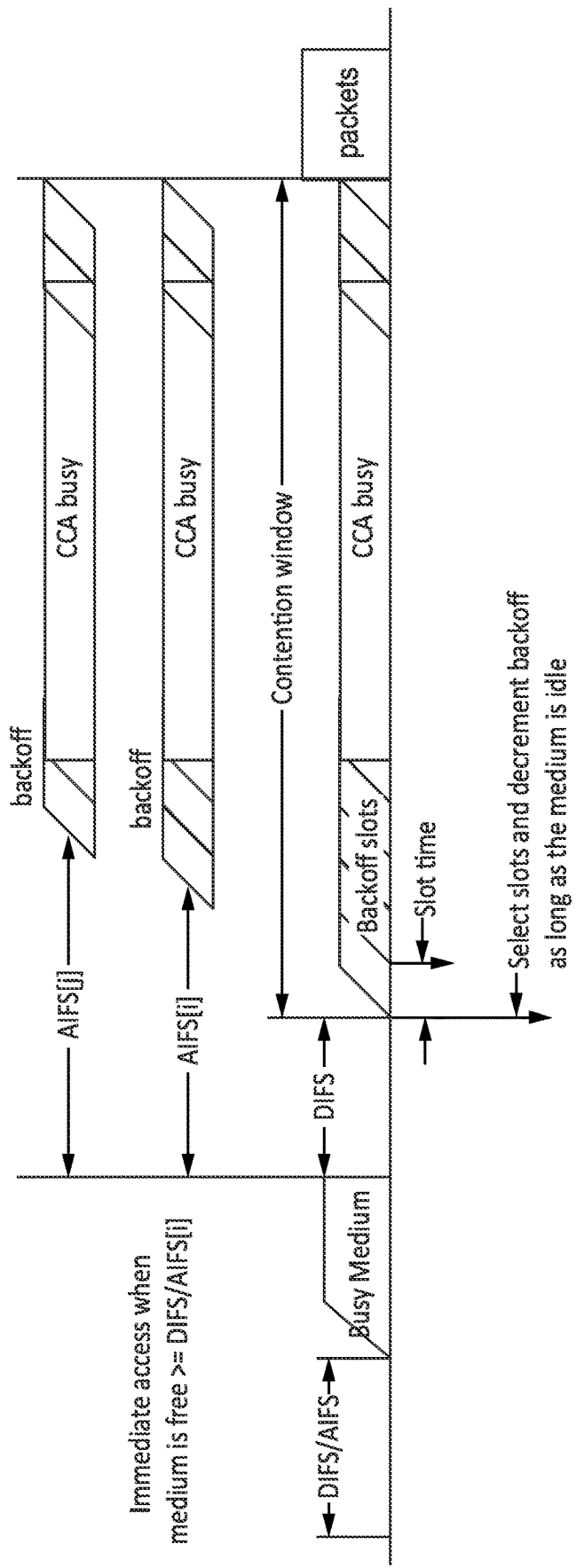
FIG. 5 is a channel access diagram for conventional EDCA in IEEE 802.11.

FIG. 5 depicts a channel access for EDCA, and compares the EDCA channel access when only the Distributed Coordination Function (DCF) is used. When only the DCF is used, and the STA is able to immediately access the channel and the medium is free for more than the time of the DCF Interframe Space (DIFS). Otherwise, it uses CSMA/CA to contend for the channel. After sensing that the channel is idle for DIFS time, it starts to count down the backoff as long as the medium is idle. The number of backoff slots is randomly chosen between zero and its contention window. The contention window is updated as performed in the CSMA/CA system. The STA pauses to count down the backoff when CCA busy occurs, for example when the STA senses that the channel is busy. When the backoff counts down to zero, the STA starts to transmit packets.

In EDCA, each EDCAF is able to immediately access the channel and the medium is free for more than the period of an Arbitration inter-frame spacing (AIFS) time of the AC within which it is to gain channel access. It should be appreciated that AIFS[i] as shown in the figure represents the AIFS time for AC [i]. Otherwise, each EDCAF uses CSMA/CA to contend for the channel for each AC that is to gain channel access. After sensing that the channel is idle for an AIFS time, it starts to count down the backoff for as long as the medium is idle. The number of backoff slots is randomly chosen between zero and the contention window size. The contention window size is updated as shown in CSMA/CA.

The STA pauses to count down the backoff when CCA busy occurs, for example when the STA senses channel busy. When the backoff counts down to zero, the STA obtains a transmit opportunity (TXOP) and starts to transmit packets for that AC. It will be noted that multiple EDCAFs could contend for the channel in parallel. For example, EDCAFs for AC [i] and AC [j] could contend for the channel at the same time as shown in the figure. When an internal collision occurs, the EDCAF with the higher priority is allowed to gain the channel access and the EDCAF with lower priority will double its contention window.

Table 2 lists default parameter setting for EDCA channel access. Each AC has its own minimum contention window and maximum contention window. AIFSN represents the AIFS duration in terms of the number of backoff slots. TXOP limit represents the maximum duration of TXOP that each AC could reserve every time for transmitting multiple packets.

When the TXOP limit of an AC, such as VO or VI, is not zero, then that AC is able to reserve a period of the TXOP for transmitting multiple packets. When the TXOP limit of an AC, such as BE or BK, is zero, that AC is able to transmit one packet only during its TXOP.

2. Problem Statement

A number of issues arise when sharing TXOPs between MLDs, in particular between an STR AP MLD and a non-STR MLD.

The first challenge is to ensure that the non-STR non-AP MLD has a chance to obtain the channel. When communication is established between the STR AP MLD and non-STR non-AP MLD, both of the MLDs can contend for the channel to gain channel access. However, due to the constraint to which the non-STR non-AP MLD is subject, the chance of it gaining channel access would likely be lower than that of the STR AP MLD. For example, when the STR AP MLD gains a channel access on a link, it can continue to contend on another link, for which the non-STR non-AP MLD cannot contend. This is because one STA of the non-STR non-AP MLD is not able to transmit while there is another STA of the non-STR non-AP MLD receiving packets from the STR AP MLD. In order to provide the non-STR non-AP MLD with a chance to contend for the channel, STR AP MLD should stop occupying all the links at the same time.

The second challenge is to avoid the in-device coexistence interference when transmissions occur on multiple links simultaneously. The packet received by one STA of non-STR non-AP MLD can collide due to the in-device coexistence interference if another STA of a non-STR non-AP MLD is transmitting packets at the same time. One solution is to align the uplink/downlink (UL/DL) packets that are transmitted on multiple links simultaneously. That is, at the same time, there is only either DL or UL packets transmitted over multiple links. However, how to achieve the UL/DL packet alignment is still an open question. This is because channel access time on multiple links can be different.

The third challenge is to allow the STR AP MLD to reserve a TXOP on a link when it gains channel access on that link at the time the non-STR non-AP MLD is transmitting. Due to the constraint of the non-AP MLD, it is not able to sense the channel status on any links. Therefore, the non-AP MLD is not able to receive any signaling from the STR AP MLD to indicate that the TXOP is reserved by the STR AP MLD.

The proposed technologies propose a mechanism of channel access for STR AP MLD to protect the non-STR MLD from the problems mentioned above. It should be noted that this mechanism is suitable for channel access of STR non-AP MLD with non-STR AP MLD.

The disclosed technology addresses scenarios in which communications are performed between one STR AP MLD and one non-STR non-AP MLD. For an MLD having multiple STAs which are operating on different frequency bands (i.e., links), the signal transmission on a link by a STA of the MLD can interfere with signal reception on another link by another STA of the MLD. Such interference is referred to as in-device coexistence interference.

For a non-STR MLD, the in-device coexistence interference is high, for instance the interference due to signal transmissions on a link by a STA of the MLD can destroy the signal reception on another link by another STA of the MLD.

For a STR MLD, it is able to transmit on a link while receiving on another link simultaneously due to the low in-device coexistence interference; however, this is not the case for the non-STR MLD.

The following problems can arise when communication occurs between the non-STR non-AP MLD and the STR AP MLD. The non-STR non-AP MLD may not have an opportunity to gain channel access when it competes with its associated STR AP MLD. When one AP of the STR AP MLD is transmitting to one STA of the non-STR non-AP MLD on one link, the other STAs of the non-STR non-AP MLD are not able to contend for other links on the channel due to its restriction. In the worst case, if an STR AP MLD always has an AP to transmit packets to some STA of the non-AP MLD, then the non-STR non-AP MLD has no opportunity to gain channel access on any links.

The AP MLD cannot transmit DL packets on one link while receiving UL packets on another link when it communicates with the non-STR non-AP MLD over those links. The AP MLD can either transmit DL packets or receive UL packets on all the links at the same time. Issues arise because the APs of the AP MLD run backoffs on different links independently and the time required for obtaining TXOPs over those links can differ and are random. If multiple APs obtain the TXOPs over multiple links at different times, then it is difficult for the AP MLD to schedule either DL transmission or UL transmission over multiple links. For example, one AP of the AP MLD gains channel access when another AP of the AP MLD is receiving UL traffic. Then the other AP of the STR AP MLD is not able to send any signaling to the non-STR non-AP MLD due to the high in-device coexistence interference. If the APs of the AP MLD can obtain the TXOPs over multiple links simultaneously, then the AP MLD can easily schedule either DL transmission or UL transmission over multiple links. However, it is difficult to allow multiple APs to obtain TXOPs over multiple links simultaneously since the contention time on each link can be different depending on the channel conditions of each link.

3. Contribution of the Disclosed Technology

The disclosed technology solves the fairness issue between an STR AP MLD and a non-STR non-AP MLD. If the STR AP MLD occupies one link for the transmissions with the non-STR non-AP MLD, then the non-STR non-AP MLD is not able to gain channel access on all the links. To solve this problem, the STR AP MLD has to end its channel occupancy on all the links.

To address this issue, the disclosed technology forces the STR AP MLD to end its occupancy on all links at the same point in time so that the non-STR non-AP MLD has a reasonable opportunity to contend and gain channel access.

The disclosed technology solves the channel access issue of the STR AP MLD when it gains channel access on one link at the time it is receiving a packet from a non-STR non-AP MLD on another link. The communication is difficult to establish on the new link since the non-STR MLD is not able to receive any signaling from STR MLD at that time. The disclosed technology sends a broadcast CTS-to-Self frame so that the other STAs on that link set the NAV and stop contending for channel access on that link until the NAV ends.

The disclosed technology solves the collision issue to avoid the issue with the non-STR MLD transmitting solicited packets on one link and receiving packets on another link simultaneously. The solution is to align the start time or the end time of DL/UL (downlink/uplink) packets on multiple links. That is, during the same period of time, there is only DL or UL packets passed over the multiple links between STR MLD and non-STR MLD.

The challenge is primarily with matching the start time of DL/UL packets on different links. The present disclosure sets the same backoff number on multiple links so that there is a chance that multiple links gain channel access at the same time; which simplifies aligning the start time and end time of DL/UL packets on those links. In at least one embodiment of the present disclosure padding is added after the CTS-to-Self frame to help align the end time of DL/UL packets on multiple links, especially when the MLD cannot gain channel access on multiple links simultaneously.

4. Example Embodiments 4.1. Station Hardware

Figure 6A:
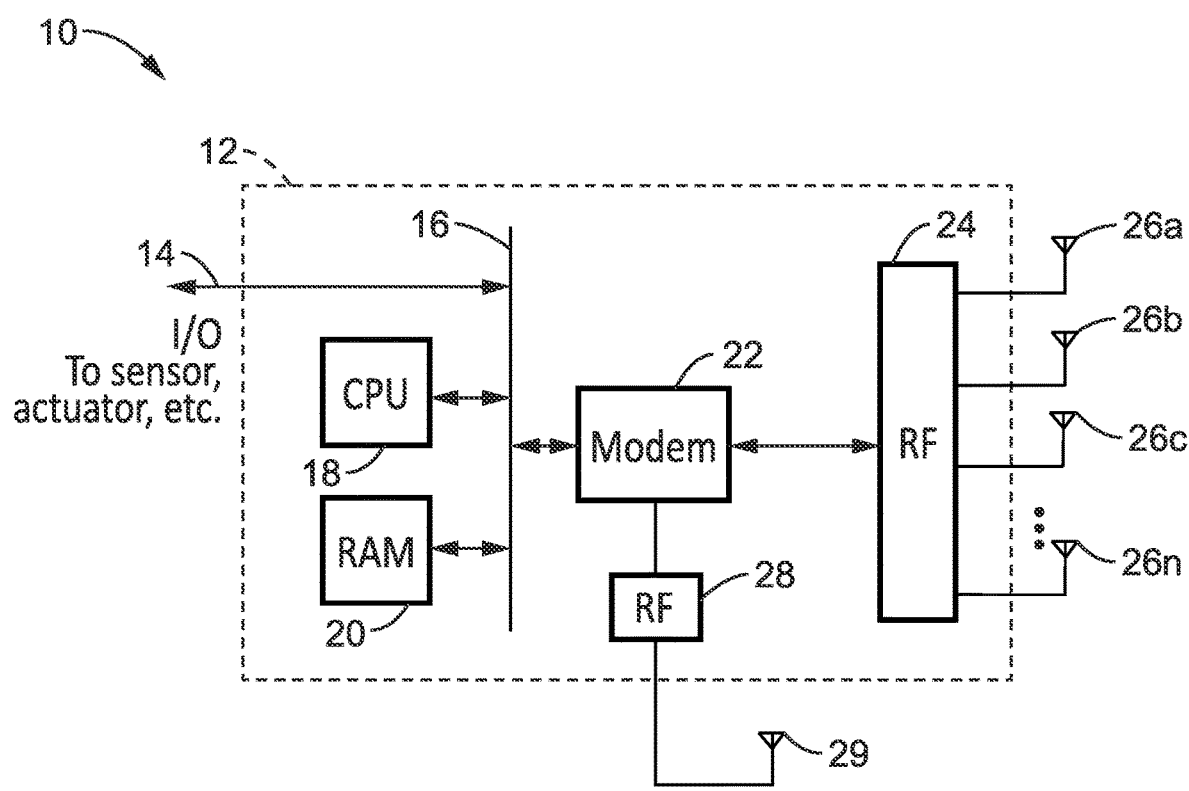
FIG. 6A and FIG. 6B are a block diagram of station (STA) hardware according to at least one embodiment of the present disclosure.

FIG. 6A illustrates an example embodiment 10 of wireless station (STA) hardware having external I/O access to applications, CPU and RAM, to execute programming that implements this wireless communication protocol.

The host machine 12 accommodates at least one modem 22 to support communications coupled to at least one RF module 24, 28 connected to one or more antennas 26a, 26b, 26c through 26n, and 29 for performing communications, such as on the sub-6 GHz band (e.g., 2.4, 5, 6 Ghz), and/or for communicating over millimeter wavelengths (mmW). In the example shown RF antenna 29 is an omni-directional antenna. By way of example, RF module 24 is shown having multiple antennas to support beamforming for transmission and reception on that band. In this way, the STA may transmit signals using one or multiple sets of beam patterns. It should be appreciated that any desired bands can be supported by the teachings of the present disclosure. It should also be noted that multiple STAs may be grouped (e.g., clustered in multi-link devices) in any desired configuration without departing from the teachings of the present disclosure.

Bus 14 allows connecting various devices to the CPU, such as to sensors, actuators and so forth. Instructions from memory 20 are executed on processor 18 to execute a program which implements the communication protocol, which is executed to allow the STA to perform the functions of an access point (AP) station or a non-AP (regular) station (STA). It should also be appreciated that the programming is configured to operate in different modes (source, transmitter, intermediate, destination, receiver, first AP, other AP, non-AP stations associated with the first AP, non-AP TXOP holder station, non-AP TXOP participant stations, non-AP TXOP non-participant stations, stations associated with another AP, coordinator, coordinatee and so forth), depending on what role it is playing in the current communications context.

It should be appreciated that the present disclosure can be configured with multiple modems 22, with each modem coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighboring STAs.

Figure 6B:
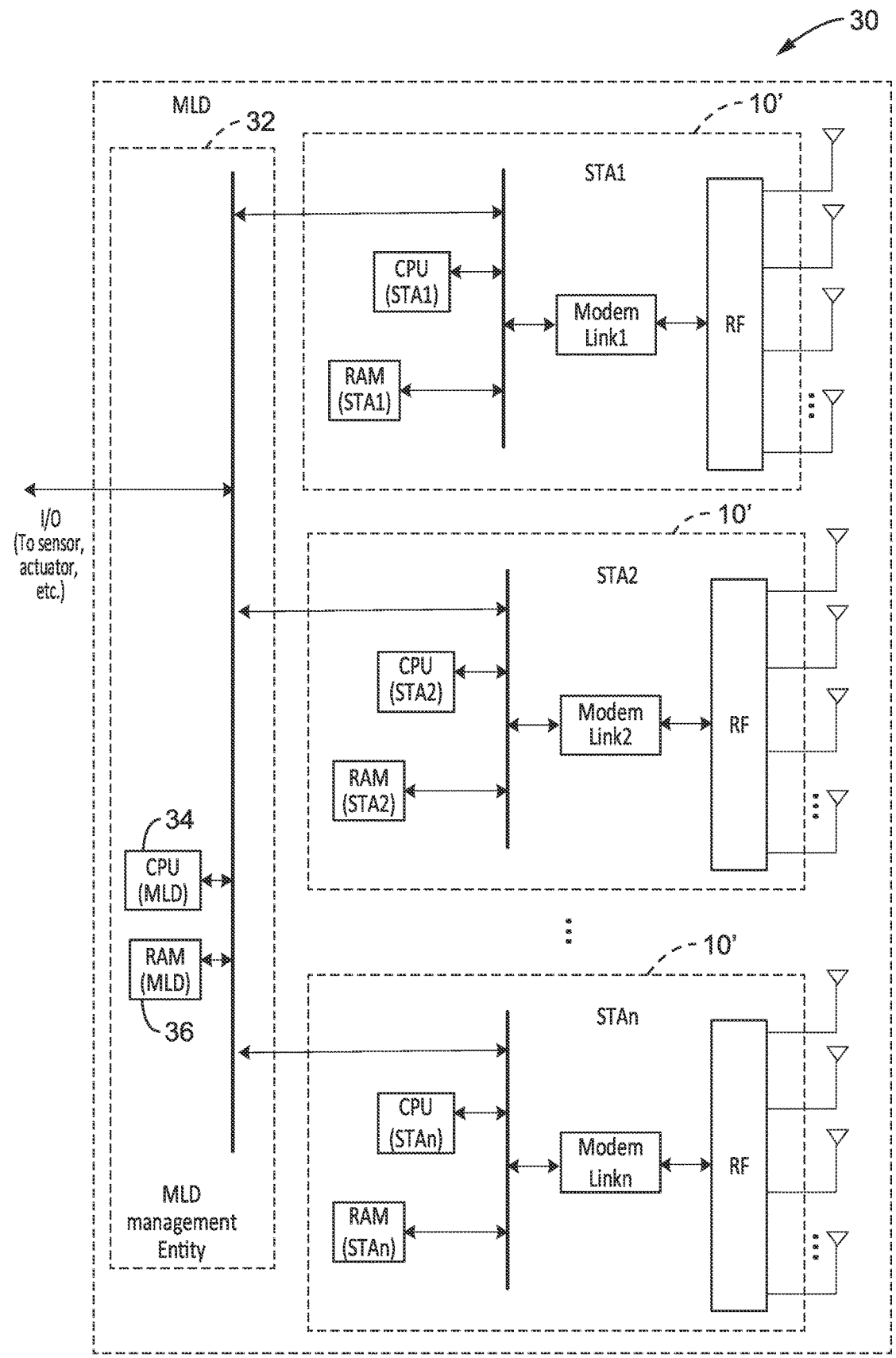

FIG. 6B illustrates an example embodiment 30 of station grouping in which wireless communication stations are affiliated in a multi-link device (MLD) hardware configuration. Each STA within the MLD operates on a link of a different frequency. Each station 10' can be as that described in FIG. 6A, with each having CPU, RAM, Modem, RF circuits and one or more antennas. It is seen in the figure that each of the n stations shown provide a different link (e.g., Link1, Link2 through Linkn are shown).

The MLD is also seen with circuitry 32 of an MLD management entity having at least one processor (CPU) 34, memory 36 which provides external I/O to access applications of the MLD and to implement communication protocols at the MLD level. The MLD is configured to distribute tasks to, and collect information from, each affiliated STA and share information between affiliated STAs.

It should also be appreciated that each STA of the MLD need not have its own processor and memory. In at least one embodiment, one or more of the stations within the MLD may share processors and memory between themselves, or share the processor and memory of the MLD circuit. Thus the present disclosure contemplates many possible arrangements for communication over multiple links within an MLD.

4.2. MLD Station Topology

Figure 7:
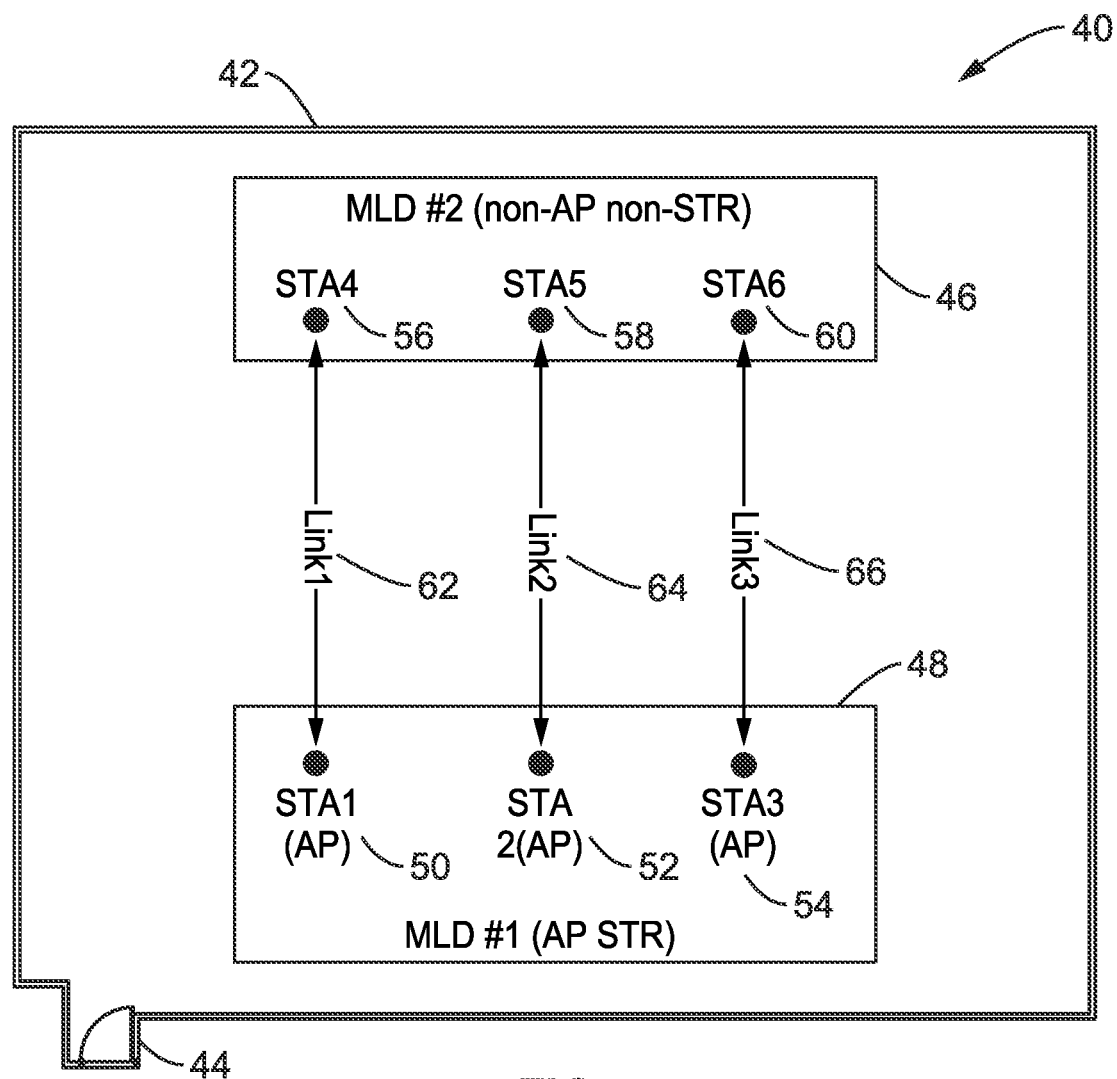
FIG. 7 is a block diagram of a multi-link device (MLD) topology utilized by way of example according to at least one embodiment of the present disclosure.

FIG. 7 illustrates an example embodiment 40 of an MLD device that has more than one affiliated STA and has one MAC service access point (SAP) to the logical link control (LLC), which includes one MAC data service. The example assumes, without limitation, that there are 6 STAs consisting of two MLDs 46, 48 that by way of example and not limitation are shown in an enclosed space 42 (e.g., meeting room) with could have one or more apertures (e.g., doors/windows). STAs 1, 2 and 3 are seen 50, 52 and 54 which are affiliated with the AP multi-link device 1 (MLD1) 58 and STAs 4, 5 and 6 seen as 56, 58 and 60 are affiliated with non-AP MLD2 46. STAs 4, 5 and 6 are associated with STAs 1, 2 and 3 over links 1, 2 and 3 shown as links 62, 64 and 66, respectively.

MLD 1 48 is able to transmit on one link and receive on the other link simultaneously; and thus is referred to as a Simultaneous Transmit and Receive (STR) MLD. MLD2 is not able to transmit on one link and receive on the other link simultaneously due to in-device operation constraints. MLD2 is a non-STR form of MLD which can transmit and receive on both links simultaneously.

All STAs use Enhanced Distributed Channel Access (EDCA) for random channel access and by way of example and not limitation the default parameters exemplified for EDCA are the same on all the links as shown in Table 2. It will be appreciated that all the STAs can choose to use the same backoff slot time. Then, if the STAs of an MLD set the same backoff number (i.e., number of backoff slots) for channel contention and no CCA busy detections occur during channel contention, then the STAs count down the backoff to zero at the same time and gain channel access on those links at the same time.

It should be appreciated that the disclosed channel access mechanism can also be applied to a STR MLD (AP or non-AP) or non-STR MLD (AP or non-AP). The disclosed technologies can also be applied to CSMA/CA systems that do not use EDCA. A CSMA/CA system without EDCA can be regarded as an EDCA system which only has one Access Category (AC).

4.3. MLD Initializing Backoff Counters

Figure 8:
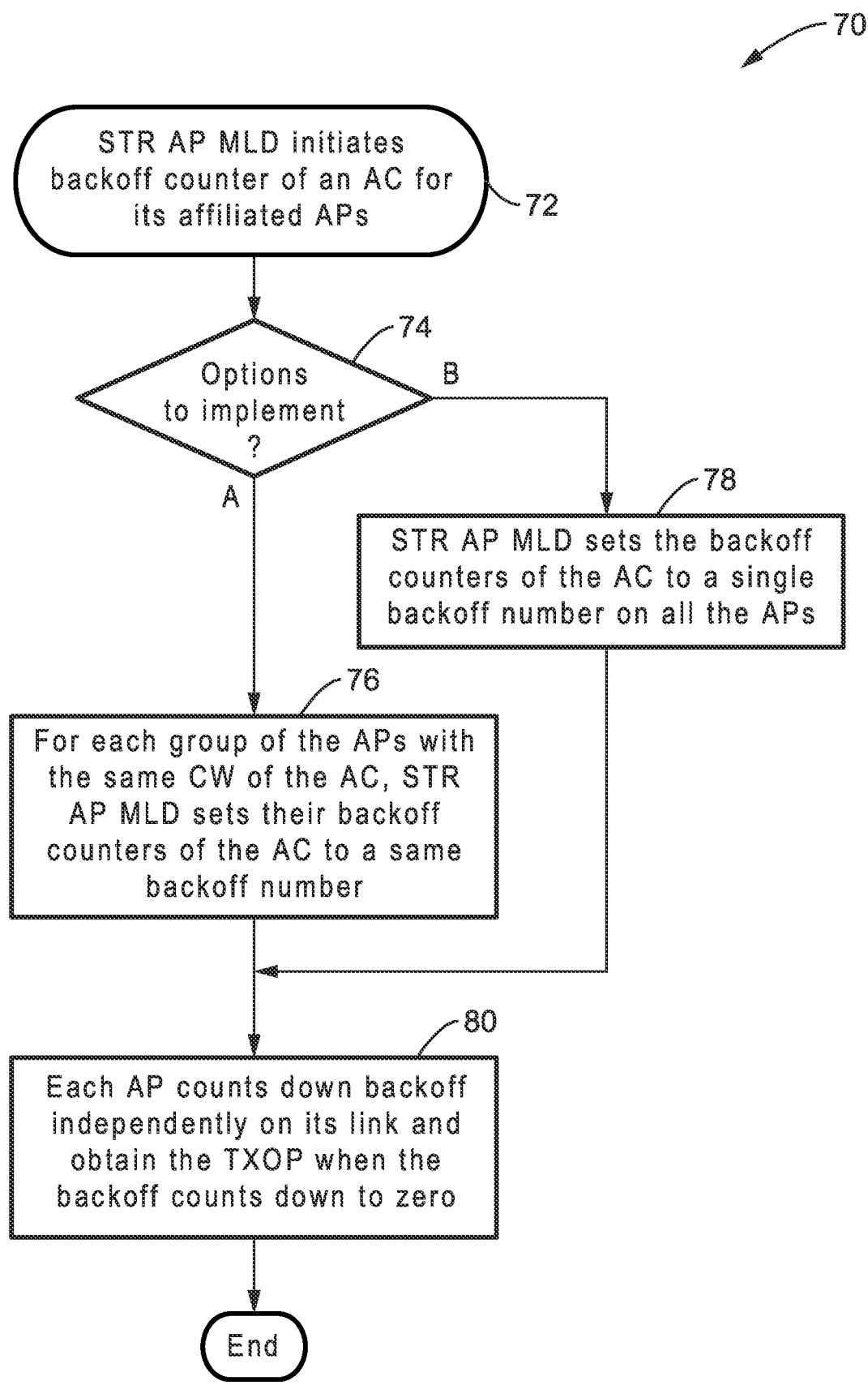
FIG. 8 is a flow diagram of an AP MLD initializing backoff counters of an access category (AC) for its affiliated APs according to at least one embodiment of the present disclosure.

FIG. 8 illustrates an example embodiment 70 of an AP MLD initializing backoff counters of an access category (AC) for its affiliated APs. When the MLD initializes (sets) 72 backoff counters of an AC for its affiliated APs, it can have multiple options 74 for initializing the backoff counters; herein exemplified as either option A or B.

If option A is selected then block 76 is reached and for each group of APs of the STR AP MLD with the same Contention-Window (CW) of the AC, the STR AP MLD sets its backoff counters of the AC to the same backoff number. For example, the AP MLD has AP1, AP2 and AP3 operating on Link1, Link2 and Link3 and initializes the backoff counter of VO (an AC in IEEE 802.11) on AP1, AP2 and AP3. AP1 and AP2 have $CW_1$ for VO and AP3 has $CW_2$ for VO. Then, the STR AP MLD sets the backoff counter of VO to the same backoff number on AP1 and AP2 and sets the backoff counter of VO to another backoff number on AP3. The backoff number of VO on AP1 and AP2 is randomly chosen between 0 and $CW_1$ as generated by CSMA/CA. The backoff number of VO on AP3 is randomly chosen between 0 and $CW_2$ as generated by CSMA/CA.

If option B is selected then block 78 is reached and STR AP MLD sets the backoff counters of the AC on all its APs to a single backoff number (i.e., the number of backoff slots used for backoff in CSMA/CA) over multiple links. The process of generating the single backoff number is described in the next section.

In either case, block 80 is reached in which the AP independently counts down the backoff on its links and obtains the TXOP when the backoff count reaches zero.

It should be noted that the APs of the AP MLD when initializing the backoff counter to the same value, should use the same backoff slot time and the same Arbitration Inter-Frame Spacing (AIFS) duration. It will be noted in the following examples that xIFs spacing is shown which may comprise any desired form of interframe spacing, such as RIFS, SIFS, PIFS, DIFS, AIFS, EIFS, and so forth. It should be noted that each AP can update the contention window size of the AC by following the rule defined in EDCA of IEEE 802.11.

In certain cases, the STR AP MLD may try to initialize the backoff counter of the AC for an AP which is counting down the backoff of the AC. In this case, the CW of the AC for that AP does not change.

It is possible that the STR AP MLD initializes the backoff counter for some of its affiliated APs. For example, an STR AP MLD can only initialize the backoff counters of an AC on two affiliated APs when the STR AP MLD has three affiliated APs.

It should be noted that the STR AP MLD independently sets the backoff counters of different ACs. It should also be noted that the backoff counter initialization of an AC shown in FIG. 8 can be applied to any type of MLD.

4.4. AP MLD Generating Backoff Number of an AC

In FIG. 8 the AP MLD can generate a single backoff number to set the backoff counters of an AC for multiple affiliated APs. In at least one embodiment this process for generating the single backoff number can be performed as follows.

Step 1: determining the contention window (CW) size for the single backoff number, denoted by $CW_{ML}$.

$CW_{ML}=f(CW_1, CW_2, \ldots, CW_n)$ where $f(\cdot)$ represents a function to determine $CW_{ML}$ while values $CW_1$, $CW_2$ through to $CW_n$ are contention windows of the AC on the affiliated APs, such as AP1, AP2, through to APn, that needs to initialize backoff counters.

Step 2: generating a random value which is between 0 and $CW_{ML}$. This random value is the single backoff number, for example the number of backoff slots that the STA needs to count down to zero for channel access. This procedure is the same as that for generating random backoff in CSMA/CA.

The following is an example of determining a single backoff number. Each AP has its own contention window size for the AC, for example VO or the other ACs, when the random value is to be generated.

In the following description it is assumed that there are two affiliated APs, AP1 with contention window size $CW_1$ for VO, and AP2 with contention window size $CW_2$ for VO. Then, the contention window size for the single backoff number, denoted by $CW_{ML}$, can be chosen from a value between $CW_1$ and $CW_2$. For example, $CW_{ML}$ can be determined in any of the following ways.

$CW_{ML}=\min(CW_1, CW_2)$, which means that $CW_{ML}$ is the minimum value between $CW_1$ and $CW_2$.

$CW_{ML}=\text{avg}(CW_1, CW_2)$, which means that $CW_{ML}$ is the average value between $CW_1$ and $CW_2$.

$CW_{ML}=\max(CW_1, CW_2)$, which means that $CW_{ML}$ is the maximum value between $CW_1$ and $CW_2$.

One of ordinary skill in the art will appreciate that a wide range of determination mechanisms can be utilized for arriving at a value for $CW_{ML}$ without departing from the teachings of the present disclosure.

Then, the single backoff number for VO is randomly chosen between 0 and $CW_{ML}$. AP1 and AP2 set the backoff counters of VO to the single backoff number at the same time and count down their backoff of VO independently.

It should be appreciated that APs affiliated with one AP MLD may have different contention window sizes of an AC due to transmission failure.

4.5. AP MLD Generating Backoff Number for Multiple ACs

It is possible that the MLD starts to contend for the channel on multiple links simultaneously for different ACs. In such a case, the MLD can also set backoff counters of those ACs to a single backoff number on those links. By way of example and not limitation, the following describes generating a single backoff number.

Step 1: determining the contention window size for the single backoff number, denoted by $CW_{ML}$.

$CW_{ML}=f(CW_1, CW_2, \ldots, CW_n)$ where $f(\cdot)$ represents a function to determine $CW_{ML}$ while values $CW_1$, $CW_2$ through to $CW_n$ are contention windows of the AC on the affiliated APs, such as AP1, AP2 through to APn, that need to initialize backoff counters of the corresponding ACs.

Step 2: generate a random value which is between 0 and $CW_{ML}$. This random value is the single backoff number, for example the number of backoff slots that the STA needs to count down to zero for channel access. This procedure is the same as generating random backoff in CSMA/CA.

When the MLD sets the backoff counters of different ACs on multiple links to a single backoff number, those backoff counters should use the same Arbitration Inter-Frame Spacing (AIFS) duration, denoted by AIFS_ML, to ensure those backoff counters start counting down at the same time after the AIFS duration. The value of AIFS_ML can be determined as a function g( ) of the related ACs, such as:

AIFS_ML=g(AIFS_AC1, AIFS_AC2, . . . , AIFS_ACm), where AIFS_AC1, AIFS_ACm, through to AIFS_ACm represent the AIFS durations of the ACs whose backoff counters are to be initialized.

Following are examples for determining the single backoff number of multiple ACs and setting the AIFS_ML. Each STA of the MLD has its own contention window size of the ACs when the random value is to be generated.

By way of example and not limitation the following assumes there are two affiliated APs, AP1 with contention window size $CW_1$ for VO, and AP2 with contention window size $CW_2$ for VI. Then, the contention window size for the single backoff number, denoted by $CW_{ML}$, can be selected from a value between $CW_1$ and $CW_2$. For example, $CW_{ML}$ can be determined in any of the following ways.

$CW_{ML}$=min($CW_1$, $CW_2$), which means that $CW_{ML}$ is the minimum value between $CW_1$ and $CW_2$.

$CW_{ML}$=avg($CW_1$, $CW_2$), which means that $CW_{ML}$ is the average value between $CW_1$ and $CW_2$.

$CW_{ML}$=max($CW_1$, $CW_2$), which means that $CW_{ML}$ is the maximum value between $CW_1$ and $CW_2$.

Then, the single backoff number for VO and VI can, for example, be randomly chosen between 0 and $CW_{ML}$. At the same time, AP1 sets the backoff counters of VO to the single backoff number and AP2 sets the backoff counters of VI to the single backoff number. AP1 counts down the backoff counter of VO and AP2 counts down the backoff counter of VI; the counting down is performed independently on the different APs.

The AIFS for the backoff counters in the example are preferably also set to the same value. For example, AIFS_ML=min(AIFS_VI, AIFS_VO), which means that AIFS_ML is the minimum value between AIFS_VI and AIFS_VO.

AIFS_ML=avg(AIFS_VI, AIFS_VO), which means that AIFS_ML is the average value between AIFS_VI and AIFS_VO.

AIFS_ML=max($CW_1$, $CW_2$), which means that AIFS_ML is the maximum value between AIFS_VI and AIFS_VO.

It should be appreciated that AIFS_ML may be set in a number of alternative ways without departing from the present teachings, such as by setting AIFS_ML to some other predetermined duration such as the duration of a PIFS in IEEE 802.11.

4.6. STR AP MLD Obtaining TXOPs on Multi-Link

Figure 9A:
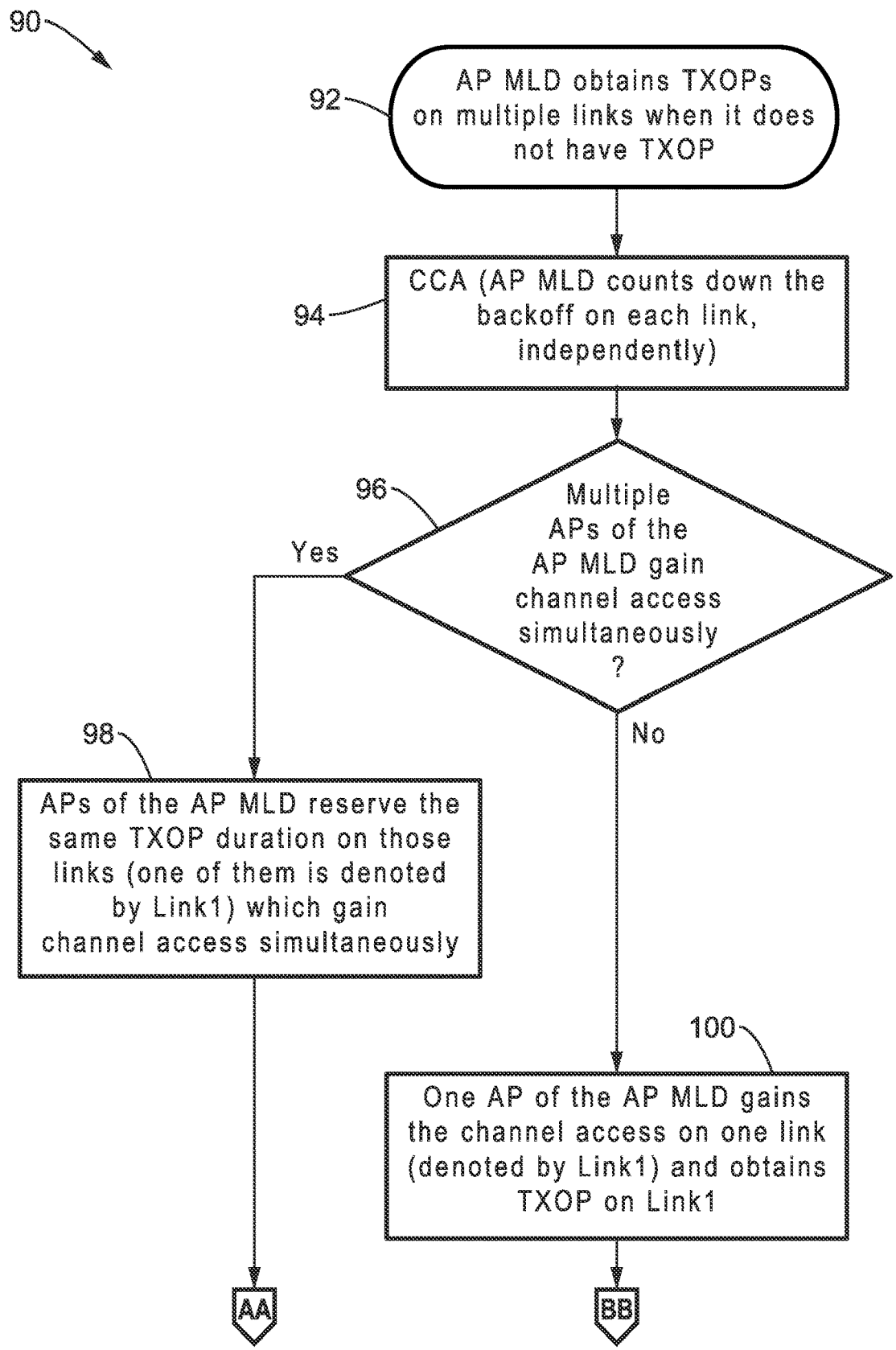
FIG. 9A and FIG. 9B are a flow diagram of a STR AP MLD obtaining TXOPs on multiple-links (multi-links) when it does not have the TXOP, according to at least one embodiment of the present disclosure.
Figure 9B:
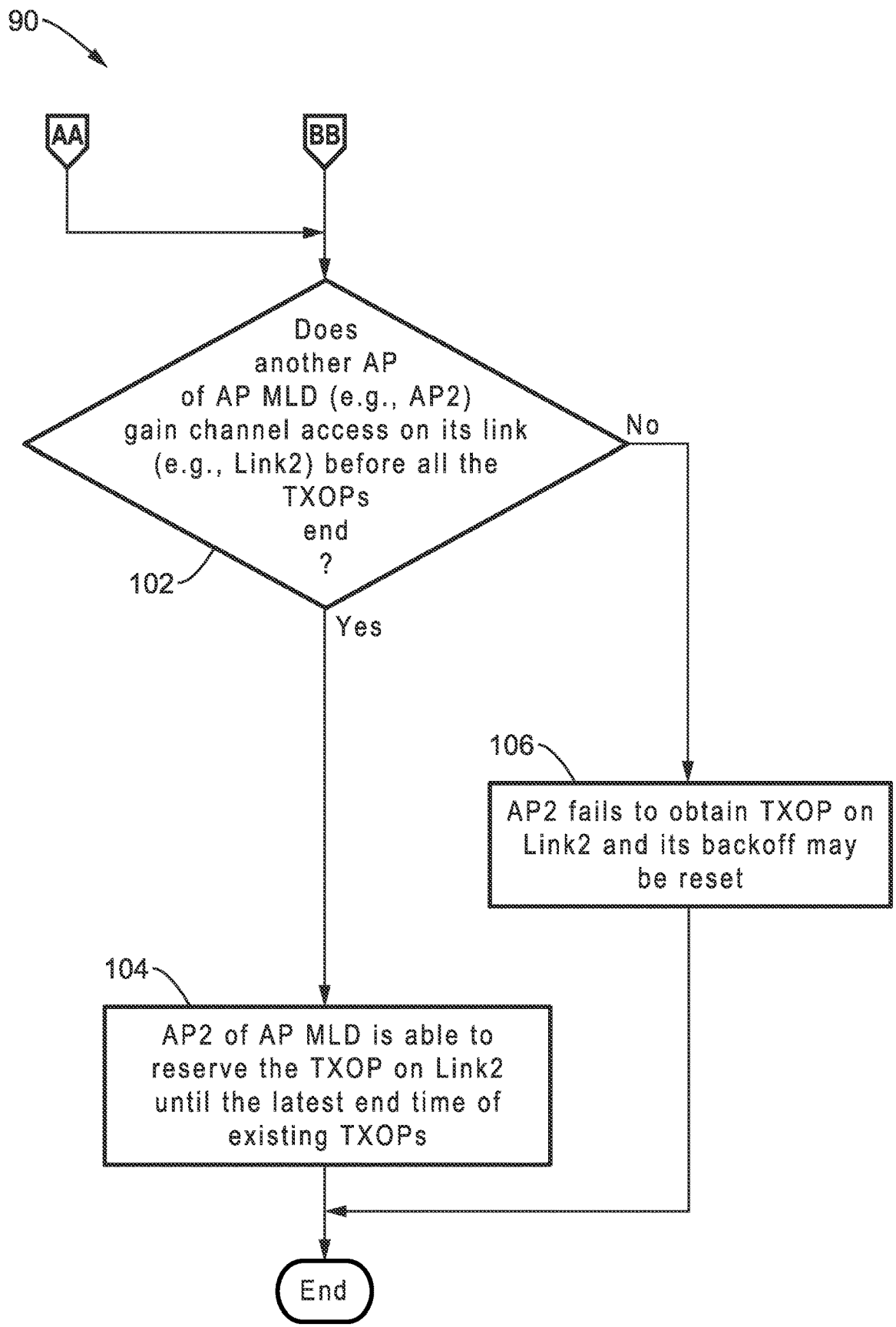

FIG. 9A and FIG. 9B illustrate an example embodiment 90 of a STR AP MLD obtaining TXOPs on multiple-links (multi-links) when it does not have (control) the TXOP. For example the TXOPs can represent those which are reserved by the STR AP MLD for communicating with the non-STR non-AP MLD.

When the STR AP MLD is to obtain 92 TXOPs on a multi-link, it performs 94 an independent clear channel assessment (CCA) on each link. Each affiliated AP counts down the backoff independently and gains channel access when the backoff counter counts down its value to zero. The backoff count-down procedure is the same as in IEEE 802.11. The backoff counter setting can be the same as that described in Section 4.4 regarding FIG. 8.

A check 96 determines if multiple APs of a STR AP MLD have gained channel access on multiple links simultaneously. If the condition is met, then the APs could reserve 98 the same TXOP duration on those links. Otherwise, if the condition in block 96 is not met of multiple links, then only one AP of STR AP MLD gains channel access 100 on its link, denoted by Link1, first and obtains TXOP on Link1.

Execution reaches check 102 in FIG. 9B which determines if another AP of the AP MLD, such as denoted by AP2, has gained channel access on its link.

If the condition is met and another AP of AP MLD, denoted by AP2, has gained channel access on its link, denoted by Link2, before the existing TXOP terminates, then AP2 is able to reserve 104 the TXOP on Link2 until the latest end time of the existing TXOPs, and the process completes. This explains the manner in which a STR AP MLD obtains the TXOP on one link for a duration not exceeding its TXOPs on other links.

Otherwise, if the condition is not met, with AP2 failing to obtain TXOP on Link2 then its backoff counter may be reset 106 before processing ends.

It should be appreciated that the backoff counter for CCA in 94 can be performed as described in Section 4.4. regarding FIG. 8. It should also be noted that when STA2 fails to obtain TXOP on Link2, its backoff can be reset also as described in Section 4.4. It is also possible that STA2 may not reset the backoff and its backoff continues to be counted down. In at least one embodiment the AP MLD makes a decision depending on the demand of accessing multiple links at the same time. Similarly, it should be noted that the AP MLD is capable of reserving the TXOPs on multiple links for different ACs. In addition, it will be noted that when multiple STAs of a STR AP MLD gain channel access on multiple links simultaneously, then it is possible that they may reserve different TXOP durations.

It should be appreciated that the TXOP reservations shown in the process of FIG. 9A through FIG. 9B can be applied to any type of MLD.

4.7. STR AP MLD Extends TXOPs on a Link

Figures 10, 11:
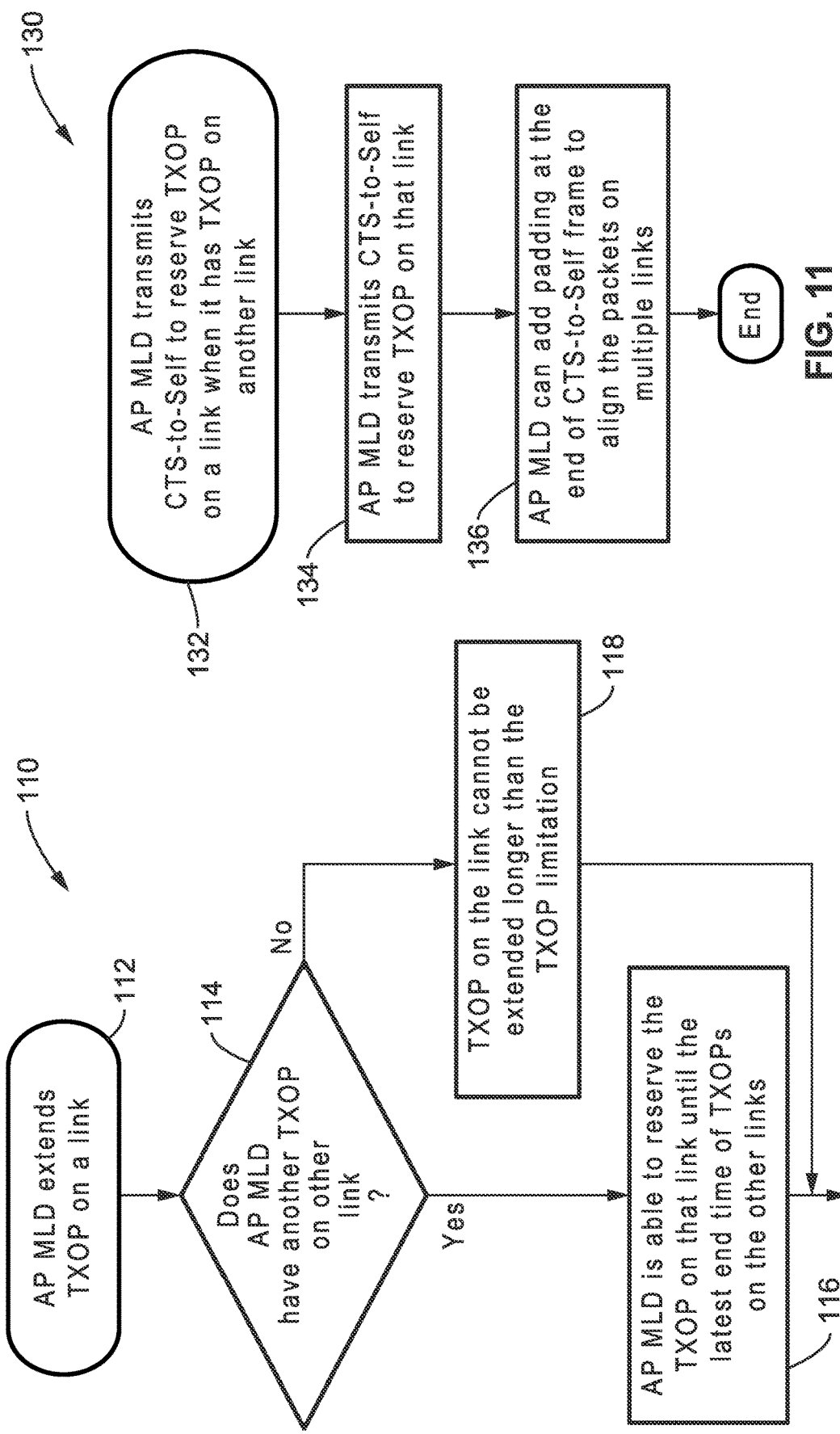
FIG. 10 is a flow diagram of an STR AP MLD performing extending TXOP on a link according to at least one embodiment of the present disclosure.
FIG. 11 is a flow diagram a STR AP MLD using CTS-to-Self frame on one link when it has a TXOP on another link according to at least one embodiment of the present disclosure.

FIG. 10 illustrates an example embodiment 110 of an STR AP MLD performing extending TXOP on a link. For example, the TXOPs can represent those reserved by a STR AP MLD for communicating with the non-STR non-AP MLD.

When an STR AP MLD is to extend 112 a TXOP on a link, it checks 114 whether it has another TXOP on the other links. If there is another TXOP on the other links, then the STR AP MLD is able to reserve 116 the TXOP on that link until the latest end time of the existing TXOPs on the other links. Otherwise, if there is not another TXOP on the other links then the TXOP on the link cannot be extended 118 longer than the TXOP limitation. It should be appreciated that TXOP extension shown in the figure can be applied to any type of MLD.

4.8. STR AP MLD Reserving TXOP w/CTS-to-Self

FIG. 11 illustrates an example embodiment 130 of a STR AP MLD using CTS-to-Self frame on one link when it has a TXOP on another link.

When a STR AP MLD is to reserve a TXOP on one link and has TXOP on another link 132, it transmits 134 a CTS-to-Self frame to reserve a TXOP on that link. The AP MLD can also add padding 136 at the end of the CTS-to-End frame to provide for packet alignment.

A CTS-to-Self frame can be generally utilized for obtaining TXOP reservations. It should be especially recognized that a CTS-to-Self frame is preferred for reserving TXOP on a link when there is a UL packet transmission on other links within a CTS-to-Self transmission time. It will be noted that the padding following a CTS-to-Self frame can be a padding of symbols, such as OFDM symbols. The padding could be regarded as an extension portion of the CTS-to-Self frame. In addition, it is also possible that the padding can comprise bits in the CTS-to-Self frames. It should be recognized that the TXOP reservation using a CTS-to-Self frame shown in the flowchart can be applied to any type of MLD.

5.0. Example Scenarios

The network topology for these examples was shown in FIG. 7.

The VO access category (AC) is generally used in the following examples, although it should be appreciated that VO could be replaced by any other AC without departing from the present teachings.

The DL/UL packets shown in the figures may comprise any types of data packets or management packets. It is possible that only DL packets are transmitted during the TXOP. It will be noted that packet alignment is optional. For example, when there are DL packets only during TXOP on multiple links, packet alignment is not necessary. The contention window size on each link is updated according to EDCA rules defined in IEEE 802.11, independently.

It should also be noted that in these examples, the xIFS interframe spacing represents any desired interframe spacing, such as SIFS, PIFS or similar. In addition, it should be noted that the DL/UL packets could be any type of data packets or management packets.

5.1. STR AP MLD Setting Backoff Counters: Example 1

Figure 12:
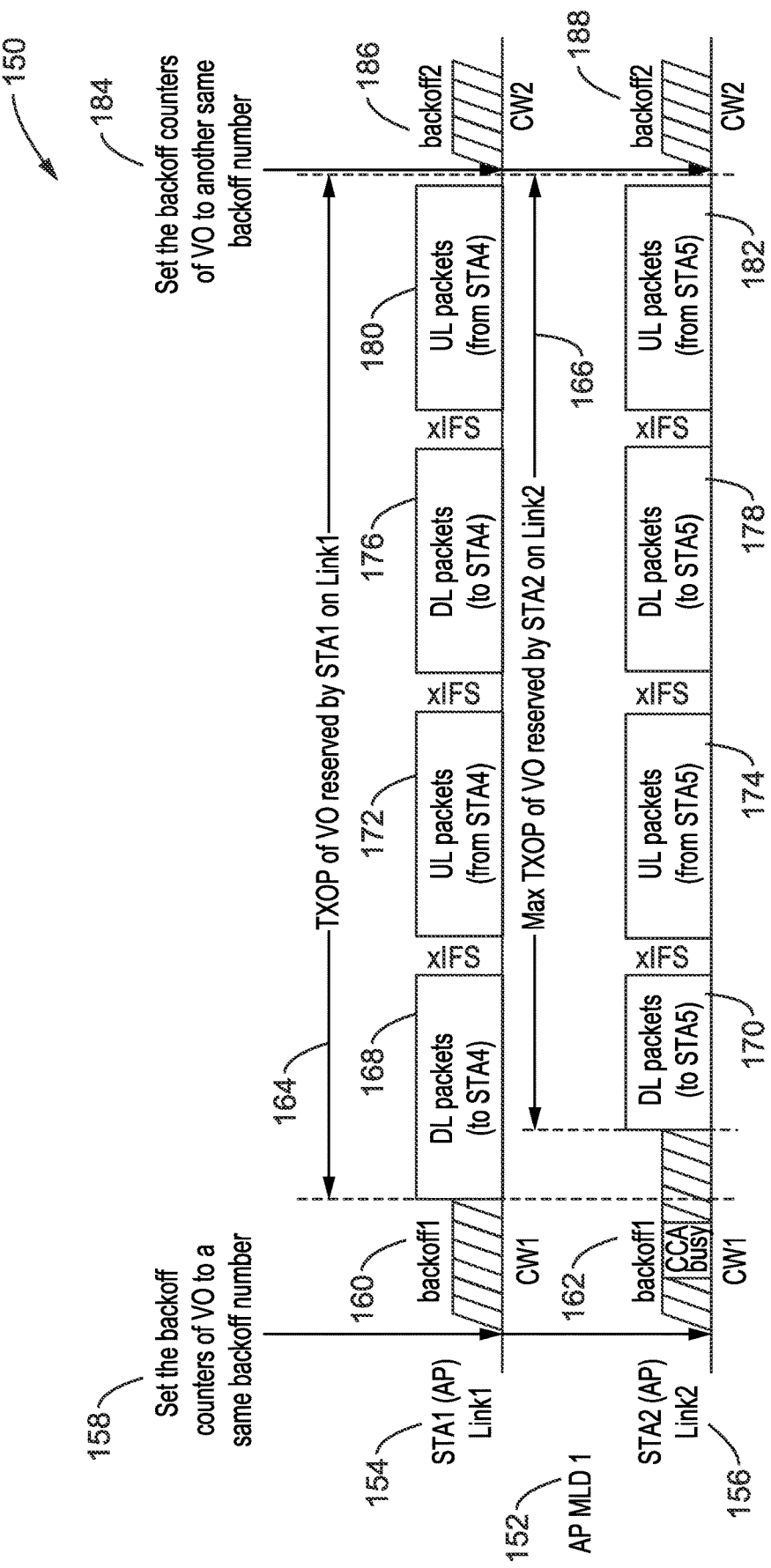
FIG. 12 is a communication sequence diagram of Example 1 for a STR AP MLD setting the backoff counters of an Access Category (AC) according to at least one embodiment of the present disclosure.

FIG. 12 illustrates an example embodiment 150 of an STR AP MLD setting the backoff counters of an AC, such as voice (VO), on its affiliated APs using option A as explained in Section 4.4 regarding block 76 of FIG. 8. The transmitters STA1 154, STA2 156 are affiliated with STR AP MLD1 152 and the receivers STA4, STA5 (not shown in this figure) are affiliated with non-STR non-AP MLD2. All the STAs of the AP MLD in this example use the same backoff slot time 158.

Transmitters STA1, STA2 are to transmit VO packets to receivers STA4, STA5 over Link1 and Link2, respectively. As shown in the figure, the contention window size of VO on STA1 and STA2 are $CW_1$ 160, 162 at the beginning. The STR AP MLD can set the backoff counters of VO on STA1 and STA2 to the same backoff number, for example backoff1, on Link1 and Link2 as was described in Section 4.4 regarding block 76 of FIG. 8. Backoff1 is randomly chosen between 0 and $CW_1$.

STA1 obtains channel access 164 on Link1, earlier than STA2 obtains channel 166, since STA2 pauses its backoff 162 due to CCA busy. As was described in reference to block 100 in FIG. 9A, STA1 reserves the TXOP of VO on Link1 and starts to transmit downlink (DL) and uplink (UL) packets. Later, STA2 gains channel access and reserves the TXOP of VO on Link2. It is seen in the figure that the end time of the two TXOPs is aligned. It should be noted that the TXOP duration reserved by STA2 could be shorter than that shown in the figure. The TXOP as shown in the figure represents the max TXOP duration it can reserve; as was described in reference to block 104 in FIG. 9B.

In the figure STA1 is seen downloading 168, 176 and uploading 172, 180 to/from STA4. STA2 is seen downloading 170, 178 and uploading 174, 182 to/from STA5. By way of example and not limitation, these transmissions are separated by xIFS intervals or other interframe spacing.

After STA1 and STA2 ends the TXOPs, they can reset the backoff counters of VO on STA1 and STA2 to the same backoff number 184 of VO, i.e., backoff2, if the contention window size of VO on STA1 and STA2 are the same. In this example the contention window sizes on both STAs are set to $CW_2$ 186, 188. As explained in Section 4.4 regarding block 76 of FIG. 8 backoff2 can be randomly chosen between 0 and $CW_2$.

Meanwhile, as shown in the figure, the packets in the figure can be aligned. That is, the start time or the end time of DL/UL packets on different links can be aligned; although it is not necessary.

5.2. STR AP MLD Setting Backoff Counters: Example 2

Figure 13:
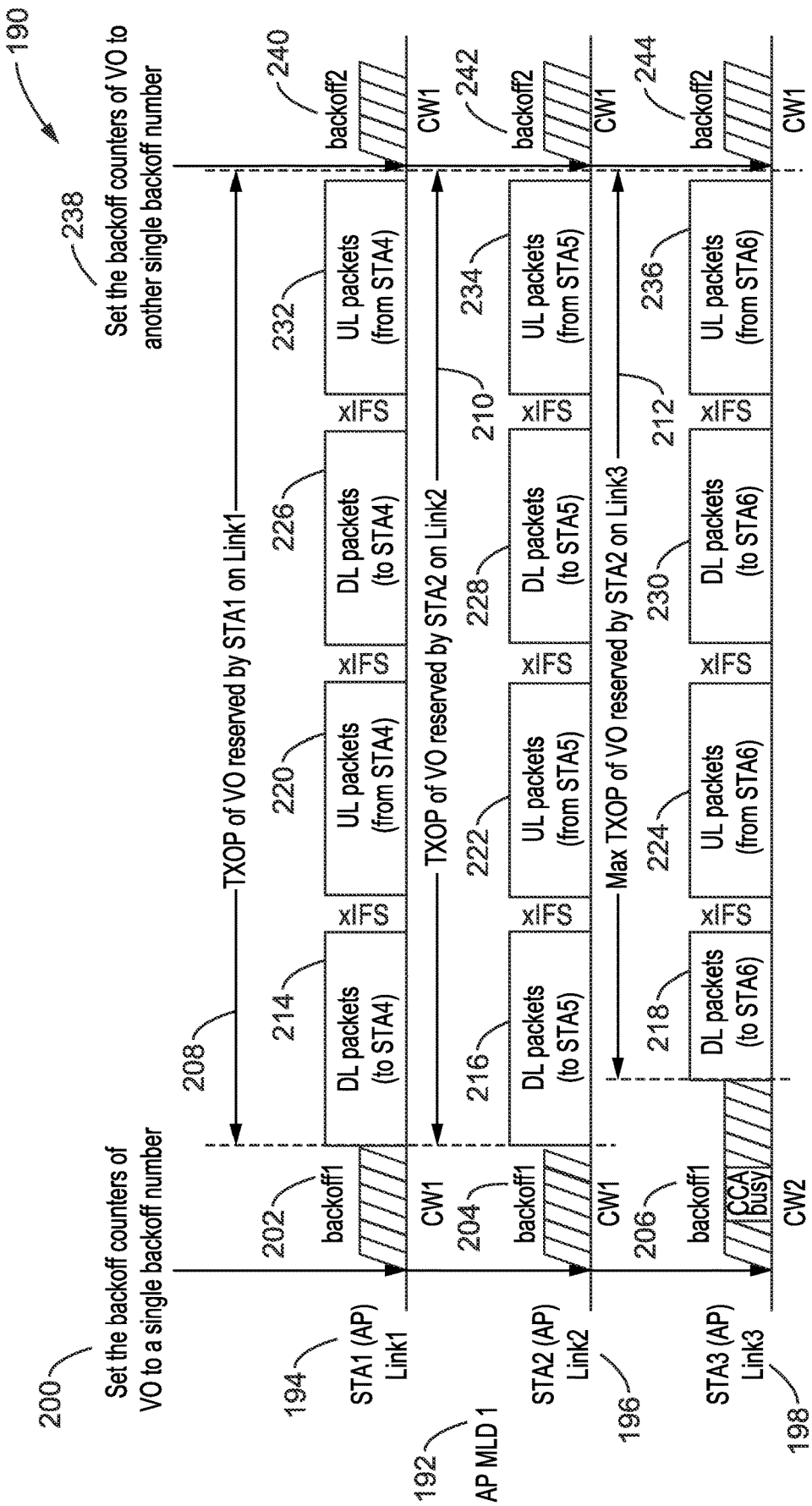
FIG. 13 is a communication sequence diagram of Example 2 for a STR AP MLD setting the backoff counter of an AC on the affiliated links according to at least one embodiment of the present disclosure.

FIG. 13 illustrates an example embodiment 190 of a second example, depicting a STR AP MLD setting the backoff counter of an AC on the affiliated links using option B as described in reference to block 78 in FIG. 8. The transmitters STA1 194, STA2 196 and STA3 198 are affiliated with STR AP MLD1 192 and the receivers STA4, STA5 and STA6 (not shown) are affiliated with the non-STR non-AP MLD2. All the STAs of AP MLD use the same backoff slot time 200.

Transmitters STA1, STA2, STA3 have VO packets to transmit to receivers STA4, STA5 and STA6 over Link1, Link2 and Link3, respectively. As shown in the figure, the contention window sizes of VO are $CW_1$ 202, 204 on STA1 and STA2, and $CW_2$ 206 on STA3 at the beginning. STR AP MLD sets the backoff counters of VO on STA1, STA2 and STA3 to a single backoff number, i.e., backoff1, as described for block 78 in FIG. 8. That is, backoff1 is a random value between 0 and $f(CW_1, CW_1, CW_2)$.

STA1 and STA2 obtain channel access 208, 210 on Link1 and Link2 at the same time. They reserve the same duration of TXOP of VO on Link1 and Link2 and start to transmit downlink (DL) and uplink (UL) packets. The TXOP reservations on Link1 and Link2 were previously described in reference to block 98 in FIG. 9A. STA3 gains channel access 212 later due to CCA busy, which was described in reference to block 94 in FIG. 9A and reserves the TXOP of VO on Link3.

The end times of the TXOPs in this case are aligned. It should be noted that the TXOP duration reserved by STA3 can be shorter than that which is shown in the figure. The TXOP as shown in the figure represents the max TXOP duration it can reserve. This was described in reference to block 104 in FIG. 9B.

DL and UL communications between STA1 and STA4 are seen 214, 220, 226 and 232; between STA2 and STA5 as 216, 222, 228 and 234; and between STA3 and STA6 as 218, 224, 230, and 236.

After the STAs end the TXOPs, they can generate another single backoff number 238, i.e., backoff2 240, 242, 244, for resetting the backoff counter of VO on STA 1, STA2 and STA3 and contending for channel access on Link1, Link2 and Link3. The value of backoff2 is a random value between 0 and f(CW$_1$, CW$_1$, CW$_1$).

Meanwhile, as shown in the figure, the protocol can align the packets, so that the start times and/or end times of DL/UL packets on different links are the same, as can be applied to many of the examples of the present disclosure. It is also possible to communicate the packets without alignment.

The contention window size on each link is updated independently according to EDCA rules defined in IEEE 802.11.

5.3. STR AP MLD Setting Backoff Counters: Example 3

Figure 14:
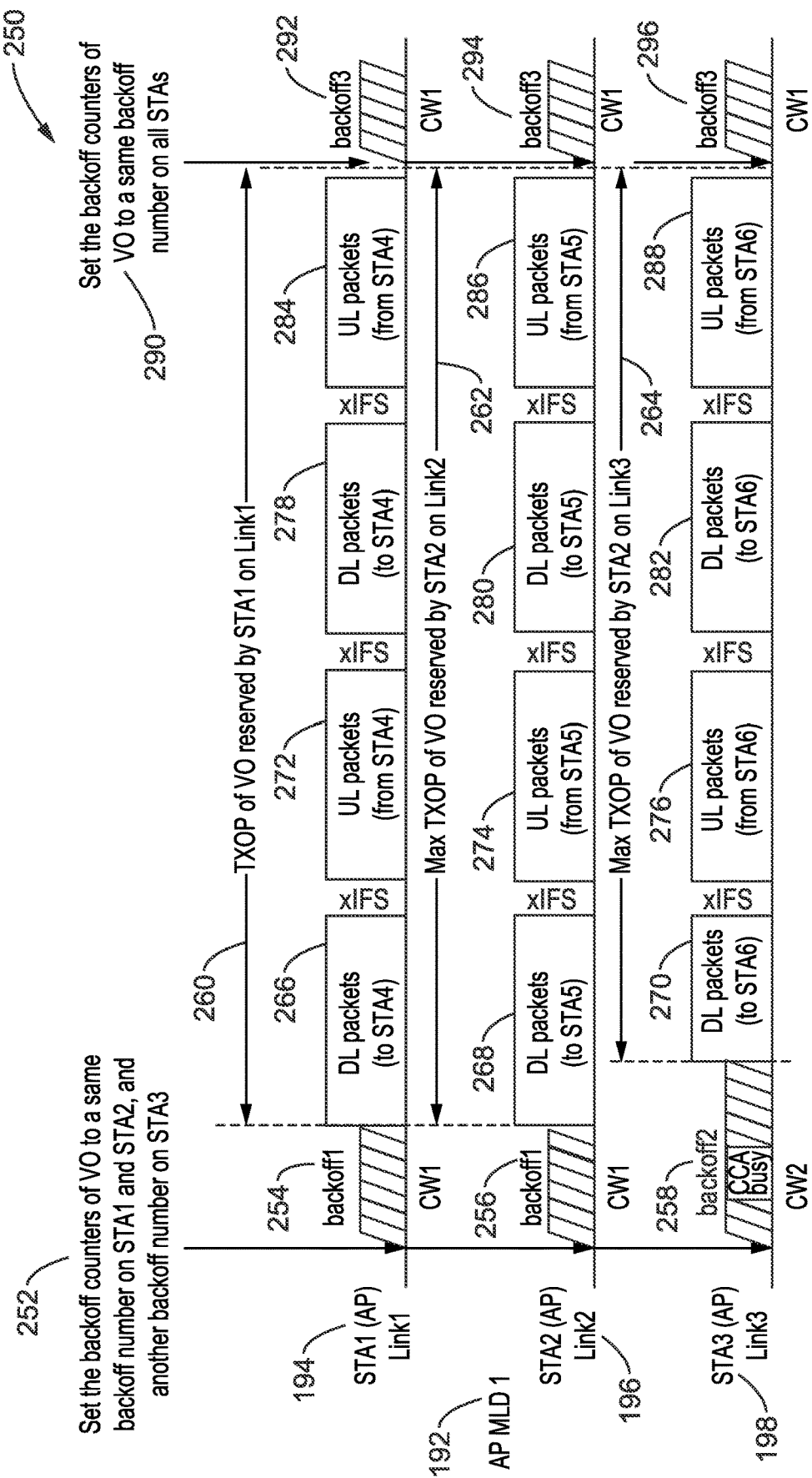
FIG. 14 is a communication sequence diagram of Example 3 for a STR AP MLD setting backoff counters of an AC on the affiliated STAs according to at least one embodiment of the present disclosure.

FIG. 14 illustrates an example embodiment 250 of a STR AP MLD setting backoff counters of an AC on the affiliated STAs using option A which was described in reference to block 76 of FIG. 8.

The transmitters STA1 194, STA2 196 and STA3 198 are affiliated with STR AP MLD1 192 and the receivers STA4, STA5 and STA6 (not shown) are affiliated with non-STR non-AP MLD2. All the STAs of AP MLD use the same backoff slot time 252.

Transmitters STA1, STA2, STA3 have VO packets to be transmitted to receivers STA4, STA5, and STA6 over Link1, Link2 and Link3, respectively. As shown in the figure, the contention window sizes of VO are CW$_1$ 254, 256 on STA1 and STA2, and CW$_2$ 258 on STA3 at the beginning. The STR AP MLD sets the backoff counters of VO on STA1 and STA2 to the same backoff number, i.e., backoff1, and sets the backoff counters of VO on STA3 to another backoff number, i.e., backoff2, which was described in reference to block 76 of FIG. 8. Backoff1 is randomly chosen between 0 and CW$_1$, and backoff2 is randomly chosen between 0 and CW$_2$.

STA1 and STA2 obtain channel access 260, 262 on Link1 and Link2, respectively, at the same time. STA1 and STA2 reserve the same duration of TXOP of VO on Link1 and Link2 and starts to transmit downlink (DL) and uplink (UL) packets. The TXOP reservation on Link1 and Link2 was previously described in reference to block 98 in FIG. 9A. Later, STA3 gains channel access 264 and reserves the TXOP of VO on Link3.

DL and UL communications are shown between STA1 and STA4 as 266, 272, 278 and 284; between STA2 and STA5 as 268, 274, 280 and 286; and between STA3 and STA6 as 270, 276, 282 and 288.

The end time of the TXOPs has been aligned in this example. It should be noted that the TXOP duration reserved by STA3 could be shorter than that shown in the figure. The TXOP as shown in the figure represents the max TXOP duration it can reserve; which was described in reference to block 104 in FIG. 9B.

After the STAs end the TXOPs, they can reset the backoff counters of VO on STA1, STA2 and STA3 for contending for channel access on Link1, Link2 and Link3. This time, since the contention window size of VO on the STAs of the AP MLD are the same, i.e., CW$_1$, their backoff counters of VO can be set to an identical backoff number 290, i.e., backoff3 292, 294 and 296.

Meanwhile, as shown in the figure, the packets in the figure can be aligned. That is, the start time or the end time of DL/UL packets on different links is the same. It is also possible that the packets can be communicated without the need of alignment.

The contention window size on each link is updated according to EDCA rules defined in IEEE 802.11, and performed independently.

5.4. STR AP MLD Setting Backoff Counters: Example 4

FIG. 15 illustrates an example embodiment 310 a STR AP MLD setting the same backoff number for the backoff counter of an AC on the affiliated STAs using option A which was described in reference to block 76 of FIG. 8 when one link is busy.

The transmitters STA1 314 and STA2 316 are affiliated with STR AP MLD1 312 and the receivers STA4, STA5 (not shown) are affiliated with non-STR non-AP MLD2. All the STAs of AP MLD use the same backoff slot time 318.

Transmitters STA1, STA2 have VO packets to be transmitted to receivers STA4, STA5 over Link1 and Link2, respectively. As shown in the figure, the contention window size on both STA1 and STA2 are CW$_1$ 322, 324 at the beginning. The STR AP MLD sets the backoff counter of VO on STA1 and STA2 to a same backoff number, i.e., backoff1, which was described in reference to block 76 of FIG. 8 even if STA2 senses that the channel is busy at that time as seen in this example. That is, backoff1 is randomly chosen between 0 and CW$_1$.

STA1 obtains channel access 326 on Link1 earlier than STA2 obtains channel access 328 since STA2 pauses its backoff 324 due to CCA busy 320. As was described in reference to block 100 in FIG. 9A, STA1 reserves the TXOP of VO on Link1 and starts to transmit downlink (DL) and uplink (UL) packets. Later, STA2 gains channel access and reserves the TXOP of VO on Link2. The end time of the two TXOPs is aligned. It should be noted that the TXOP duration reserved by STA2 can be shorter than that shown in the figure. The TXOP as shown in the figure represents the maximum TXOP duration that can be reserved; which was described in block 104 of FIG. 9B.

DL and UL communications between STA1 and STA4 are seen 330, 334, 338 and 342; and between STA2 and STA5 as 332, 336, 340 and 344. Meanwhile, as shown in the figure, the packets in the figure can be set up for alignment. That is, the start time and/or the end times of DL/UL packets on different links can be made to be the same. Although the communications can also be set up so that packets aligned is not necessary.

It is possible that only DL packets are transmitted during TXOP. It should be noted that packet alignment is optional. For example, when there are DL packets only during TXOP on multiple links, packet alignment is not needed.

5.5. STR AP MLD Setting Different Backoffs: Example 5

FIG. 16 illustrates an example embodiment 350 of a STR AP MLD setting different backoff numbers for the backoff counters of an AC on the affiliated STAs using option A which was described in reference to block 76 in FIG. 8 when one link is busy and the contention window sizes for an AC are different across multiple links.

The transmitters STA1 314, STA2 316 are affiliated with STR AP MLD1 312 and the receivers STA4, STA5 (not shown) are affiliated with non-STR non-AP MLD2. All the STAs of AP MLD use the same backoff slot time 352.

Transmitter STA1, STA2 have VO packets to transmit to receiver STA4, STA5 over Link1 and Link2, respectively. As shown in the figure, the contention window size is $CW_1$ 356 on STA1 and $CW_2$ 358 on STA2 at the beginning. The STR AP MLD sets the backoff counters of VO on STA1 and STA2 to different backoff numbers, which was described in reference to block 76 of FIG. 8, especially when STA2 senses that the channel is busy 354 at that time. The backoff number of VO on STA1, i.e., backoff1, is randomly chosen between 0 and $CW_1$. The backoff number of VO on STA2, i.e., backoff2, is randomly chosen between 0 and $CW_2$.

STA1 obtains channel access 360 on Link1 before STA2 obtains channel access 362, since STA2 pauses its backoff due to the CCA busy. As described in reference to block 100 in FIG. 9A, STA1 reserves the TXOP of VO on Link1 and starts to transmit downlink (DL) and uplink (UL) packets. Later, STA2 gains channel access and reserves the TXOP of VO on Link2. The end time of the two TXOPs is aligned in this case. It should be noted that the TXOP duration reserved by STA2 can be shorter than that shown in the figure. The TXOP as shown in the figure represents the maximum TXOP duration that can be reserved. This is described in reference to block 104 in FIG. 9B.

DL and UL communications between STA1 and STA4 are seen 364, 368, 372 and 376; and between STA2 and STA5 as 366, 370, 374 and 378.

Meanwhile, as shown in the figure, the packets in the figure can be aligned. That is, the start times and/or the end times of DL/UL packets on different links can be set to the same time. It is also possible that the packets need not be aligned and thus are not forced into alignment.

The DL/UL packets can comprise any types of data packets or management packets. It is possible that only DL packets are transmitted during TXOP. It should be noted that packet alignment is optional; for example, when there are DL packets only during TXOP on multiple links, packet alignment is unnecessary.

5.6. STR AP MLD Setting Backoff Counter: Example 6

FIG. 17 illustrates an example embodiment 390 of a STR AP MLD setting the backoff counter on one affiliated STA using option A which was described in reference to block 76 in FIG. 8 when another affiliated STA is continuing backoff on another link. The example shows the scenario when the STA on that link fails to obtain TXOP during the TXOP period on another link, which was described in reference to block 106 in FIG. 9B. The transmitters STA1 314, STA2 316 are affiliated with STR AP MLD1 312 and the receivers STA4, STA5 (not shown) are affiliated with non-STR non-AP MLD2. All the STAs of the AP MLD use the same backoff slot time 392.

Transmitters STA1, STA2 have VO packets to be transmitted to receivers STA4, STA5 over Link1 and Link2, respectively. The AP MLD sets the backoff counter of VO to a backoff number backoff1 394 on STA1 and backoff2 396 on STA2. Backoff1 is randomly chosen between 0 and $CW_1$; while Backoff2 is randomly chosen between 0 and $CW_2$.

STA1 obtains channel access 398 on Link1, yet STA2 pauses its backoff due to CCA busy 400. As was explained in relation to block 100 of FIG. 9A, STA1 reserves the TXOP of VO on Link1 and starts to transmit downlink (DL) and uplink (UL) packets. DL and UL communications between STA1 and STA4 are seen 402, 404, 406 and 408.

STA2 fails to gain channel access and reserve the TXOP of VO on Link2 before the end of the TXOP on Link1. The AP MLD can only reset the backoff counter 410 to a backoff number, e.g., backoff3, on STA1 and continue to countdown the backoff on STA2. Backoff3 412 is reset as a random value between 0 and $CW_3$.

The contention window sizes $CW_1$, $CW_2$ and $CW_3$ are updated according to EDCA rules defined in IEEE 802.11.

It should be noted that the backoff number, i.e., backoff1 and backoff2, set on Link1 and Link2 can be the same or different. It is also possible that backoff1 and backoff2 are set at different times.

5.7. STR AP MLD Setting Backoff Counters: Example 7

FIG. 18 illustrates an example embodiment 430 of a STR AP MLD setting the backoff counters of an AC on multiple affiliated STAs using option A, which was described in reference to block 76 in FIG. 8, when some of the STAs are counting down the backoff. Compared with Example 6, this example provides another option to reset the backoff counter of VO on all STAs after the TXOPs end.

The example shows the scenario when an affiliated STA fails to obtain TXOP during the TXOP period obtained by another affiliated STA on another link, which was explained in reference to block 106 in FIG. 9B. The transmitters STA1 314, STA2 316 are affiliated with STR AP MLD1 312 and the receivers STA4, STA5 (not shown) are affiliated with non-STR non-AP MLD2. All the STAs of AP MLD use the same backoff slot time 432.

Transmitter STA1 and STA2 have VO packets to be transmitted to receiver STA4, STA5 over Link1 and Link2, respectively. If the contention window size of VO on STA1, e.g., $CW_1$ 434 and the contention window size of VO on STA2, e.g., $CW_2$ 436, are the same, the backoff numbers set in the backoff counters of VO on STA1 and STA2, i.e., backoff1 and backoff2, are the same and their value is a random value between 0 and $CW_2$.

If $CW_1$ and $CW_2$ are different, the MLD can either set backoff1 to a random value between 0 and $CW_1$, and backoff2 to another random value between 0 and $CW_2$ which was described in reference to block 76 in FIG. 8, or set a single backoff number on both STA1 and STA2 as explained in block 78 of that same figure, the value of backoff1 and backoff2 is a random value between 0 and $f(CW_1, CW_2)$.

STA1 obtains the channel access 438 on Link1, but STA2 pauses its backoff due to CCA busy 442. As was explained in block 100 of FIG. 9A, STA1 reserves the TXOP 438 of VO on Link1 and starts to transmit downlink (DL) and uplink (UL) packets, after which the backoff is seen reset 450 to backoff3 452.

STA2, however, fails to obtain channel access and reserve the TXOP of VO on Link2 before the end of TXOP on Link1. As explained in relation to FIG. 8, the AP MLD can reset 450 the backoff counters on both links. The contention window size on Link2 does not change when its backoff is reset. That is, the contention window size on Link2 is still $CW_2$ 454 as shown in the figure.

The contention window sizes $CW_1$ 434 and $CW_3$ 452 on Link1 are updated according to EDCA rules defined in IEEE 802.11. The value of $CW_2$ 436, 454 does not change when the backoff of VO is reset on STA2.

It should be noted that the backoff number, i.e., backoff3 and backoff4, set by STA1 and STA2 can be the same or different when the backoff counter of VO are reset.

if the contention window size of VO on STA1, e.g., $CW_3$ and the contention window size of VO on STA2, e.g., $CW_2$, are the same, the backoff numbers set in the backoff counters of VO on STA1 and STA2, i.e., backoff3 and backoff4, are the same and their value is a random value between 0 and $CW_2$.

If $CW_3$ and $CW_2$ are different, the MLD can either set backoff3 to a random value between 0 and $CW_3$, and backoff4 to another random value between 0 and $CW_2$ which was described in reference to block 76 in FIG. 8, or set a single backoff number on both STA1 and STA2 as explained for block 78 in the same figure, the value of backoff3 and backoff4 is a random value between 0 and $f(CW_1, CW_2)$.

It is recommended that backoff4 is reset when the purpose of resetting the backoff is to allow the AP MLD the chance to gain channel access on multiple links at the same time. The AP MLD sets the same value to backoff3 and backoff4. The channel is idle on both Link1 and Link2, or the channel is busy on both links but will be idle at the same time in the future.

DL and UL communications between STA1 and STA4 are seen 440, 444, 446 and 448. The DL/UL packets can be any type of data or management packets. It is also possible that only DL packets are transmitted during TXOP.

5.8. STR AP MLD Reserving TXOPs: Example 8

Figure 19:
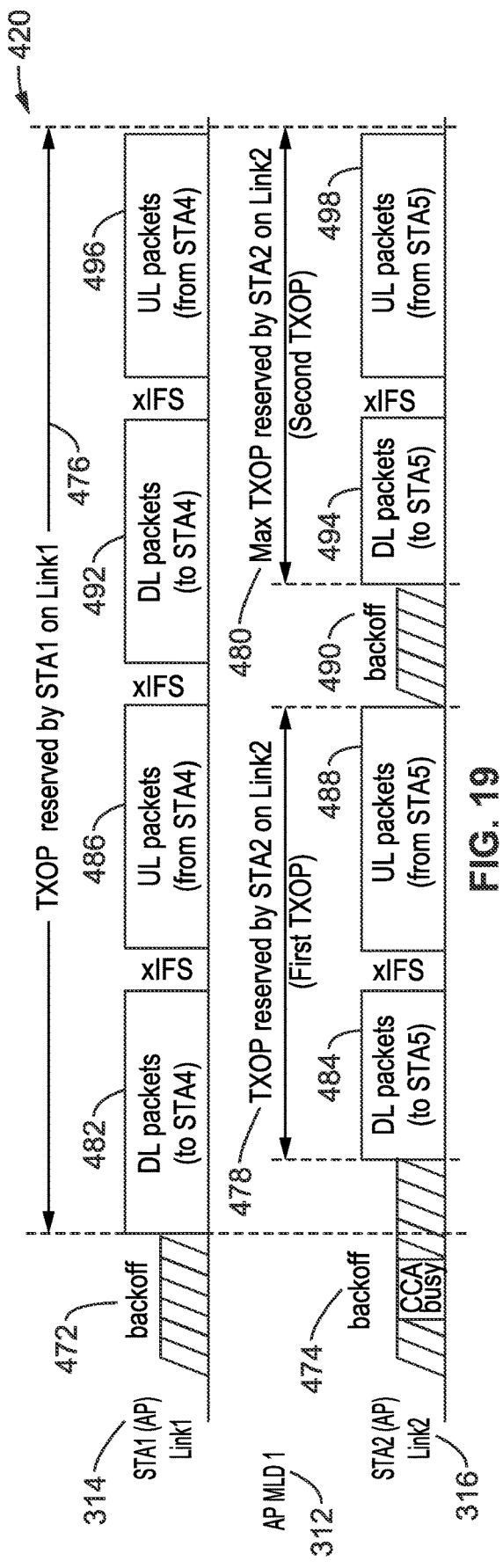
FIG. 19 is a communication sequence diagram of Example 8 for a STR AP MLD reserving TXOPs on multiple links according to at least one embodiment of the present disclosure.

FIG. 19 illustrates an example embodiment 420 of a STR AP MLD reserving TXOPs on multiple links when it can reserve multiple TXOPs on a link on condition that the total duration of TXOPs does not exceed the TXOP on other links. Transmitters STA1 314, STA2 316 are affiliated with STR AP MLD1 312 and the receivers STA4, STA5 (not shown) are affiliated with non-STR non-AP MLD2.

Transmitters STA1 and STA2 have packets to transmit to receivers STA4, STA5 over Link1 and Link2, respectively. Backoffs are seen for STA1 472, and for STA2 474, which is interrupted by a CCA busy condition. STA1 obtains channel access 476 on Link1 before STA2 obtains channel access 478. STA1 reserves the TXOP on Link1 and starts to transmit downlink (DL) 482, 492, and uplink (UL) packets 486, 496. STA2 gains channel access later and reserves the TXOP on Link2 before the end of TXOP on Link1. As described in reference to block 104 in FIG. 9B, STA2 is able to reserve a TXOP whose end time is earlier on Link2 than the TXOP on Link1.

After it finishes the TXOP on Link2, STA2 is seen in this example contending for the channel on Link2 with backoff 490 and reserving another TXOP 480. As shown in the figure, the second TXOP is reserved by STA2 on Link2 during the TXOP on Link1. It will be noted that the second TXOP reserved by STA2 on Link2 is not allowed to exceed the TXOP on Link1. When the maximum duration of the second TXOP is reserved on Link2, the end time of the TXOP on Link1 and the second TXOP on Link2 are aligned.

It should be noted that the end time of the second TXOP reserved by STA2 on Link2 can be earlier than the end time of TXOP on Link1. It should be noted that the TXOP can be reserved by any AC. Meanwhile, as shown in the figure, the packets in the figure can be aligned. That is, the start times and/or end times of the DL/UL packets on different links can be made to occur at the same time. However in other situations the packet alignment is not forced if it is unnecessary.

DL and UL communications between STA1 and STA4 are seen 482, 486, 492 and 496; between STA2 and STA5 as 484, 488, 494 and 498.

5.9. STR AP MLD Truncating TXOPs: Example 9

Figure 20:
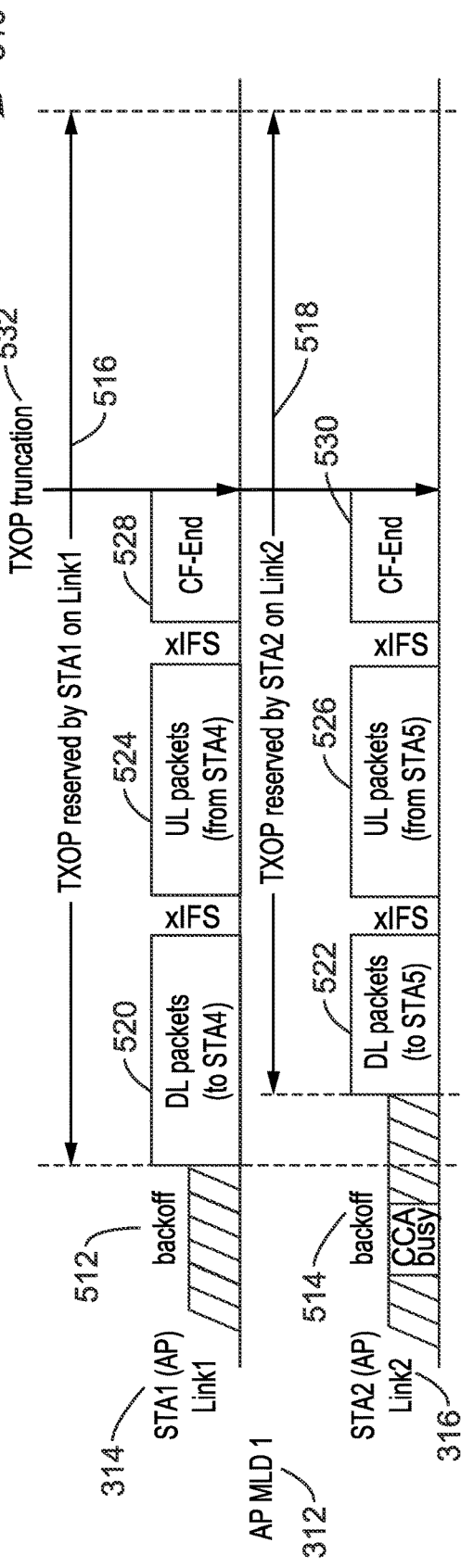
FIG. 20 is a communication sequence diagram of Example 9 for a STR AP MLD truncating TXOPs on multiple links according to at least one embodiment of the present disclosure.

FIG. 20 illustrates an example embodiment 510 of a STR AP MLD truncating TXOPs on multiple links. The transmitters STA1 314, STA2 316 are affiliated with STR AP MLD1 312 and the receivers STA4, STA5 (not shown) are affiliated with non-STR non-AP MLD2.

Transmitters STA1, STA2 are to transmit packets to receivers STA4, STA5 over Link1 and Link2, respectively. STA1 obtains channel access 516 on Link1 prior to STA2 obtaining channel access 518. As was described in reference to block 100 in FIG. 9A, STA1 reserves the TXOP on Link1 and starts to transmit downlink (DL) 520 and uplink (UL) 524 packets. STA2 gains channel access at a later time and reserves the TXOP 518 on Link2 until the end of TXOP on Link1 as explained in block 104 of FIG. 9B, and also transmits DL and UP packets 522, 526.

Before the reserved TXOP ends on these links, the STR AP MLD finishes the transmissions on Link1 and Link2. Then, the MLD can decide to transmit CF-End frames 528, 530 on both links to truncate 532 the TXOPs on both links at the same time; which can aid the non-AP MLD in contending for the channel on both links immediately after the TXOPs of STA1 and STA2 end.

It should be noted that the end time of the second TXOP reserved by STA2 on Link2 can be earlier than the end time of TXOP on Link1. It should be noted that the TXOP can be reserved by any AC. Meanwhile, as shown in the figure, the packets in the figure can be aligned wherein the start times and/or end times of DL/UL packets on different links are made to occur at the same time. The packets need not be made to align when it is unnecessary.

The CF-End frames sent by the AP MLD can be replaced by any packets that can be used to truncate the TXOP.

5.10. STR AP MLD Truncating TXOPs on Multi-Links: Example 10

Figure 21:
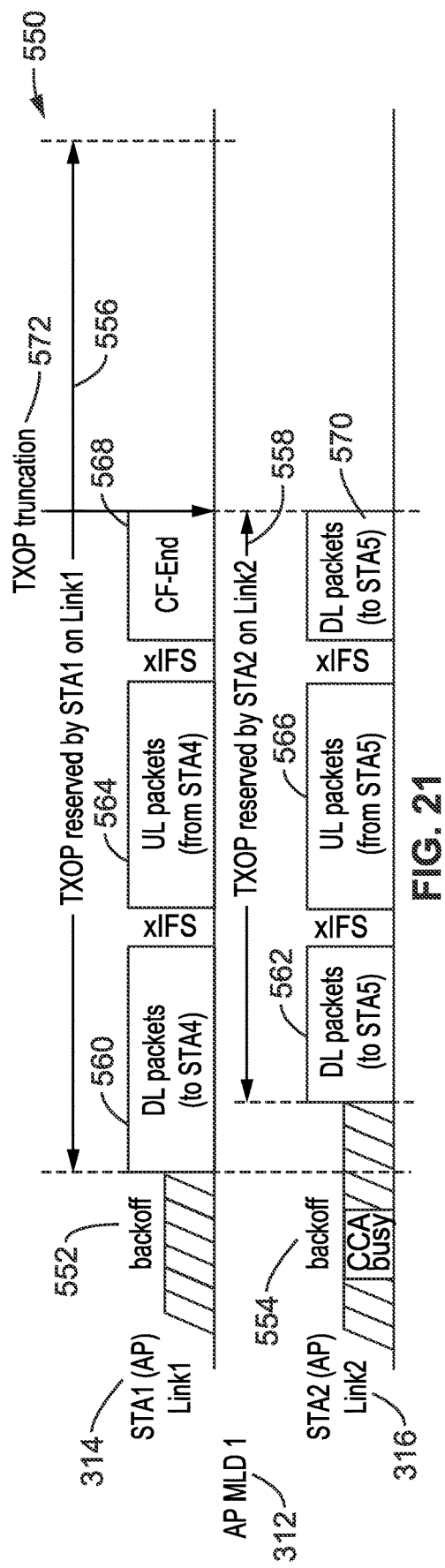
FIG. 21 is a communication sequence diagram of Example 10 for a STR AP MLD truncating TXOPs across multiple links according to at least one embodiment of the present disclosure.

FIG. 21 illustrates an example embodiment 550 of a STR AP MLD truncating TXOPs across multiple links. The transmitters STA1 314, STA2 316 are affiliated with STR AP MLD1 312 and receivers STA4, STA5 (not shown) are affiliated with non-STR non-AP MLD2.

Transmitters STA1, STA2 have packets to be transmitted to receivers STA4, STA5 over Link1 and Link2, respectively. After backoff 552 STA1 obtains channel access 556 on Link1. As was described in reference to block 100 in FIG. 9A. STA2 after its backoff 554 which is seen interrupted by a CCA busy, obtains channel access 558 later than STA1, and communicates DL and UL packets 562, 566 and starts communicating another packet 570, when STA1 determines to truncate 572 the TXOP on Link1 at that same time by sending a CF-End frame 568 on Link1, thus ending the TXOP early. An early TXOP benefits the non-AP MLD as it may afterward contend for the channel on both links immediately after the TXOPs of STA1 and STA2 end.

It should be noted that the TXOP can be reserved by any AC. As shown in the figure, the packets in the figure can be aligned with the start times and/or end times of DL/UL packets on different links being made to occur at the same time. The present disclosure also provides for the communication of packets which are not aligned, when alignment is not necessary.

It should be appreciated that the described CF-End frames sent by the AP MLD can be replaced by any packets that can be used to truncate the TXOP.

5.11. STR AP MLD Reserving TXOPs on Multi-Links: Example 11

Figure 22:
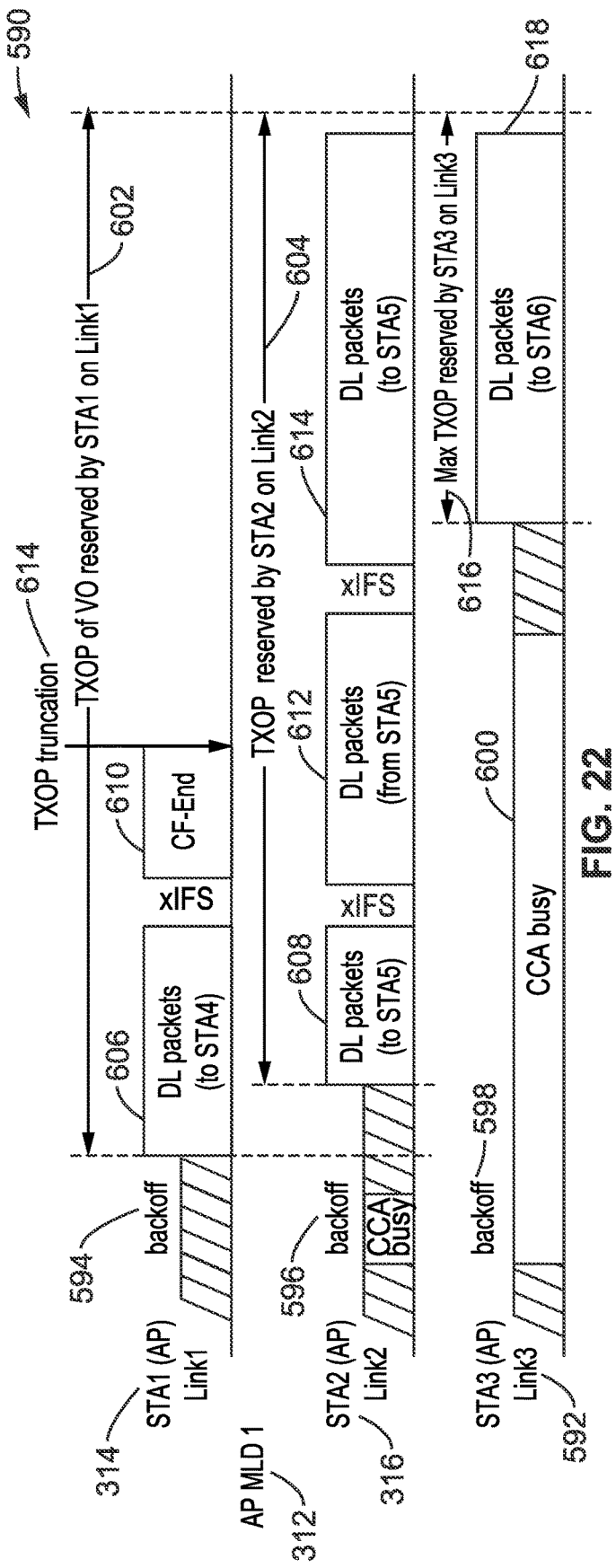
FIG. 22 is a communication sequence diagram of Example 11 for a STR AP MLD reserving TXOPs on multiple links when one TXOP on a link is truncated according to at least one embodiment of the present disclosure.

FIG. 22 illustrates an example embodiment 590 of a STR AP MLD reserving TXOPs on multiple links when one TXOP on a link is truncated. The transmitters STA1 314, STA2 316 and STA3 592 are affiliated with STR AP MLD1 312 and receivers STA4, STA5 and STA6 (not shown) are affiliated with non-STR non-AP MLD2.

Transmitters STA1, STA2, STA3 have packets to transmit to receivers STA4, STA5 and STA6 over Link1, Link2 and Link3, respectively. The three stations contend 594, 596 and 598 for channel access. STA1 obtains channel access 602 on Link1 first and reserves TXOP on Link1. STA2 obtains channel access 604 on Link2 later than STA1, because of a CCA busy during its backoff 596.

When STA1 reserves TXOP on Link1, the TXOP on Link1 ends earlier than the TXOP on Link1. After this point in time STA3 is seen gaining channel access 616 reserving the TXOP on Link3 after encountering CCA busy 600.

Before STA3 gains access, STA1 has commenced to truncate its TXOP on Link1, such as by sending a CF-End 610 or similar. It should be appreciated that the CF-End frames sent by the AP MLD can be replaced by any packets that can be utilized to truncate the TXOP.

The AP MLD in this example only owns (controls) the TXOP on Link2, thus according to the description of block 104 in FIG. 9B, the TXOP on Link2 is the only existing TXOP. Therefore, the TXOP on Link2 is not truncated. In addition, when STA3 reserved the TXOP on Link3, it could not reserve the TXOP on Link3 for a period that exceeds the TXOP on Link2. That is, the end time of the TXOP on Link3 should be the same or earlier than the end time of TXOP on Link2.

As shown in the figure, the packets can be aligned as desired with the start times and/or end times of DL/UL packets on different links being made to occur at the same time. Alignment, however, is not required by the protocol when it is unnecessary.

DL and UL communications between STA1 and STA4 are seen 606; between STA2 and STA5 as 608, 612 and 614; and between STA3 and STA6 as 618. The DL/UL packets can comprise any desired types of data or management packets. The protocol allows for condition in which only DL packets are transmitted during a TXOP. It should be noted that packet alignment is optional; for instance in the situation in which there are only DL packets during a TXOP across multiple links and packet alignment is unnecessary.

The contention window size on each link is updated according to EDCA rules defined in IEEE 802.11, and performed independently.

5.12. STR AP MLD Extending TXOPs on Multi-Links: Example 12

Figure 23:
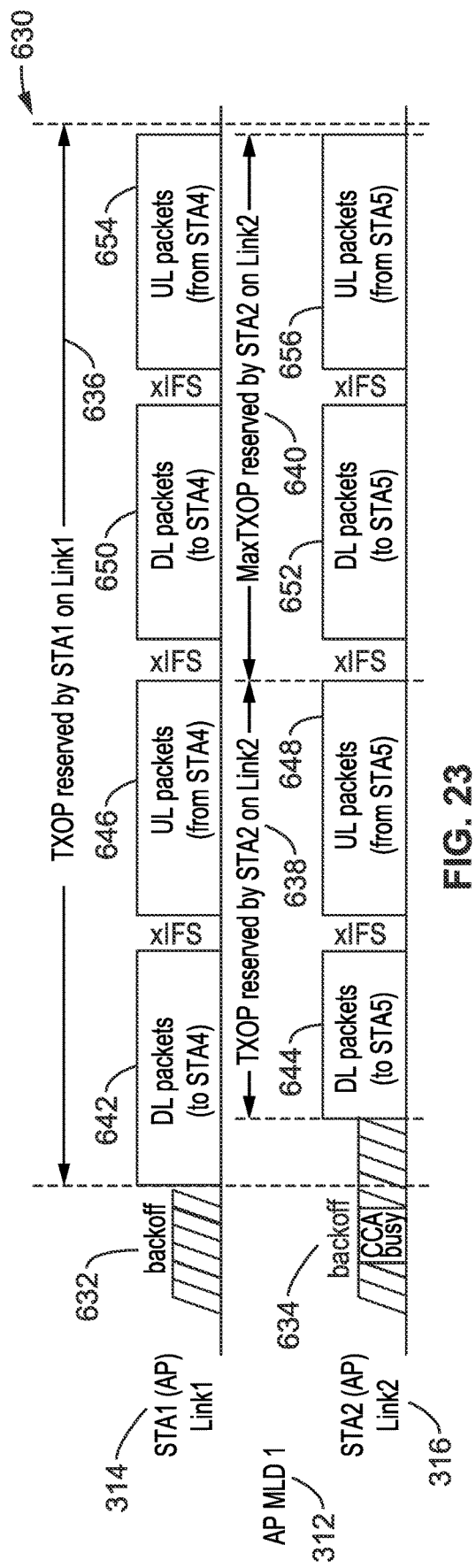
FIG. 23 is a communication sequence diagram of Example 12 for a STR AP MLD extending TXOPs on multiple links according to at least one embodiment of the present disclosure.

FIG. 23 illustrates an example embodiment 630 of a STR AP MLD extending TXOPs on multiple links. The transmitters STA1 314, STA2 316 are associated with an STR AP MLD 312 and the receivers STA4, STA5 (not shown) are affiliated with a non-STR non-AP MLD.

Transmitters STA1, STA2 have packets to transmit to receivers STA4, STA5 over Link1 and Link2, respectively. As was described in reference to block 100 in FIG. 9A, STA1 obtains channel access 636 on Link1 earlier than STA2 obtains channel access 638. STA1 reserves the TXOP on Link1 and starts to transmit downlink (DL) and uplink (UL) packets 642, 646, 650 and 654. STA2 gains the channel access slightly later and reserves the TXOP 638 on Link2 and communicates packets 644, 648 with STA5. TXOP 638 ends earlier than the end time of TXOP 636 on Link1; which is allowed as described in reference to block 104 in FIG. 9B.

After STA2 reserves the TXOP on Link2, it decides to extend the TXOP duration; and can extend 640 the TXOP duration until the end of TXOP on Link1. It should be noted that the end time of the TXOP extension reserved by STA2 on Link2 can still be earlier than the end time of the TXOP on Link1. This was described in reference to block 118 in FIG. 10. So the figure shows STA2 with a TXOP extension 640 whose maximum is the end of the packet transmissions on the TXOP for this link. In this extended TXOP duration STA2 is seen communicating packet groups 652, 656 with STA5.

It should be noted that the TXOP can be reserved by any AC, and not just for VO as exemplified. DL/UL packets in these communications can be aligned having start and/or end times on different links which are at the same time, although it is not always necessary to align the packets. The DL/UL packets can comprise any type of data packets or management packets.

It is possible that only DL packets are transmitted during TXOP. It should be noted that packet alignment is optional; for example in the situation where there are only DL packets during the TXOP on multiple links, then packet alignment is unnecessary.

5.13. STR AP MLD CTS-to-Self Reserving TXOP: Example 13

Figure 24:
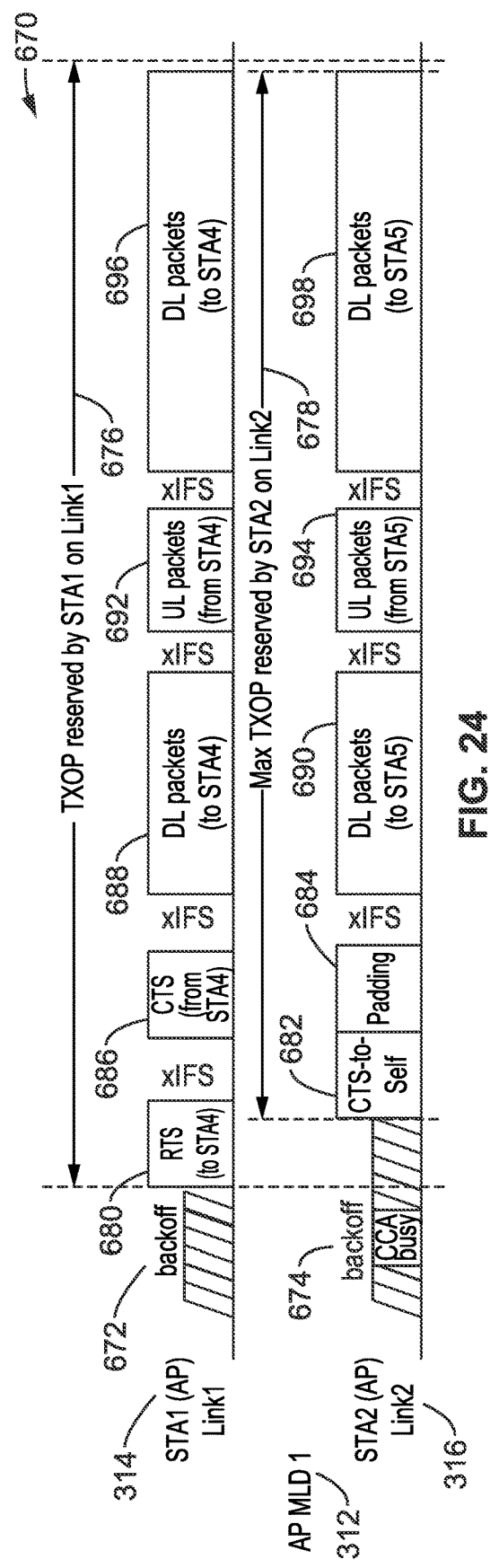
FIG. 24 is a communication sequence diagram of Example 13 for a STR AP MLD using CTS-to-Self frame to reserve TXOP on a link according to at least one embodiment of the present disclosure.

FIG. 24 illustrates an example embodiment 670 of a STR AP MLD using CTS-to-Self frame to reserve TXOP on a link. The transmitters STA1 314, STA2 316 are affiliated with an STR AP MLD 312 and the receivers STA4, STA5 (not shown) are affiliated with a non-STR non-AP MLD.

Transmitters STA1, STA2 have packets to be transmitted to receivers STA4, STA5 over Link1 and Link2, respectively. As explained in reference to block 100 of FIG. 9A, STA1 performs a backoff 672 and obtains channel access on Link1 earlier than STA2. STA1 reserves the 676 TXOP on Link1 and starts to transmit packets, commencing with an RTS frame 680 to STA4, and receives a CTS 686 back from STA4.

After a backoff 674, shown interrupted by a CCA busy, STA2 obtains channel access somewhat later than STA1 and reserves TXOP 678 on Link2 whose end time is earlier than the end time of TXOP on Link1, as described in reference to block 104 in FIG. 9B.

When STA2 gains channel access on Link2, it decides to send a CTS-to-Self frame 682 to reserve TXOP 678 on Link2 since there is an UL packet (i.e., CTS frame) on Link1 within a CTS-to-Self transmission time. When STA2 transmits CTS-to-Self frame, STA1 is receiving UL packets from STA4. No issue arises if STA2 itself, or STA5, does not hear this CTS-to-Self frame, since the other STAs on Link2 will hear the CTS-to-Self frame and set the NAV.

As shown in the figure, STA2 can add padding 684 after the CTS-to-Self frame to align the packets on Link1 and Link2. After this STA2 communicates packets 690, 694 and 698.

5.14. STR AP MLD CTS-to-Self Reserving TXOP: Example 14

Figure 25:
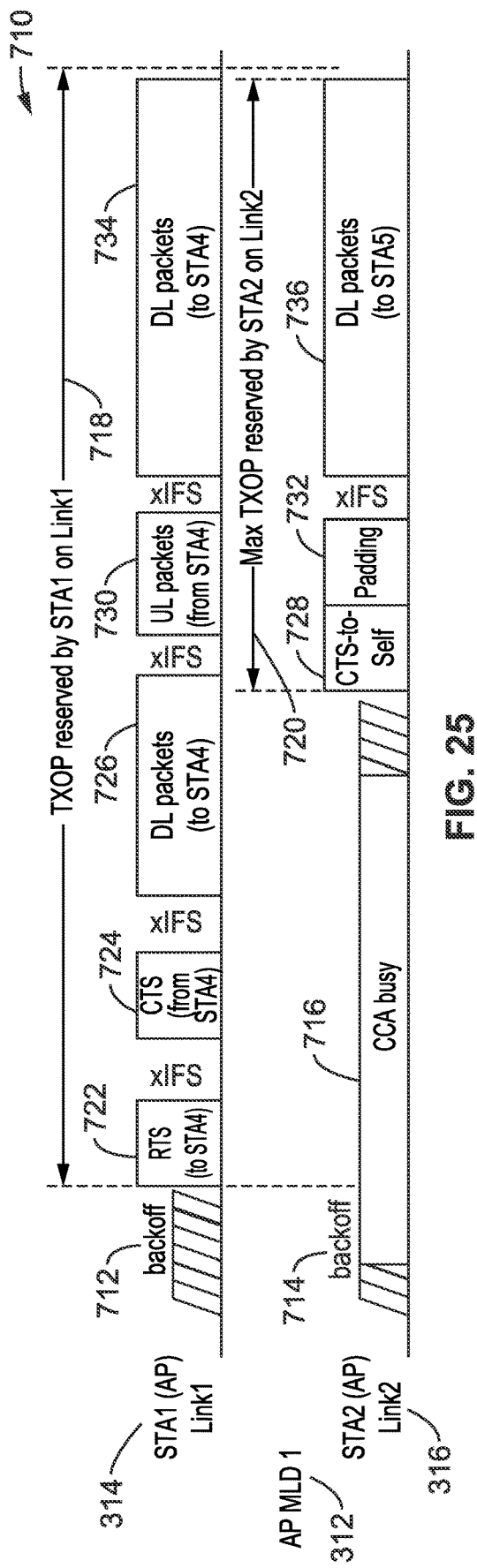
FIG. 25 is a communication sequence diagram of Example 14 for a STR AP MLD using CTS-to-Self frame to reserve TXOP on a link according to at least one embodiment of the present disclosure.

FIG. 25 illustrates an example embodiment 710 of a STR AP MLD using a CTS-to-Self frame to reserve TXOP on a link. The network topology of this example is shown in FIG. 7. The transmitters STA1 314, STA2 316 are affiliated with an STR AP MLD 312 and the receivers STA4, STA5 (not shown) are affiliated with a non-STR non-AP MLD.

Transmitters STA1, STA2 have packets to be transmitted to receivers STA4, STA5 over Link1 and Link2, respectively. As described in reference to block 100 in FIG. 9A, STA1 performs a backoff 712 and obtains channel access on Link1 earlier than STA2. STA1 reserves TXOP 718 on Link1 using RTS/CTS exchange 722, 724 and starts to transmit downlink (DL) and uplink (UL) packets 726, 730 and 734. STA2 performs a backoff 714 and finds CCA busy 716 and then gains channel access and reserves the TXOP 720 on Link2 whose end time is earlier than the end time of the TXOP on Link1. This is allowed as was described in block 104 of FIG. 9B.

When STA2 gains channel access on Link2, it decides to use CTS-to-Self frame 728 to reserve the TXOP 720 on Link2 since there is UL packets on Link1 within a CTS-to-Self transmission time. When STA2 transmits a CTS-to-Self frame, STA1 is sending DL packets to STA4. However, there are UL packets scheduled, which will start during the CTS-to-Self transmission time. No issue arises if STA5 doesn't hear this CTS-to-Self frame, as the STAs on Link2 will hear the CTS-to-Self frame and set the NAV.

As shown in the figure, STA2 can add padding 732 after the CTS-to-Self frame to align the packets on Link1 and Link2. STA2 then transmits packets 736. It should be noted that the TXOP can be reserved by any AC. The DL/UL packets can be any type of data packets or management packets.

5.15. STR AP MLD CTS-to-Self Reserving TXOP: Example 15

Figure 26:
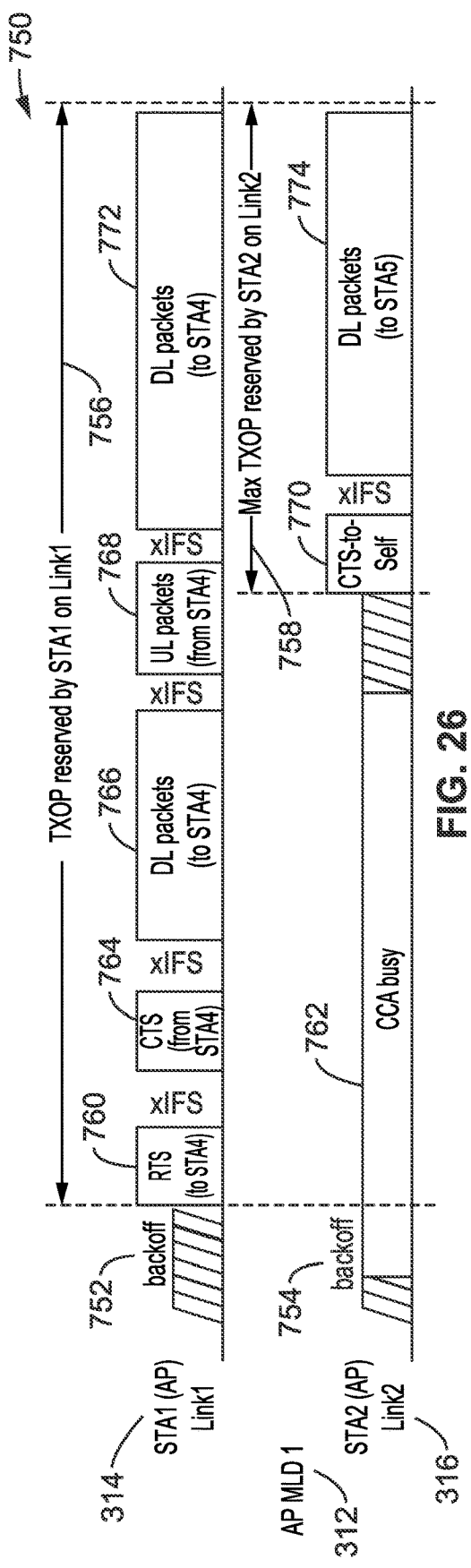
FIG. 26 is a communication sequence diagram of Example 15 for a STR AP MLD using CTS-to-Self frame to reserve TXOP on a link according to at least one embodiment of the present disclosure.

FIG. 26 illustrates an example embodiment 750 of a STR AP MLD using CTS-to-Self frame to reserve TXOP on a link. The transmitters STA1 314, STA2 316 are associated with STR AP MLD 312 and the receivers STA4, STA5 (not shown) are affiliated with a non-STR non-AP MLD.

Transmitters STA1, STA2 have packets to be transmitted to receivers STA4, STA5 over Link1 and Link2, respectively. As described in reference to block 100 in FIG. 9A, STA1 obtains the channel access on Link1 earlier than STA2. STA1 reserves TXOP 756 on Link1 using RTS/CTS exchange 760, 764 and starts to transmit downlink (DL) and uplink (UL) packets 766, 768 and 772. STA2 performs backoff 754 and finds CCA busy 762, after which it gains channel access and reserves TXOP 758 on Link2 whose end time is earlier than the end time of TXOP on Link1. This is allowed as was described in reference to block 104 in FIG. 9B.

When STA2 gains channel access on Link2, it decides to use CTS-to-Self frame 770 to reserve the TXOP on Link2 at the time where there are UL packets transmitting on Link1. When STA2 transmits CTS-to-Self frame, STA1 is receiving UL packets from STA4. It is not an issue that STA1 does not hear this CTS-to-Self frame, since other STAs on Link2 will hear the CTS-to-Self frame and set the NAV.

When STA2 finishes sending the CTS-to-Self frame, STA1 is transmitting DL packets in Link1, therefore padding does not need to be added to the end of the CTS-to-Self frame.

It should be noted that the TXOP can be reserved by any AC. The DL/UL packets being communicated can comprise any types of data or management packets.

5.16. STR AP MLD Accessing Links: Example 16

Figure 27:
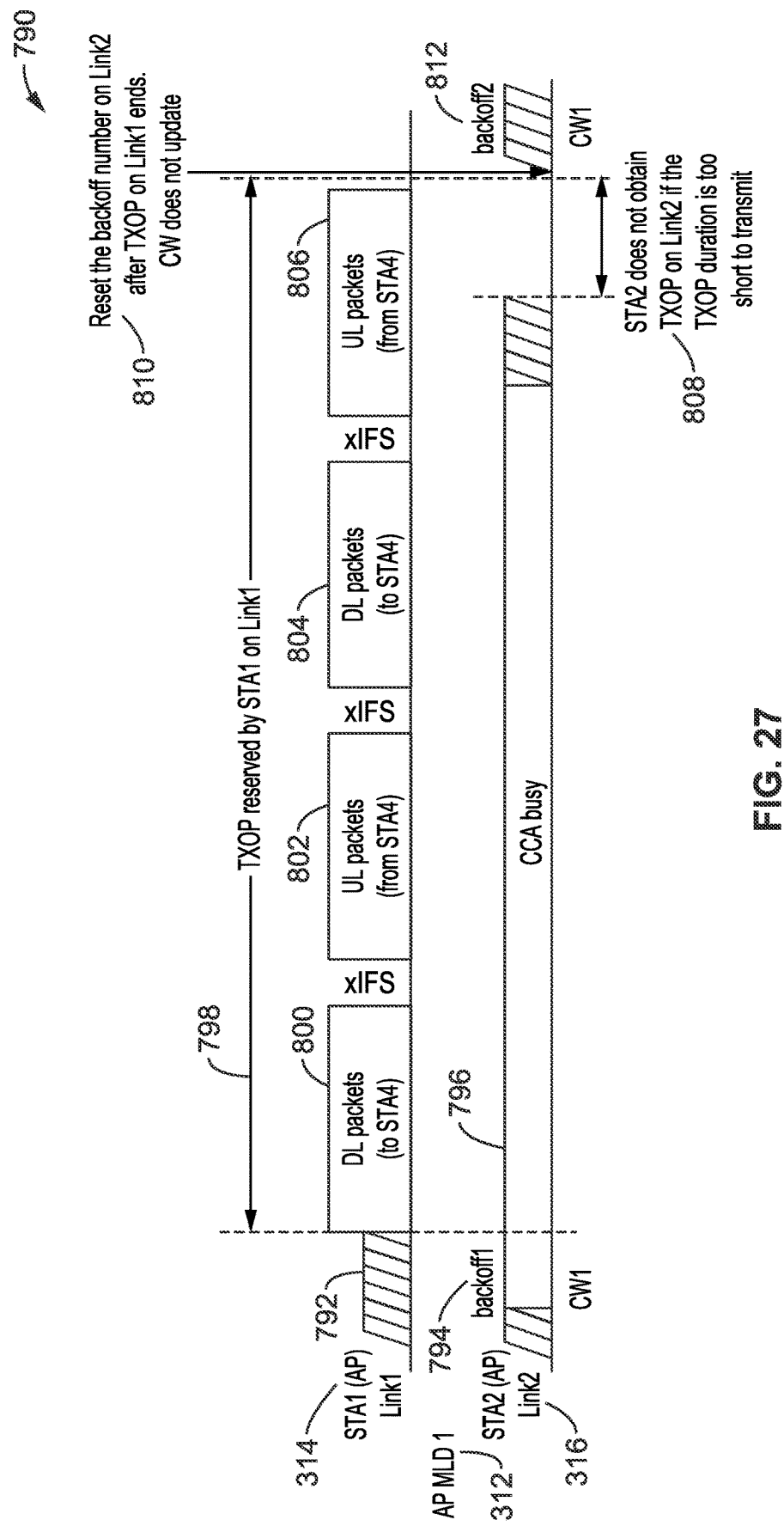
FIG. 27 is a communication sequence diagram of Example 16 for a STR AP MLD accessing Link1 and Link2 when STA2 gains channel access on Link2 but it cannot reserve enough TXOP duration for its transmission on Link2 according to at least one embodiment of the present disclosure.

FIG. 27 illustrates an example embodiment 790 of a STR AP MLD accessing Link1 and Link2 when STA2 gains channel access on Link2 but it cannot reserve a sufficient TXOP duration for its transmission on Link2.

Transmitters STA1 314, STA2 316 are affiliated with an STR AP MLD 312 and the receivers STA4, STA5 (not shown) are affiliated with a non-STR non-AP MLD. Transmitters STA1, STA2 have packets to transmit to receivers STA4, STA5 over Link1 and Link2, respectively. As was described in block 100 of FIG. 9A, STA1 obtains the channel access on Link1 earlier than STA2.

After a backoff 792, STA1 reserves TXOP 798 on Link1 and starts to transmit packets 800, 802, 804 and 806. STA2 performs a backoff 794 and finds CCA busy 796. When it is finally able to gain channel it is unable to transmit packets because the duration of time remaining in the TXOP is insufficient 808 for transmitting packets. As STA2 could not obtain the TXOP on Link2, it resets the backoff number 810 and STA2 generates backoff2 812 on Link2 after the end of TXOP 798 on Link1.

It this case the contention window size need not be changed due to STA2 giving up on obtaining the TXOP on link2. As shown in the figure, when backoff1 and backoff2 are generated, the contention window size, e.g., CW1 may not change. It should be noted that backoff1 and backoff2 are for the same AC. It should be noted that the TXOP can be reserved by any AC. The DL/UL packets can comprise any types of data or management packets.

5.17. STR AP MLD Accessing Links: Example 17

FIG. 28 illustrates an example embodiment 830 of a STR AP MLD accessing Link1 and Link2 when STA2 gains the channel access on Link2; however, it is unable to reserve a sufficient TXOP duration for its transmission on Link2.

Transmitters STA1 314, STA2 316 are affiliated with an STR AP MLD 312 and the receivers STA4, STA5 (not shown) are affiliated with a non-STR non-AP MLD. Transmitters STA1, STA2 have packets to be transmitted to receivers STA4, STA5 over Link1 and Link2, respectively. As described in reference to block 100 in FIG. 9A, STA1 obtains channel access on Link1 earlier than STA2.

STA1 performs a backoff 832 and reserves TXOP 838 on Link1 and starts to transmit packets 840, 842, 844, 846. STA2 performs a backoff 874 at the same time as STA1, but encounters CCA busy 836. In this case STA2 finally gains channel access near the end of the TXOP and the allowed TXOP duration is too short to transmit packets, so STA2 resets 848 the backoff on Link2 immediately, with backoff2 850 seen in the figure.

In this case the contention window size may not change due to STA2 giving up on obtaining TXOP on link2. As shown in the figure, when backoff1 and backoff2 are generated, the contention window size, e.g., $CW_1$, does not change. It should be noted that backoff1 and backoff2 are for the same AC. It should be noted that the TXOP can be reserved by any AC. The DL/UL packets can comprise any types of data packets or management packets.

5.18. STR AP MLD Use of a Third MLD: Example 18

Figure 30:
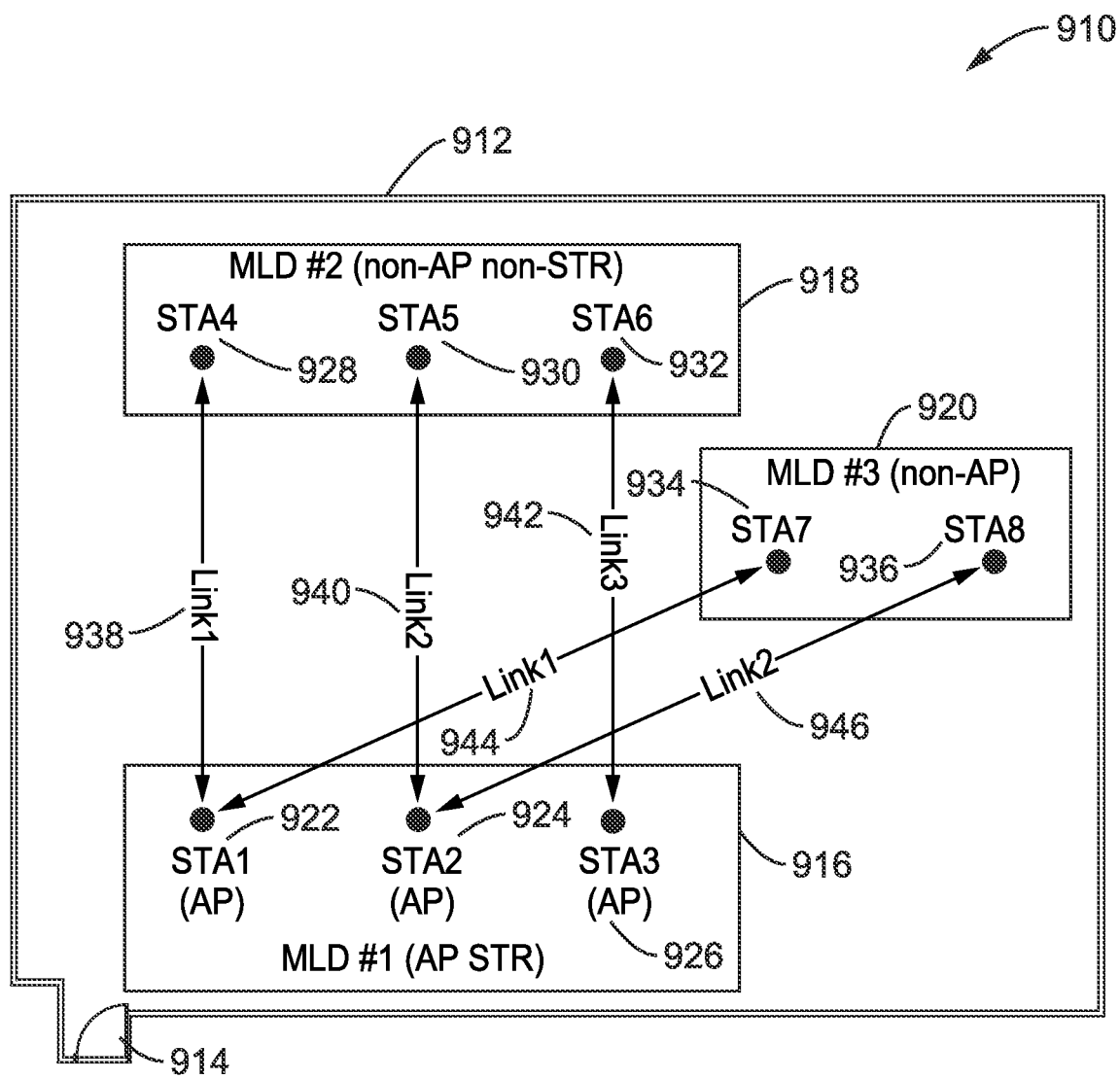
FIG. 30 is a block diagram of a third Multi-Link Device (MLD) embodiment as utilized according to at least one embodiment of the present disclosure.

FIG. 29 and FIG. 30 illustrate an example embodiment 870, 910 of a use example and topology utilizing a third MLD.

The discussions of the disclosed technology have illustrated how a STR AP MLD accesses a channel and reserves TXOPs on multiple links to communicate with a non-STR non-AP MLD. However, when an AP MLD is associated with one non-STR non-AP MLD and other non-AP MLDs, the AP MLD can contend for the channel and obtain TXOPs on multiple links for communicating with different MLDs.

As shown in FIG. 30 MLD1 916 (with STA1 922, STA2 924 and STA3 926) and MLD2 918 (with STA4 928, STA5 930 and STA6 932) having Link1 938, Link2 940 and Link3 942, which are the same as shown in the network topology in FIG. 7.

However, in FIG. 30 there is a 3rd MLD 920, (MLD3) which is associated with AP MLD1. STA7 934 and STA8 936 of MLD3 920 associate with STA1 922 and STA2 924 of MLD1 on Link1 944 and Link2 946, respectively. It should be appreciated that MLD3 is shown by way of example and not limitation as a wide range of MLD configurations can be utilized to incorporate additional MLDs without departing from the teachings of the present disclosure.

As described in reference to block 104 in FIG. 9B, when a STR AP MLD (e.g., MLD1) accesses a new link for transmission to a non-STR non-AP MLD (e.g., MLD2), the TXOP reservation on the new link shall not exceed any reserved TXOPs of the AP MLD on other links for transmissions to the non-STR non-AP MLD (e.g., MLD2). When STR AP MLD (e.g., MLD1) accesses a new link for transmission to non-STR non-AP MLD (e.g., MLD2), it is possible that the TXOP reservation on the new link is not affected by its reserved TXOPs on other links for transmissions to the different non-AP MLD (e.g., MLD3). That is, the TXOP reservations on some links for the STR AP MLD communicating with the non-STR non-AP MLD are not affected by the TXOP reservation on some other links for the STR AP MLD communicating with the different non-AP MLDs.

In FIG. 29 the transmission scheme is shown having STA 1 314, and STA2 316 associated with MLD1 312. STA1 and STA2 perform backoffs 872, 874. STA1 reserves TXOP 876 on Link1 first for the transmission with STA7, and the TXOP 880 is reserved by STA2 on Link2 for the transmission with STA5 which can exceed the TXOP on link1. STA1 and STA2 are seen communicating packets 878, 884, 888, 892, 882, 886 and 890.

5.19. MLD Setting Backoff Counters: Example 19

Figure 31:
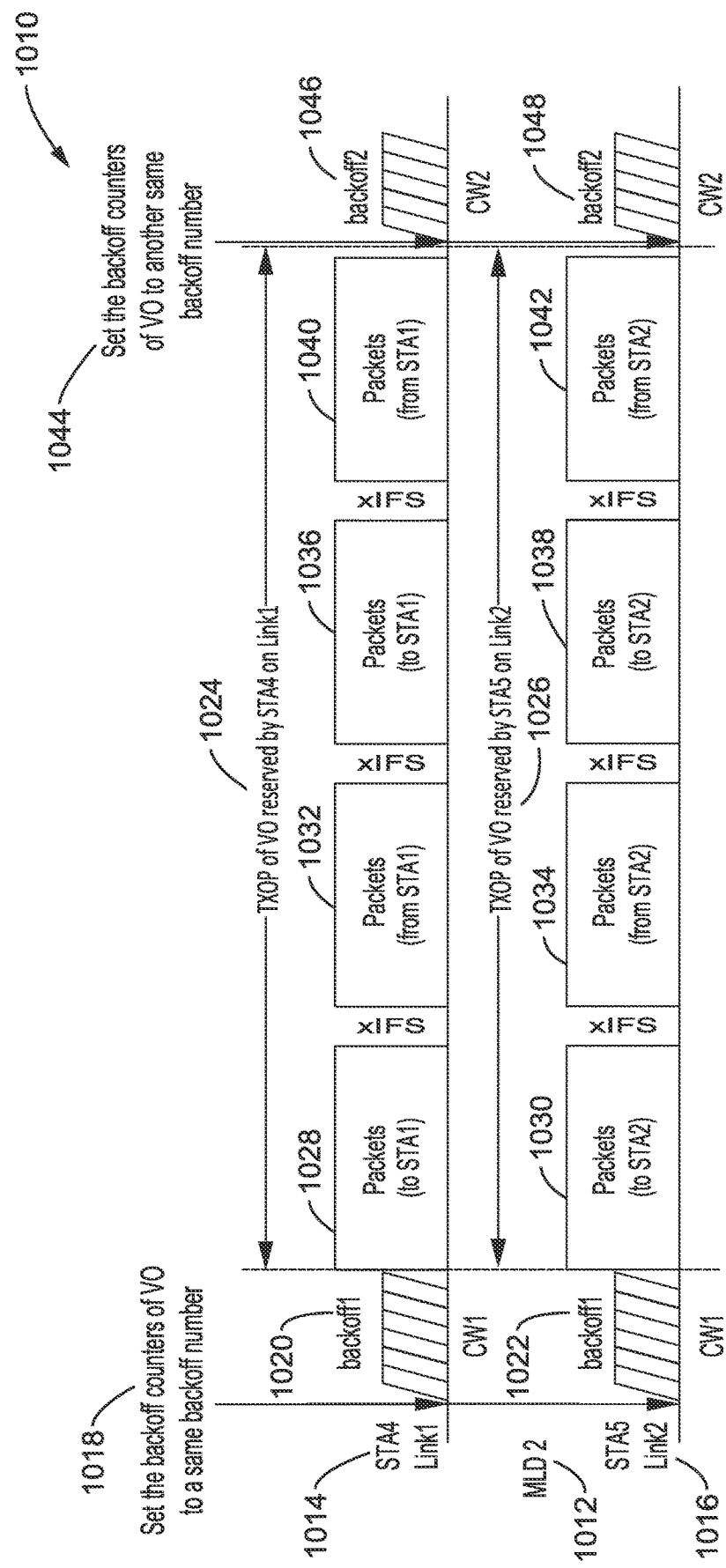
FIG. 31 is a communication sequence diagram of Example 19 for a MLD setting backoff counters according to at least one embodiment of the present disclosure.

FIG. 31 illustrates an example embodiment 1010 of showing general MLD operation of setting backoff counters of an AC.

Transmitters STA4 1014, STA5 1016 are affiliated with an MLD2 (transmitter MLD) 1012 and the receivers STA1, STA2 (not shown) are affiliated with an MLD1 (receiver MLD). Transmitters STA4, STA5 have packets to be transmitted to receivers STA1, STA2 over Link1 and Link2, respectively. Link1 and Link2 can be a non-STR link pair of MLD2 as defined in IEEE 802.11be, but again this is not required. Link1 and Link2 can be a non-STR link pair of MLD1 as defined in IEEE 802.11be, but again this is not required.

In this example the backoff counters are shown being chosen for voice (VO), although it could be for any AC, on its affiliated STAs using option A as explained for block 76 in FIG. 8.

Transmitters STA4, STA5 are to transmit VO packets to receivers STA1, STA2 over Link1 and Link2, respectively. As shown in the figure, the contention window size of VO on STA4 and STA5 are $CW_1$ at the beginning. MLD2 could set the backoff counters 1020, 1022 of VO on STA4 and STA5 to the same backoff number 1018, i.e., backoff1, on Link1 and Link2. Backoff1 could be randomly chosen between 0 and $CW_1$. It should also be noted that Backoff1 can be a random number uniformly distributed between 0 and $CW_1$. STA4 and STA5 can count down their backoffs independently. In this example, they obtain the channel access 1024, 1026 on Link1 and Link2 at the same time. They can reserve the same duration of TXOP on those two links for transmissions. STA4 and STA5 are seen transmitting and receiving packet groups 1028, 1030, 1032, 1034, 1036, 1038, 1040 and 1042.

After STA4 and STA5 end their TXOPs, they can reset the backoff counters 1046, 1048 of VO on Link1 and Link2 to the same backoff number 1044 of VO, i.e., backoff2, if the contention window sizes of VO on STA4 and STA5 are the same. In this example, the contention window sizes on both STAs are set to $CW_2$. As explained previously backoff2 could be randomly chosen between 0 and $CW_2$, or could be a random number uniformly distributed between 0 and $CW_2$. In the example the packets have been aligned, although when packet alignment is not necessary they are not forced into alignment.

The DL/UL packets could contain any types of data frames or management frames or control frames. It is possible that only UL packets are transmitted during TXOP. Contention window size on each link can be independently updated according to EDCA rules defined in IEEE 802.11.

It should be appreciated that in these examples the transmitter MLD can be a STR MLD or an non-STR MLD; while the receiver MLD could also be a STR MLD or an non-STR MLD. In at least one embodiment the transmitter MLD is the AP MLD and the receiver MLD is the non-AP MLD. In at least one embodiment the transmitter MLD is the non-AP MLD and the receiver MLD is the AP MLD. In at least one embodiment there is peer-to peer communication between the transmitter MLD and the receiver MLD. These apply to each of the examples of the present disclosure.

5.20. MLD Setting Backoff Counters: Example 20

Figure 32:
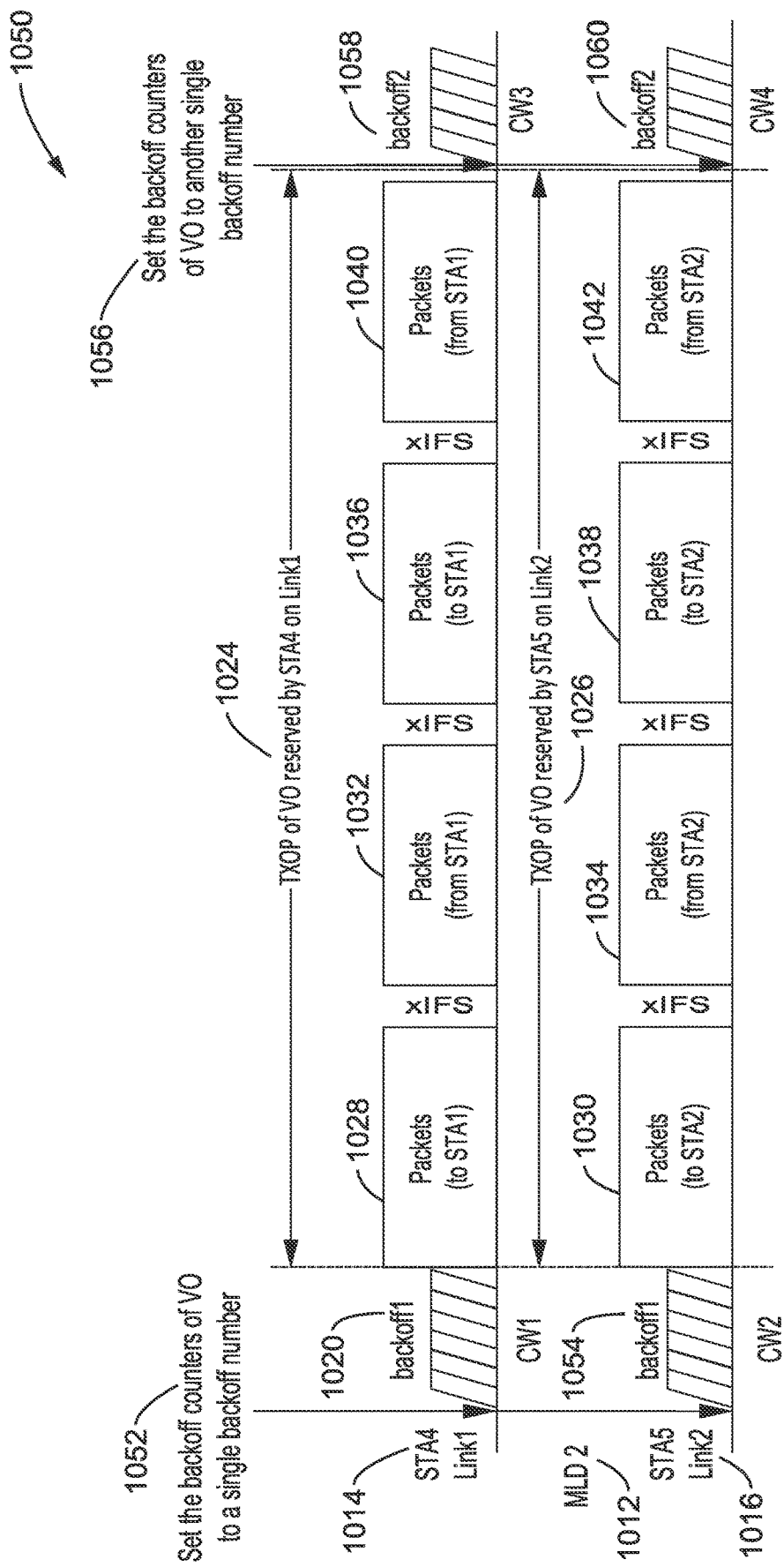
FIG. 32 is a communication sequence diagram of Example 20 for a MLD setting backoff counters according to at least one embodiment of the present disclosure.

FIG. 32 illustrates an example embodiment 1050 of an MLD setting backoff counters of an AC, in a system. The same transmitters and receivers are shown as in the previous figure, while this figure depicts setting backoff counters of an AC, e.g., voice (VO), on its affiliated STAs using option B as was previously explained for block 78 of FIG. 8.

It should be appreciated that the transmitter MLD2 could be a STR MLD or a non-STR MLD, while the receiver MLD1 can be either a STR or a non-STR MLD.

As shown in the figure, the contention window size of VO is CW1 1020 on STA4 and CW2 1054 on STA5 at the beginning. MLD2 can set the backoff counters of VO on STA4 and STA5 to a single backoff number 1052, i.e., backoff1, on Link1 and Link2. Backoff1 can be randomly chosen between 0 and $CW_{ML}=f(CW_1, CW_2)$ as was described in Section 4.4. For example, Backoff1 could be a random number uniformly distributed between 0 and $CW_{ML}$.

STA4 and STA5 can count down their backoffs independently. In this example, both STAs obtain channel access on Link1 and Link2 at the same time. They could reserve the same duration of TXOP on those two links for transmissions.

After STA4 and STA5 end the TXOPs, they can reset the backoff counters 1058, 1060 of VO on Link1 and Link2 to another single backoff number 1056 of VO, i.e., backoff2, as they set backoff1. As shown in the figure, the contention window size of VO is $CW_3$ on STA4 and $CW_4$ on STA5. MLD2 could set the backoff counters of VO on STA4 and STA5 to a single backoff number, i.e., backoff2, on Link1 and Link2 as was described for block 78 of FIG. 8. Backoff2 can be randomly chosen between 0 and $CW_{ML}=f(CW_3, CW_4)$ as described in Section 4.4. For example, Backoff2 can be a random number uniformly distributed between 0 and $CW_{ML}$.

In this example the packets are shown aligned, although alignment is not forced when it is not necessary.

5.21. MLD Setting Backoff Counters: Example 21

Figure 33:
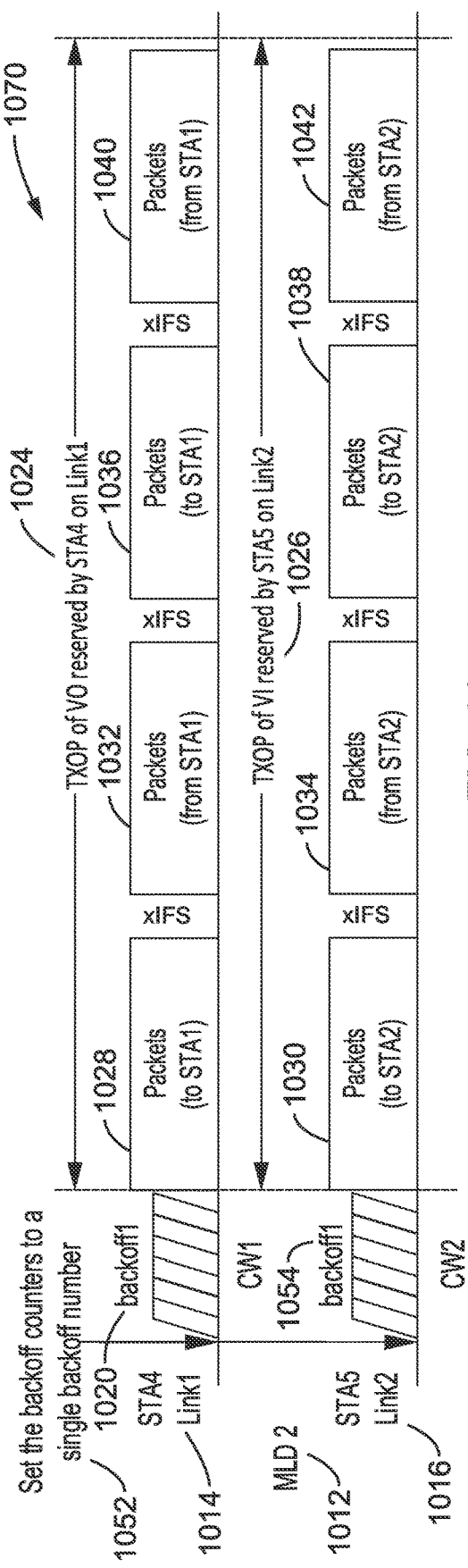
FIG. 33 is a communication sequence diagram of Example 21 for a MLD setting backoff counters according to at least one embodiment of the present disclosure.

FIG. 33 illustrates an example embodiment 1070 of an MLD setting backoff counters of different ACs. The same transmitters and receivers are shown as in the previous figure, although this figure depicts setting backoff counters of different ACs, e.g., voice (VO) on STA4 and video (VI) on STA5 on its affiliated STAs as explained in Section 4.5. There are no contentions shown after TXOP 1024 and 1026.

Again it will be appreciated that the transmitter MLD2 can be a STR MLD or a non-STR MLD. The receiver MLD1 can be either STR or non-STR MLD.

As shown in the figure, the contention window size of VO is $CW_1$ 1020 on STA4 and the contention window size of VI is $CW_2$ 1054 on STA5. The MLD2 can set the backoff counters of VO and VI on STA4 and STA5 to a single backoff number, i.e., backoff1, on Link1 and Link2, respectively. Backoff1 can be randomly chosen between 0 and $CW_{ML}=f CW_2$) as explained Section 4.5. For example, Backoff1 can be a random number uniformly distributed between 0 and $CW_{ML}$. Also, STA4 and STA5 should use the same AIFS number (e.g., AIFS_ML) for the count down procedure of backoff1 on Link1 and Link2 as explained in Section 4.5.

STA4 and STA5 can count down their backoffs independently. In this example, they obtain the channel access on Link1 and Link2 at the same time. They can reserve the same duration of TXOP on those two links for transmissions. As shown in this example the packets are aligned, although alignment is not forced when unnecessary.

5.22. MLD Setting Backoff Counters: Example 22

Figure 34:
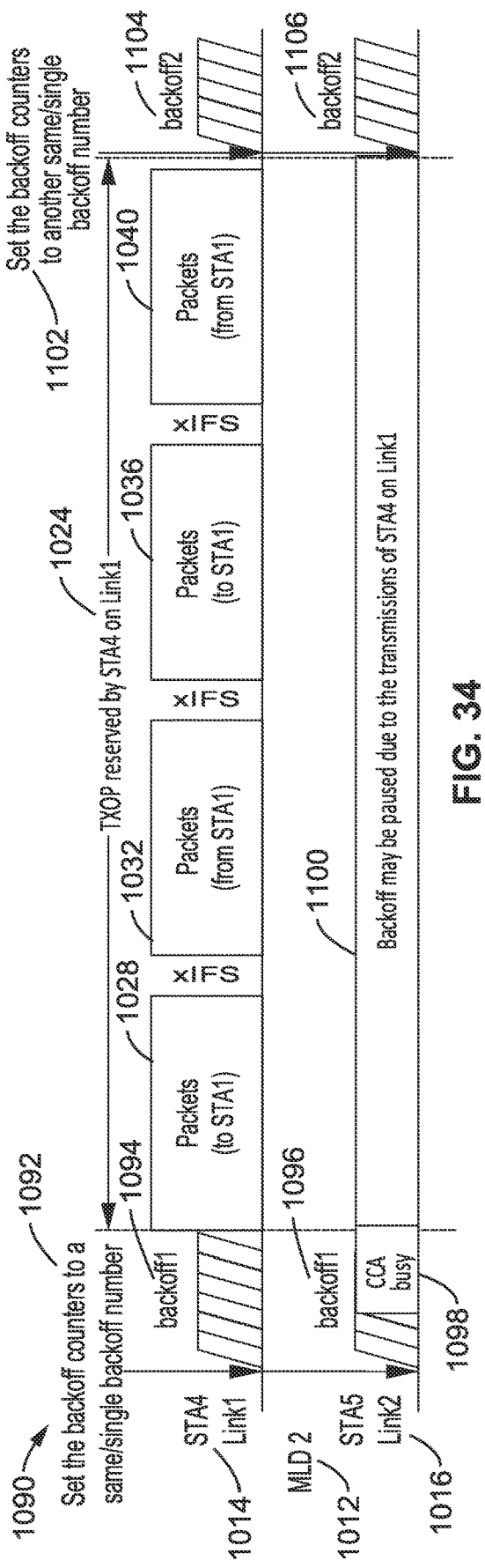
FIG. 34 is a communication sequence diagram of Example 22 for a MLD setting backoff counters according to at least one embodiment of the present disclosure.

FIG. 34 illustrates an example embodiment 1090 of an MLD (MLD2) resetting an ongoing backoff counter on one link to start the same/single backoff counters on multiple links. The same transmitters and receivers are shown as in the previous figures, although this figure depicts resetting an ongoing backoff counter on one link to start the same/single backoff counters on multiple links.

Again it will be appreciated that the MLD2 (transmitter MLD) can be a STR MLD or a non-STR MLD; while the MLD1 (receiver MLD) can be either STR or non-STR MLD. As in each of these embodiments, Link1 and Link2 can be a non-STR link pair of MLD2 or a non-STR link pair of MLD1, these being defined in IEEE 802.11be, while neither is required.

Transmitters STA4, STA5 are to transmit packets to receivers STA1, STA2 over Link1 and Link2, respectively. As shown in the figure, STA4 and STA5 can set the backoff counters to a same/single backoff number 1092, i.e., backoff1 1094, 1096, on Link1 and Link2, respectively.

STA4 and STA5 count down the backoffs independently. In this example, STA4 is the first to count its backoff to zero and accesses the channel on Link1, and then reserves the TXOP on Link1.

STA5 may pause 1100 to count down its backoff because STA4 is transmitting on Link1. When STA4 finishes its TXOP on Link1, MLD2 could set another same/single backoff number 1102 on Link1 and Link2, seen here as backoff2 1104 and 1106.

5.23. MLD Setting Backoff Counters: Example 23

Figure 35:
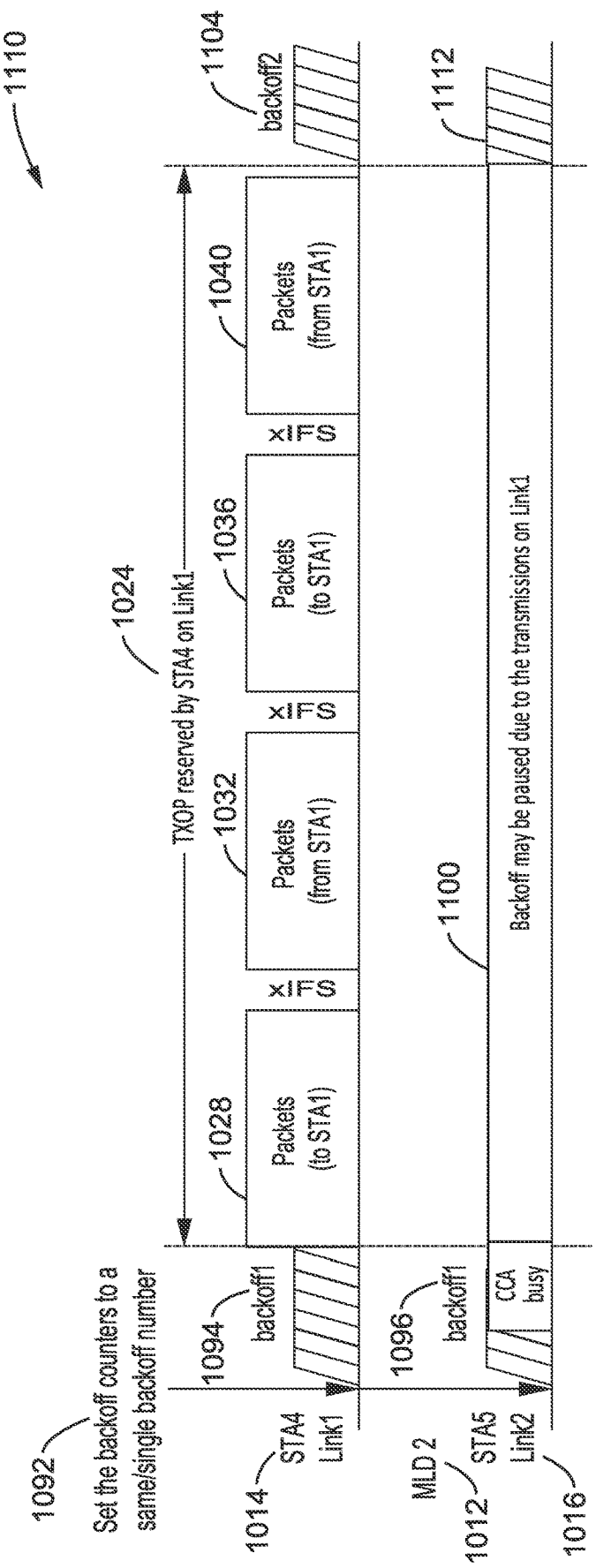
FIG. 35 is a communication sequence diagram of Example 23 for a MLD setting backoff counters according to at least one embodiment of the present disclosure.

FIG. 35 illustrates an example embodiment 1110 of an MLD deciding not to reset an ongoing backoff counter on one link. The same transmitters and receivers are shown as in the previous figure, although this figure depicts deciding not to reset an ongoing backoff counter on one link when it decides not to start the same/single backoff counters on multiple links.

It should be appreciated that the MLD2 can be a STR MLD or a non-STR MLD; while the MLD1 can be either STR or non-STR MLD.

STA4 and STA5 are seen setting the backoff counters to a same/single backoff number 1092, i.e., backoff1 1094, 1096 on Link1 and Link2, respectively. STA4 and STA5 count down backoff independently, and in this example STA4 backoff reached zero first and it accesses the channel 1024 on Link1, upon which it reserves the TXOP on that link.

STA5 may pause 1100 to count down its backoff because STA4 is transmitting on Link1. When STA4 finishes its TXOP on Link1, it can set another backoff number 1104, i.e., backoff2, on Link1 while STA5 continues counting down backoff1 1112 on Link2.

5.24. MLD Setting Backoff Counters: Example 24

Figure 36:
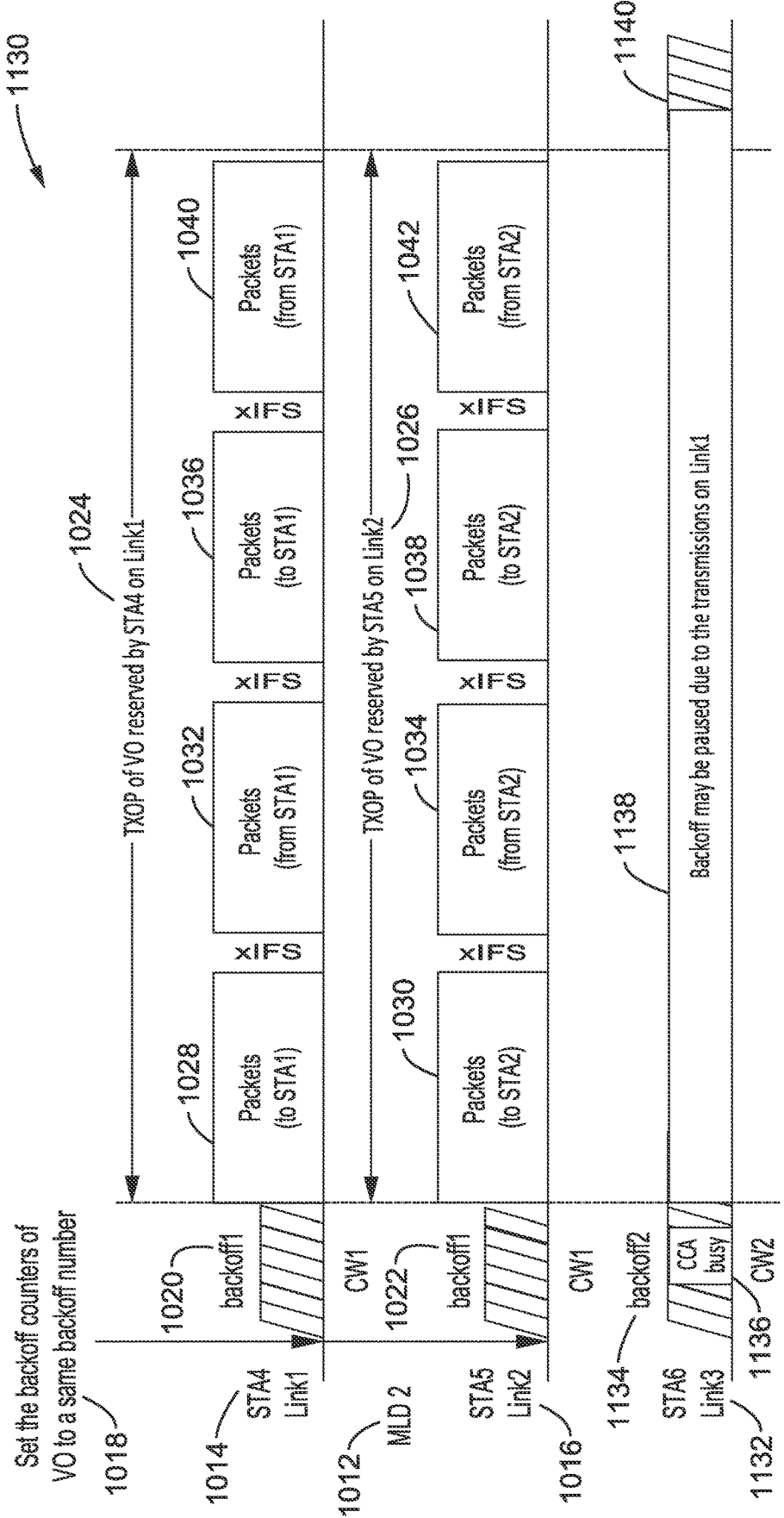
FIG. 36 is a communication sequence diagram of Example 24 for a MLD setting backoff counters according to at least one embodiment of the present disclosure.

FIG. 36 illustrates an example embodiment 1130 of an MLD setting backoff counters of an AC. The same transmitters and receivers are shown as in the previous figure, except for the addition of STA6 1132 on Link3, which is also affiliated with MLD2 1012, and which is received by STA3 (not shown) that is also affiliated with MLD1 (receiver MLD).

It should be appreciated that the MLD2 can be a STR MLD or a non-STR MLD; while MLD1 can be either STR or non-STR MLD. Any link pair among Link1, Link2 and Link3 can be a non-STR link pair of MLD2 as defined in IEEE 802.11be, but this is not required. Any link pair among Link1, Link2 and Link3 can be a non-STR link pair of MLD1 as defined in IEEE 802.11be, but again this is not required.

The figure illustrates an example of an MLD setting the backoff counters of an AC, e.g., voice (VO), on its affiliated STAs using option A as explained for block 76 of FIG. 8.

Transmitters STA4, STA5, STA6 are to transmit VO packets to receivers STA1, STA2, and STA3 over Link1, Link2 and Link3, respectively. As shown in the figure, the contention window size of VO is CW1 on STA4 and STA5 and CW2 on STA6. MLD2 can set the backoff counters of VO on STA4 and STA5 to a same backoff number, i.e., backoff1, 1020 and 1022, on Link1 and Link2 as was described for block 76 of FIG. 8. Backoff1 will be randomly chosen between 0 and $CW_1$. It should be noted that Backoff1 in this instance can be a random number uniformly distributed between 0 and $CW_1$. STA6 can set its backoff counter to backoff2 1134 regardless of whether $CW_2$ is equal to $CW_1$ or not. It should be noted that backoff2 is another random number uniformly distributed between 0 and $CW_2$.

STA4 and STA5 can count down backoff independently. In this example, they obtain channel access on Link1 and Link2 at the same time. STA4 and STA5 can reserve the same duration of TXOP on those two links for transmissions. STA6 may pause 1136 counting down backoff, as exemplified in this figure, because the transmissions of STA4 and STA5. Packet alignment is optional. After TXOPs 1024, 1026, STA6 resumes counting 1140.

5.25. MLD Setting Backoff Counters: Example 25

Figure 37:
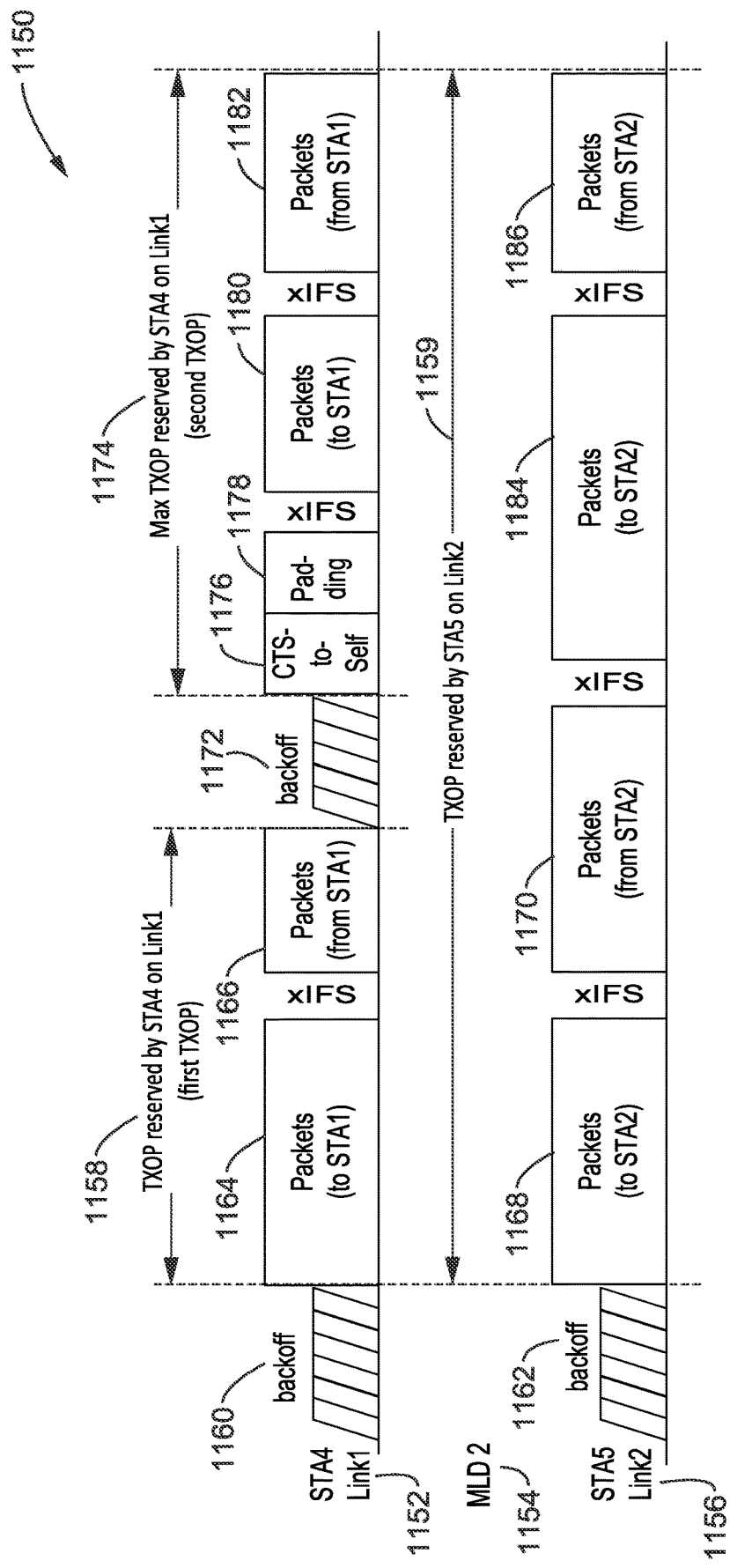
FIG. 37 is a communication sequence diagram of Example 25 for a MLD setting backoff counters according to at least one embodiment of the present disclosure.

FIG. 37 illustrates an example embodiment 1150 of general MLD operation of reserving TXOPs on multiple links. The transmitters STA4 1154, STA5 1156 are affiliated with MLD2 1152 and the receivers STA1, STA2 (not shown) are affiliated with MLD1. In these examples, it should be noted that MLD2 could be a STR MLD or a non-STR MLD and MLD1 can be a STR MLD or a non-STR MLD. Link1 and Link2 can be a non-STR link pair of MLD2 as defined in IEEE 802.11be or otherwise. Link1 and Link2 may comprise a non-STR link pair of MLD1 as defined in IEEE 802.11be, but is this is not required.

Transmitters STA4, STA5 are to transmit packets to receivers STA1, STA2 over Link1 and Link2, respectively. After backoffs 1160 and 1162, STA4 and STA5 obtain channel access on Link1 and Link2 and reserve TXOPs 1158 and 1159. Then, they start to transmit and receive packets 1164, 1166, 1168 and 1170. STA4 ends its first TXOP 1158 on Link1 earlier than STA5 and after backoff 1172 contends for the second TXOP 1174. As explained for block 104 in FIG. 9B, when STA4 obtains channel access again, it is able to reserve another TXOP (i.e., second TXOP 1174) whose end time is earlier than the TXOP reserved by STA5 on Link2.

When STA4 starts the second TXOP on Link1, it is exemplified here as using a CTS-to-Self frame 1176 with padding 1178 to reserve the TXOP and aid with packet alignment, after which packets are communicated 1180, 1182. As shown in the figure, the end time of the first packets 1180 (to STA1) in the second TXOP of STA4 and the end time of the third packets 1184 (to STA2) are aligned.

STA4 and STA5 can count down their backoffs independently; although in this example they obtain channel access on Link1 and Link2 at the same time. They can reserve the same duration of TXOP on those two links for transmissions.

The packets being transmitted/received may comprise any desired types of data or management or control frames. Under certain circumstances, it is also possible that MLD2 only transmitting the packets without expecting receiving any packets during TXOP. As for the other examples, packet alignment is optional, and is not required when it is not needed.

An example of when packet alignment is not needed is described below which applies to this example, and generally to all the other example embodiments described herein. For example, when link1 and link2 are one non-STR link pair of MLD1 or MLD2 and there are packets only transmitted by MLD2 during TXOP on multiple links, packet alignment is not needed. When link1 and link2 are one STR link pair of both MLD1 and MLD2, packet alignment is not needed. When link1 and link2 are one non-STR link pair of MLD1 or MLD2 and there are packets transmitted by both MLD1 and MLD2 during TXOP on multiple links, packet alignment is needed to avoid the internal-device interference.

The contention window size on each link can be updated according to EDCA rules defined in IEEE 802.11, independently. As in the other embodiments, the xIFS spacing in the figures can represent any interframe spacing, such as SIFS or PIFS.

5.26. MLD Setting Backoff Counters: Example 26

Figure 38:
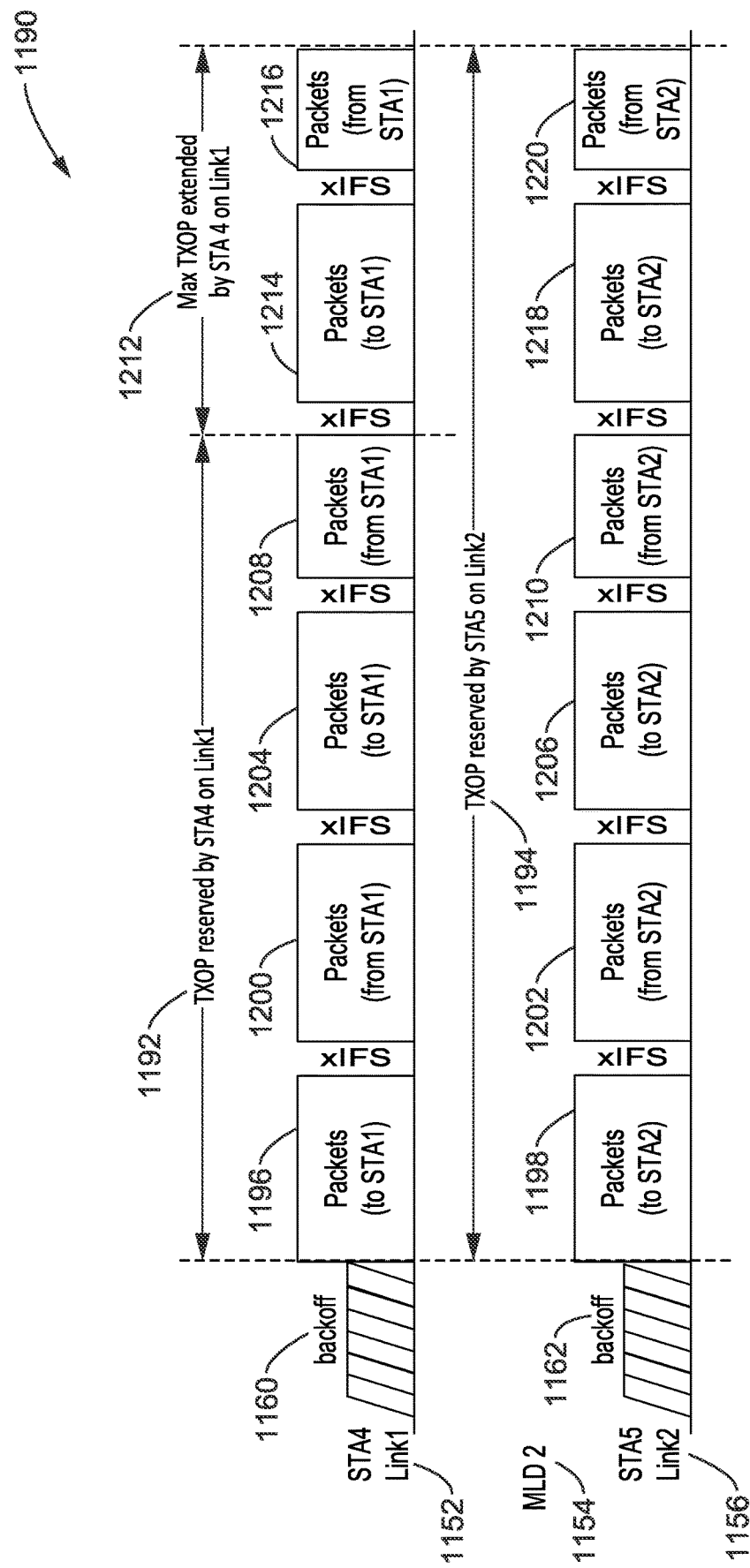
FIG. 38 is a communication sequence diagram of Example 26 for general MLD operation of extending TXOP on one link according to at least one embodiment of the present disclosure.

FIG. 38 illustrates an example embodiment 1190 of a general MLD operation of extending TXOP on one link. The transmitters STA4 1154, STA5 1156 are affiliated with MLD2 (transmitter MLD) 1152 and the receivers STA1, STA2 (not shown) are affiliated with MLD1 (receiver MLD). It should be appreciated that MLD2 may comprise a STR MLD or a non-STR MLD, and similarly MLD1 may comprise a STR MLD or a non-STR MLD. Link1 and Link2 can be a non-STR link pair of MLD2 as defined in IEEE 802.11be or otherwise. Link1 and Link2 can be a non-STR link pair of MLD1 as defined in IEEE 802.11be or otherwise.

STA4, STA5 are to communicate packets to/from STA1, STA2 over Link1 and Link2, respectively. After backoffs 1160 and 1162 STA4 and STA5 obtain channel access on Link1 and Link2 and reserve the TXOPs 1192 and 1194. Then, they start to communicate packets 1196, 1198, 1200, 1202, 1204, 1206, 1208 and 1210. When STA4 reserves a shorter TXOP than STA5, it is possible for STA4 to extend 1212 its TXOP on Link1 until the end time of the TXOP 1194 reserved by STA5 on Link2. It should be appreciated that the TXOP extension shown here (and generally in other example embodiments herein) can be indicated by the packet exchanges in the original TXOP reserved by STA4 on Link1 as in IEEE 802.11 protocol. During this extended interval 1212, STA4 exchanges packet groups 1214 and 1216 with STA1, while STA5 in its TXOP 1194 exchanges packets 1218 and 1220 with STA2.

STA4 and STA5 can count down backoff independently, however, by way of example this figure depicts the STAs obtaining channel access on Link1 and Link2 at the same time. They can reserve the same duration of TXOP on those two links for transmissions.

The packets being transmitted/received may comprise any desired types of data or management or control frames. Under certain circumstances, it is also possible that MLD2 only transmits the packets without receiving any packets during TXOP. As for the other examples, packet alignment is optional, and is not required when it is not needed. For example, when link1 and link2 are one non-STR link pair of MLD1 or MLD2 and there are packets only transmitted by MLD2 during TXOP on multiple links, packet alignment is not needed. When link1 and link2 are one STR link pair of both MLD1 and MLD2, packet alignment is not needed. When link1 and link2 are one non-STR link pair of MLD1 or MLD2 and there are packets are transmitted by both MLD1 and MLD2 during TXOP on multiple links, packet alignment is needed to avoid the internal-device interference.

The contention window size on each link can be independently updated according to EDCA rules defined in IEEE 802.11. The designation of xIFS in these figures represent any desired form of interframe spacing, such as SIFS, PIFS, or similar.

6. General Scope of Implementations

The enhancements described in the presented technology can be readily implemented within various wireless network communication stations in various configurations and multiple link device groups. It should also be appreciated that wireless network communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

It will also be appreciated that the computer readable media (memory storing instructions) in these computations systems is "non-transitory", which comprises any and all forms of computer-readable media, with the sole exception being a transitory, propagating signal. Accordingly, the disclosed technology may comprise any form of computer-readable media, including those which are random access (e.g., RAM), require periodic refreshing (e.g., DRAM), those that degrade over time (e.g., EEPROMS, disk media), or that store data for only short periods of time and/or only in the presence of power, with the only limitation being that the term "computer readable media" is not applicable to an electronic signal which is transitory.

Embodiments of the present disclosure may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It should be appreciated that blocks at the beginning and end of these flowcharts, such as "Start" and "Stop" do not infer that the instructions are confined to a specific routine, or that it has an actual start and stop, per se, but are merely provided as points of reference in relation to executing steps involved in the process. The associated instructions for these process steps may be executed without limitation within various routines, tasks, slices, threads, and so forth, and these steps can be combined with steps to perform other functions, or can be extended to provide additional functionality, without departing from the teachings of the present disclosure.

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple implementations of the technology which include, but are not limited to, the following.

An apparatus for wireless communication in a network, comprising: (a) a wireless communication circuit configured as a multi-link device (MLD) configured for wirelessly communicating at least one physical layer protocol data unit (PPDU) with at least one other station in a network in which carrier-sense multiple-access collision avoidance (CSMA/CA) as well as multi-link operations are applied; (b) a processor coupled to said wireless communication circuit of said MLD configured for operating on a wireless network; (c) a non-transitory memory storing instructions executable by the processor; and (d) wherein said instructions, when executed by the processor, perform obtaining a transmit opportunity (TXOP) for transmitting to a MLD, by performing steps comprising: (d)(i) setting a random number of backoff slots, as a random backoff, for channel contention on each link; (d)(ii) counting down the random backoff on each link independently; (d)(iii) gaining channel access and obtaining a transmit opportunity (TXOP) on a link when the backoff of that link counts down to zero; and (d) (iv) reserving the TXOP duration on a link whose end time cannot occur later than the latest existing TXOPs of the MLD.

An apparatus for wireless communication in a network, comprising: (a) a wireless communication circuit configured as a multi-link device (MLD) for communicating at least one other station in a network in which carrier-sense multiple-access collision avoidance (CSMA/CA) and multi-link operations are applied; (b) a processor coupled to said wireless communication circuit of said MLD configured for operating on a wireless network; (c) a non-transitory memory storing instructions executable by the processor; and (d) wherein said instructions, when executed by the processor, perform obtaining channel access by performing steps comprising: (d)(i) setting a same random number of backoff slots, as a random backoff, for channel contention on multiple links; (d)(ii) counting down the random backoff on each link independently; and (d)(iii) gaining channel access on a link when the backoff of that link counts down to zero.

A Wireless communication system/apparatus performing transmission of packets, where CSMA/CA and multi-link operation are applied and wherein the MLD is STR and wherein the non-AP MLD is non-STR, and the AP MLD obtains TXOP for transmitting to the non-AP MLD, comprising: (a) AP MLD sets the random backoff slots for channel contention on each link the links; (b) the AP MLD counts down random backoff on each link independently; (c) the AP MLD gains channel access and obtains the TXOP on a link when the backoff of that link counts down to zero; (d) the AP MLD reserves the TXOP duration on a link whose end time cannot be later than the latest existing TXOPs of AP MLD.

The apparatus or method or system of any preceding implementation, wherein the MLD sets the random number of backoff slots by using a single random number to set the backoff slots on multiple links.

The apparatus or method or system of any preceding implementation, wherein the MLD sets the random number of backoff slots by using the same random number to set the backoff slots on multiple links that have the same contention window (CW).

The apparatus or method or system of any preceding implementation, wherein the MLD sets the random number of backoff slots by using different random numbers to set a number of backoff slots on multiple links that have different contention windows (CWs).

The apparatus or method or system of any preceding implementation, wherein the MLD sets the random number of backoff slots for the backoff on a link when the MLD is counting down a backoff on that link.

The apparatus or method or system of any preceding implementation, wherein the MLD sets the random number of backoff slots performs resetting the backoff slots on a link even if the MLD is counting down a backoff on that link.

The apparatus or method or system of any preceding implementation, wherein the MLD reserving the TXOP duration on a link performs aligning the TXOP end time with the existing TXOPs which are under the control of the MLD.

The apparatus or method or system of any preceding implementation, wherein the MLD reserving the TXOP duration on a link performs forcing the TXOP interval to end earlier than in existing TXOPs owned by the MLD.

The apparatus or method or system of any preceding implementation, wherein the MLD reserving the TXOP duration on a link, whose end time is earlier than the existing TXOPs, performs contending for the channel immediately after ending the TXOP of the link whose end time is earlier than the existing TXOPs.

The apparatus or method or system of any preceding implementation, wherein the MLD reserving the TXOP duration on a link, whose end time is earlier than the existing TXOPs, performs contending for the channel after all the TXOPs end.

The apparatus or method or system of any preceding implementation, wherein the MLD reserving the TXOP duration on a link performs truncating that TXOP so that it ends earlier.

The apparatus or method or system of any preceding implementation, wherein the MLD reserving the TXOP duration on a link, performs reserving the TXOP duration on multiple links and terminates all the TXOPs at the same time.

The apparatus or method or system of any preceding implementation, wherein the MLD reserving the TXOP duration on a link, performs reserving the TXOP duration on multiple links and generates a clear-to-send to itself (CTS-to-Self) to reserve TXOP on a link.

The apparatus or method or system of any preceding implementation, wherein the MLD reserving the TXOP duration on a link, performs reserving the TXOP duration on multiple links and generates a clear-to-send to itself (CTS-to-Self) with padding to reserve TXOP on a link and align the physical layer protocol data unit (PPDU) being communicated.

The apparatus or method or system of any preceding implementation, wherein MLD setting of the random backoff slots comprises using a same random number to set the backoff slots on multiple links that have the same contention window (CW).

The apparatus or method or system of any preceding implementation, wherein MLD setting of the random backoff slots comprises using a same random number to set the backoff slots on multiple links that have different contention windows (CWs).

The apparatus or method or system of any preceding implementation, wherein MLD setting of the random backoff slots comprises using different random numbers to set the backoff slots on multiple links that have different contention windows (CWs).

The apparatus or method or system of any preceding implementation, wherein MLD setting of the random backoff slots comprises continuing the backoff on a link if the MLD is counting down a backoff on that link.

The apparatus or method or system of any preceding implementation, wherein MLD setting of the random backoff slots comprises resetting the backoff on a link even if the MLD is counting down a backoff on that link The apparatus or method or system of any preceding implementation, wherein MLD setting of the random backoff slots comprises setting a same random number of backoff slots on multiple links for obtaining the TXOPs of the same AC.

The apparatus or method or system of any preceding implementation, wherein MLD setting of the random backoff slots comprises setting a same random number for the backoff slots on multiple links for obtaining the TXOPs of different ACs.

As used herein, term "implementation" is intended to include, without limitation, embodiments, examples, or other forms of practicing the technology described herein.

As used herein, the singular terms "a," "an," and "the" may include plural referents unless the context clearly dictates otherwise. Reference to an object in the singular is not intended to mean "one and only one" unless explicitly so stated, but rather "one or more."

Phrasing constructs, such as "A, B and/or C", within the present disclosure describe where either A, B, or C can be present, or any combination of items A, B and C. Phrasing constructs indicating, such as "at least one of" followed by listing group of elements, indicates that at least one of these group elements is present, which includes any possible combination of these listed elements as applicable.

References in this specification referring to "an embodiment", "at least one embodiment" or similar embodiment wording indicates that a particular feature, structure, or characteristic described in connection with a described embodiment is included in at least one embodiment of the present disclosure. Thus, these various embodiment phrases are not necessarily all referring to the same embodiment, or to a specific embodiment which differs from all the other embodiments being described. The embodiment phrasing should be construed to mean that the particular features, structures, or characteristics of a given embodiment may be combined in any suitable manner in one or more embodiments of the disclosed apparatus, system or method.

In addition, when the disclosure refers to operations which "can" or "should" (or similar wording) be performed by the instructions, then this indicates that the operation is performed in at least one embodiment and/or mode of the present disclosure and more generally most of the embodiments and/or modes of the present disclosure, but that there could be instances, where for any of a variety of reasons, these instructions are overridden or otherwise not performed.

As used herein, the term "set" refers to a collection of one or more objects. Thus, for example, a set of objects can include a single object or multiple objects.

As used herein, the terms "approximately", "approximate", "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

It will be appreciated that the practice of some jurisdictions may require deletion of one or more portions of the disclosure after that application is filed. Accordingly the reader should consult the application as filed for the original content of the disclosure. Any deletion of content of the disclosure should not be construed as a disclaimer, forfeiture or dedication to the public of any subject matter of the application as originally filed.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

EDCA Queue Model

| Priority | User Priority (UP) | 802.11 Designation | Transmit Queue | AC |
|---|---|---|---|---|
| Low | 1 | Background (BK) | BK | BK |
| ↓ | 2 | Spare (—) | BK | BK |
|  | 0 | Best Effort (BE) | BE | BE |
|  | 3 | Excellent Effort (EE) | BE | BE |
|  | 4 | Control Load (CL) | A_VI | VI |
|  | 5 | Video (VI) | VI | VI |
|  | 6 | Voice (VO) | VO | VO |
| High | 7 | Network Ctrl (NC) | A_VO | VO |

TABLE 2

EDCA Default Parameter Settings

| AC | CWmin | CWmax | AIFSN | TXOP Limit |
|---|---|---|---|---|
| BK | 15 | 1023 | 7 | 0 |
| BE | 15 | 1023 | 3 | 0 |

TABLE 2-continued

EDCA Default Parameter Settings

| AC | CWmin | CWmax | AIFSN | TXOP Limit |
|----|-------|-------|-------|------------|
| VI | 7 | 15 | 2 or 1 (AP) | 3 ms |
| VO | 3 | 7 | 2 or 1 (AP) | 1.5 ms |

What is claimed is:

1. An apparatus for wireless communication in a network, comprising:
 (a) a wireless communication circuit configured as a first multi-link device (MLD) configured for wirelessly communicating at least one physical layer protocol data unit (PPDU) with at least one other station in a network in which carrier-sense multiple-access collision avoidance (CSMA/CA) as well as multi-link operations (MLO) are applied;
 (b) a processor coupled to said wireless communication circuit of said MLD configured for operating on a wireless network;
 (c) a non-transitory memory storing instructions executable by the processor; and
 (d) wherein said instructions, when executed by the processor, perform obtaining a transmit opportunity (TXOP) for transmitting to a second MLD, by performing steps comprising:
  setting a random number of backoff slots, as a random backoff, for channel contention on each link;
  (ii) counting down the random backoff on each link independently;
  (iii) gaining channel access and obtaining a transmit opportunity (TXOP) on a link when the backoff of that link counts down to zero; and
  (iv) reserving the TXOP duration on a link whose end time cannot occur later than the latest existing TXOPs of the first MLD; and
  (v) wherein said first MLD reserving the TXOP duration on a link performs forcing the TXOP interval to end earlier than in existing TXOPs owned by said first MLD.

2. The apparatus of claim 1, wherein said first MLD sets the random number of backoff slots by using a single random number to set the backoff slots on multiple links.

3. The apparatus of claim 1, wherein the said first MLD sets the random number of backoff slots by using the same random number to set the backoff slots on multiple links that have the same contention window (CW).

4. The apparatus of claim 1, wherein said first MLD sets the random number of backoff slots by using different random numbers to set a number of backoff slots on multiple links that have different contention windows (CWs).

5. The apparatus of claim 1, wherein said first MLD sets the random number of backoff slots for the backoff on a link when said first MLD is counting down a backoff on that link.

6. The apparatus of claim 1, wherein said first MLD sets the random number of backoff slots by resetting the backoff slots on a link even if the said first MLD is counting down a backoff on that link.

7. The apparatus of claim 1, wherein said first MLD reserving the TXOP duration on a link performs aligning the TXOP end time with the existing TXOPs which are under the control of said first MLD.

8. The apparatus of claim 1, wherein said first MLD reserving the TXOP duration on a link performs forcing the TXOP interval to end earlier than in existing TXOPs owned by said first MLD in response to transmitting contention free (CF) end frames on both links at the same time, which aid the non-AP MLD in contending for the channel on both links immediately after the TXOPs end.

9. The apparatus of claim 1, wherein said first MLD reserving the TXOP duration on a link, whose end time is earlier than the existing TXOPs, performs contending for the channel immediately after ending the TXOP of the link whose end time is earlier than the existing TXOPs.

10. The apparatus of claim 1, wherein said first MLD reserving the TXOP duration on a link, whose end time is earlier than the existing TXOPs, performs contending for the channel after all the TXOPs end.

11. The apparatus of claim 1, wherein said first MLD reserving the TXOP duration on a link performs truncating that TXOP so that it ends earlier.

12. The apparatus of claim 1, wherein said first MLD reserving the TXOP duration on a link, performs reserving the TXOP duration on multiple links and terminates all the TXOPs at the same time.

13. The apparatus of claim 1, wherein said first MLD reserving the TXOP duration on a link, performs reserving the TXOP duration on multiple links and generates a clear-to-send to itself (CTS-to-Self) to reserve TXOP on a link.

14. The apparatus of claim 1, wherein said first MLD reserving the TXOP duration on a link, performs reserving the TXOP duration on multiple links and generates a clear-to-send to itself (CTS-to-Self) with padding to reserve TXOP on a link and align the physical layer protocol data unit (PPDU) being communicated.

15. An apparatus for wireless communication in a network, comprising:
 (a) a wireless communication circuit configured as a multi-link device (MLD) for communicating at least one other station in a network in which carrier-sense multiple-access collision avoidance (CSMA/CA) and multi-link operations (MLO) are applied;
 (b) a processor coupled to said wireless communication circuit of said MLD configured for operating on a wireless network;
 (c) a non-transitory memory storing instructions executable by the processor; and
 (d) wherein said instructions, when executed by the processor, perform controlling channel access through a transmit opportunity (TXOP) by performing steps comprising:
  (i) setting a random number of backoff slots, as a random backoff, for channel contention on each link;
  (ii) counting down the random backoff on each link independently;
  (iii) gaining channel access and obtaining a transmit opportunity (TXOP) on a link when the backoff of that link counts down to zero;
  (iv) reserving the TXOP duration on a link whose end time cannot occur later than the latest existing TXOPs of the first MLD; and
  (v) wherein said first MLD reserving the TXOP duration on a link performs truncating that TXOP by sending a contention free (CF) end on the link to truncate it on that link.

* * * * *